(12) United States Patent
Lu et al.

(10) Patent No.: US 8,284,539 B2
(45) Date of Patent: Oct. 9, 2012

(54) HIGH PERFORMANCE ULTRACAPACITORS WITH CARBON NANOMATERIALS AND IONIC LIQUIDS

(75) Inventors: Wen Lu, Littleton, CO (US); Kent Douglas Henry, Laramie, WY (US)

(73) Assignee: ADA Technologies, Inc., Littleton, CO (US)

( * ) Notice: Subject to any disclaimer, the term of this patent is extended or adjusted under 35 U.S.C. 154(b) by 706 days.

(21) Appl. No.: 11/832,089

(22) Filed: Aug. 1, 2007

(65) Prior Publication Data

US 2008/0192407 A1    Aug. 14, 2008

Related U.S. Application Data

(60) Provisional application No. 60/821,225, filed on Aug. 2, 2006, provisional application No. 60/863,271, filed on Oct. 27, 2006.

(51) Int. Cl.
*H01G 9/00* (2006.01)

(52) U.S. Cl. ......................................... 361/502; 361/503

(58) Field of Classification Search .......... 361/502–503; 252/62.2
See application file for complete search history.

(56) References Cited

U.S. PATENT DOCUMENTS

| | | | |
|---|---|---|---|
| 4,603,165 A | 7/1986 | McDonald et al. | |
| 5,908,715 A | 6/1999 | Liu et al. | |
| 6,096,453 A | 8/2000 | Grunwald | |
| 6,235,433 B1 | 5/2001 | Amano et al. | |
| 6,268,088 B1 | 7/2001 | Oh et al. | |
| 6,283,812 B1 * | 9/2001 | Jin et al. | 445/24 |
| 6,396,682 B1 | 5/2002 | Kim et al. | |
| 6,503,660 B2 | 1/2003 | Baker et al. | |
| 6,563,694 B2 | 5/2003 | Kim et al. | |
| 6,667,825 B2 | 12/2003 | Lu et al. | |
| 6,726,732 B2 | 4/2004 | Kim et al. | |
| 6,790,425 B1 | 9/2004 | Smalley et al. | |
| 6,828,062 B2 | 12/2004 | Lu et al. | |
| 6,939,453 B2 | 9/2005 | Anderson et al. | |
| 6,991,876 B2 | 1/2006 | Narang et al. | |
| 7,061,749 B2 | 6/2006 | Liu et al. | |
| 7,147,966 B2 | 12/2006 | Ren et al. | |
| 7,157,588 B2 | 1/2007 | Harmer et al. | |
| 7,238,772 B2 | 7/2007 | Harmer et al. | |
| 7,283,349 B2 * | 10/2007 | Yoshida et al. | 361/502 |
| 7,297,289 B2 | 11/2007 | Sato et al. | |
| 7,505,250 B2 | 3/2009 | Cho et al. | |
| 7,648,406 B2 * | 1/2010 | Tai et al. | 445/50 |

(Continued)

FOREIGN PATENT DOCUMENTS

DE    19829030    10/1999

(Continued)

OTHER PUBLICATIONS

Schindall et al., "Nanotube Enchanced Ultracapacitors", Dec. 6-8, 2004.*

(Continued)

*Primary Examiner* — Eric Thomas
(74) *Attorney, Agent, or Firm* — Sheridan Rosa, PC

(57) ABSTRACT

The present invention is directed to the use of carbon nanotubes and/or electrolyte structures in various electrochemical devices, such as ultracapacitors having an ionic liquid electrolyte. The carbon nanotubes are preferably aligned carbon nanotubes. Compared to randomly entangled carbon nanotubes, aligned carbon nanotubes can have better defined pore structures and higher specific surface areas.

21 Claims, 30 Drawing Sheets

U.S. PATENT DOCUMENTS

| | | | |
|---|---|---|---|
| 2001/0024352 | A1 | 9/2001 | Kim et al. |
| 2001/0030847 | A1 | 10/2001 | Kim et al. |
| 2003/0077515 | A1 | 4/2003 | Chen et al. |
| 2004/0094741 | A1 | 5/2004 | Sato et al. |
| 2004/0167014 | A1 | 8/2004 | Yan et al. |
| 2004/0191617 | A1 | 9/2004 | Visco et al. |
| 2005/0042450 | A1 | 2/2005 | Atsushi et al. |
| 2005/0081983 | A1 | 4/2005 | Nakayama et al. |
| 2005/0103706 | A1 | 5/2005 | Bennett et al. |
| 2005/0175894 | A1 | 8/2005 | Visco et al. |
| 2005/0221193 | A1 | 10/2005 | Kinouchi et al. |
| 2005/0231785 | A1 | 10/2005 | Oh et al. |
| 2005/0231891 | A1 | 10/2005 | Harvey |
| 2006/0078790 | A1 | 4/2006 | Nimon et al. |
| 2006/0100323 | A1 | 5/2006 | Schmidt et al. |
| 2006/0120021 | A1 | 6/2006 | Banno et al. |
| 2006/0203322 | A1 | 9/2006 | Radmard et al. |
| 2006/0226396 | A1 | 10/2006 | Majumdar et al. |
| 2006/0238957 | A1 | 10/2006 | Mitsuda et al. |
| 2006/0257645 | A1 | 11/2006 | Asaka et al. |
| 2007/0021569 | A1 | 1/2007 | Willis et al. |
| 2007/0031729 | A1 | 2/2007 | Sato et al. |
| 2007/0153353 | A1 | 7/2007 | Gruner |
| 2007/0201184 | A1 | 8/2007 | Plee et al. |
| 2007/0258192 | A1 | 11/2007 | Schindall et al. |
| 2008/0063585 | A1* | 3/2008 | Smalley et al. ............... 423/414 |
| 2008/0138700 | A1 | 6/2008 | Horpel et al. |
| 2008/0212261 | A1 | 9/2008 | Ajayan et al. |
| 2010/0021819 | A1 | 1/2010 | Zhamu et al. |

FOREIGN PATENT DOCUMENTS

| | | |
|---|---|---|
| EP | 1198022 | 4/2002 |
| EP | 1380569 | 1/2004 |
| EP | 1548751 | 6/2005 |
| EP | 1 672 651 A1 | 6/2006 |
| JP | 2003234254 A * | 8/2003 |
| JP | 2008-016769 | 1/2008 |
| WO | WO 02/053808 | 7/2002 |
| WO | WO 02/063073 | 8/2002 |
| WO | WO03/012896 | 2/2003 |
| WO | WO 2005/038962 | 4/2005 |
| WO | WO 2005/083829 | 9/2005 |
| WO | WO 2005/104269 | 11/2005 |
| WO | WO 2005/116161 | 12/2005 |
| WO | WO 2006137893 | 12/2006 |
| WO | WO 2007/010039 | 1/2007 |
| WO | WO 2007/010042 | 1/2007 |
| WO | WO 2008/016990 | 2/2008 |

OTHER PUBLICATIONS

U.S. Appl. No. 12/412,047, filed Mar. 26, 2009, Lu, et al.

U.S. Appl. No. 12/435,992, filed May 5, 2009, Lu, et al.

"High-power lithium-ion (BU5A)", BatteryUniversity.com Website, as early as Mar. 16, 2006, available at http://batteryuniversity.com/partone-5A.htm, printed on Apr. 28, 2009, pp. 1-7.

"File: Carbon nanorim armchair povray.PNG", Wikimedia Commons Website, as early as Nov. 27, 2007, available at http://commons.wikimedia.org/wiki/File:Carbon_nanorim_armchair_povray.PNG, printed on Jun. 18, 2009, pp. 1-5.

"File: Carbon nanorim armchair povray.PNG", Wikimedia Commons Website, as early as Nov. 27, 2007, available at http://commons.wikimedia.org/wiki/File:Carbon_nanotube_armchair_povray.PNG, printed on Jun. 18, 2009, pp. 1-5.

"File: Types of Carbon Nanotubes.png", Wikipedia website, as early as May 2006, available at http://en.wikipedia.org/wiki/File:Types_of_Carbon_Nanotubes.png, printed on Jun. 26, 2009, pp. 1-5.

Srinivasan, et al., "A Model-based Comparison of Various Li-iion Chemistries", Prepared for Berkeley Electrochemical Research Council, as early as May 1, 2006, available at http://berc.lbl.gov/venkat/Ragone-construction.pps, pp. 1-17

Covalent Associates, Inc. home page, as early as Sep. 14, 2000, available at www.covalentassociates.com, pp. 1-2, printed on Jun. 19, 2009.

"Ionic Liquids", description on Solvant-innovation website, as early as Feb. 1, 2001, http://web.archive.org/web/20010203174200/www.solvent-innovation.com/Englisch/index2.htm, pp. 1-2, printed on Jun. 19, 2009.

Solvant-Innovation Home page, as early as Feb. 1, 2001, available at http://web.archive.org/web/20010203174200/www.solvent-innovation.com/Englisch/index2.htm, pp. 1-2, printed on Jun. 19, 2009.

"Nanobatteries", Wikipedia website, as early as Dec. 26, 2007, available at http://en.wikipedia.org/wikilNanobatteries, pp. 1-2, printed on Jun. 19, 2009.

Kalhammer, et al., Status and Prospects for Zero Emissions Vehicle Technology: Report of the ARB Independent Expert Panel 2007, Prepared for the State of California Air Resources Board, Sacramento, California, Apr. 13, 2007, available at http://www.arb.ca.gov/msprog/zevprog/zevreview/zev_panel_report.pdf.

Lu, et al., "High Performance Electrochemical Capacitors from Aligned Carbon Nanotube Electrodes and Ionic Liquid Electrolytes", Journal of Power Sources, Apr. 15, 2009, vol. 189, No. 2, pp. 1270-1277.

Wu, et al., "Ionic Liquid-Incorporated Gel Polymer Electrolytes for Ultracapacitors", Presented to the 209th Electrochemical Society Meeting held May 7-12, 2006, Denver, CO, pp. 1-23.

Duong, "2002 Annual Progress Report for Energy Storage Research and Development, FreedomCAR & Vehicle Technologies Program", Energy Storage Research & Development, U.S. DOE, May 2003, pp. 1-178.

Freemantle, "Designer Liquids in Polymer Systems: Versataile and advantageous, ionic liquids are beginning to create waves in polymer science", Chemical and Engineering News, May 3, 2004, vol. 82, No. 18, pp. 26-29, printed Jan. 26, 2009.

Slane, et al., "Composite gel electrolyte for rechargeable lithium batteries", Journal of Power Sources, 1995, vol. 55, pp. 7-10.

Kubota, et al., "Ionically conductive polymer gel electrolytes prepared from vinyl acetate and methyl methacrylate for electric double layer capacitor", Journal of Applied Polymer Science, 2000, vol. 76, pp. 12-18.

Osaka, et al., "An Electochemical Double Layer Capacitor Using an Activated Carbon Electrode with Gel Electrolyte Binder", Journal of the Electrochemical Society, 1999, vol. 146, No. 5, pp. 1724-1729.

Croce, et al., "Sythesis and Characterization of Highly Conducting Gel Electrolytes", Electrochimica Acta, 1994, vol. 39, No. 14, pp. 2187-2194.

Sung, et al., "Preparation and Characterization of Poly(vinyl chloride-co-vinyl acetate)-Based Gel Electrolytes for Li-Ion Batteries", Journal of the Electrochemical Society, Apr. 1988, vol. 145, No. 4, pp. 1207-1211.

Lu, et al., "Superior Capacitive Performance of Aligned Carbon Nanotubes in Ionic Liquids", The 211th ECS Meeting, Chicago, Illinois, May 6-11, 2007, Jan. 3, 2007, abstract only, p. 1.

Lu, et al., "Ultra-efficient Supercapacitors from Aligned Carbon Nanotubes and Ionic Liquids", Manuscript submitted to Science for consideration of publication , Jun. 13, 2007, pp. 1-31.

Lu, et al., "Superior Capacitive Performance of Aligned Carbon Nanotubes in Ionic Liquids", Manuscript submitted to ECS Transactions for consideration of publication, Jun. 15, 2007, pp. 1-5.

Lu, et al., "Ionic Liquid-Incorporated Gel Polymer Electrolytes for Ultracapicitors", ECS Transactions, 2007, vol. 2, No. 28, pp. 15-26.

International Search Report for International (PCT) Patent Application No. PCT/US07/74993, mailed Sep. 24, 2008.

Written Opinion for International (PCT) Patent Application No. PCT/US07/74993, mailed Sep. 24, 2008.

Burke, "Ultracapicitors: why, how, and where is the technology", Journal of Power Sources, 2000, vol. 91, pp. 37-50.

Conway, "Transition from 'Supercapacitor' to 'Battery' Behavior in Electrochemical Energy Storage", J. Electrochem Soc., Jun. 1991, vol. 138, No. 6, pp. 1539-1548.

Conway, et al., "Double-layer and pseudocapacitance types of electrochemical capacitors and their applications to the development of hybrid devices", J Solid State Electrochem, vol. 7, 2003, pp. 637-644.

Cottineau, et al., "Nanostructured transition metal oxides for aqueous hybrid electrochemical supercapacitors", Appl. Phys. A, 2006, vol. 82, pp. 599-606.

Herring, et al., "A Novel Method for the Templated Synthesis of Homogeneous Samples of Hollow Carbon Nanospheres from Cellulose Chars", Journal of the American Chemical Society, 2003, vol. 125, No. 33, pp. 9916-9917.

Jiang, et al., "Electrochemical supercapicitor material based on manganese oxide: preparation and characterization", Electrochimica Acta, 2002, vol. 47, pp. 2381-2386.

Lee, et al., "Ideal Supercapacitor Behavior of Amorphous $V_2O_5 \cdot nH_2O$ in Potassium Chloride (KCl) Aqueous Solution", Journal of Solid State Chemistry, 1999, vol. 148, pp. 81-84.

Lewandowski, et al., "Carbon-ionic liquid double-layer capacitors", Journal of Physics and Chemistry of Solids, Mar. 2004, vol. 65, Nos 2-3, pp. 281-286.

Watanabe, et al., "High Lithium Ionic Conductivity of Polymeric Solid Electrolytes", Makromol. Chem. Rapid. Commun., 1981, vol. 2, pp. 741-744.

Niu, et al., "High power electrochemical capacitors based on carbon nanotube electrodes", Appl. Phys. Lett., Mar. 17, 1997, vol. 70, No. 11, pp. 1480-1482.

Portet, et al., "High power density electrodes for Carbon supercapacitor applications", Electrochimica Acta, vol. 50, 2005, pp. 4174-4181.

International Preliminary Report on Patentability for International (PCT) Patent Application No. PCT/US07/74993, issued Feb. 3, 2009.

Kim, et al., "Synthesis and Electrochemical Characterization of Vanadium Oxide on Carbon Nanotube Film Substrate for Pseudocapacitor Applications", Journal of the Electrochemical Society, 2006, vol. 153, No. 6, pp. A989-A996.

Perebeinos, et al., "Electron-Phonon Interaction and Transport in Semiconducting Carbon Nanotubes", Physical Review Letters—The American Physical Society, Mar. 4, 2005, vol. 94, pp. 086802-1-086802-4.

Abstract entitled "Ionic Liquid-Incorporated Gel Polymer Electrolytes for Ultracapacitors" (W. Lu et al.) submitted to 209th Electrochemical Society Meeting held May 7-12, 2006 in Denver, CO.

J.M. Tarascon et al., "Performance of Bellcore's Plastic Rechargeable Li-Ion Batteries", Solid State Ionics, 86-88 (1996) 49-54.

J.Y. Song et al., "Review of Gel-Type Polymer Electrolytes for Lithium-Ion Batteries", J. Power Sources, 77 (1999) 183.

Australian Patent Office Written Opinion for Singapore Patent Application No. 200900646-1, mailed Dec. 1, 2009.

Huang et al., "Plasma Etching for Purification and Controlled Opening of Aligned Carbon Nanotubes," J. Phys. Chem. B, 2002, vol. 106(14), pp. 3543-3545.

Tsai et al., "Bias-enhanced nucleation and growth of the aligned carbon nanotubes with open ends under microwave plasma synthesis," Applied Physics Letters, Jun. 1999, vol. 74(23), pp. 3462-3464.

Examination Report for United Kingdom Patent Application No. GB0903437.2, dated Mar. 1, 2011, 4 pages.

McEwen, et al., "EMIPF6 Based Nonaqueous Electrolytes for Electrochemical Capacitors", Electrochemical Society Proceedings, 1997, vol. 96-25, pp. 313-324.

U.S. Appl. No. 13/113,971, filed May 23, 2011, Lu et al.

Ionic Liquids Product Range, EMD, Apr. 25, 2006, 12 pages found @ http://www.emdchemicals.com/showBrochure?id=200904.3312.

Official Action for United Kingdom Patent Application No. 0903437.2, dated Aug. 12, 2011 2 pages.

Notification of Grant for United Kingdom Patent Application No. GB2453907, dated Oct. 4, 2011 2 pages.

Kim et al. "Pseudocapacitive Properties of Electrochemically Prepared Vanadium Oxide on Carbon Nanotube Film Substrate," Journal of Electrochemistry Society, Jun. 2006, vol. 153, No. 8, pp. A1451-A1458.

Pushparaj et al. "Flexible energy storage devices based on nanocomposite paper," PNAS, Aug. 21, 2007, vol. 104, No. 34, pp. 13574-13577.

\* cited by examiner

| Ionic liquid | [EMIM][BF4] | [EMIM][CF3SO3] | [EMIM][Tf2n] |
|---|---|---|---|
| Structure | | | |
| Molecular Weight | 197.97 | 260.24 | 191.31 |
| Melting point (°C) | -50.0 | -12.0 | -17.0 |
| Decomposition temperature (°C) | 310 | 340 | 400 |
| Water miscibility | miscible | miscible | immiscible |
| Viscosity (cp, at 20°C) | 151.7 | 51.7 | 28.0 |
| Electromechanical window (V) | 4.05 | 4.09 | 4.28 |
| Ionic conductivity (mS/cm) | 7.56 | 4.54 | 4.85 |
| Anion size (nm)* | 0.45 | 0.51 | 0.65 |
| Cation size (nm)* | 0.6 | 0.6 | 0.6 |

*ionic diameters, calculated by Hyperchem® software

Fig. 27

HIGH PERFORMANCE ULTRACAPACITORS WITH CARBON NANOMATERIALS AND IONIC LIQUIDS

CROSS REFERENCE TO RELATED APPLICATION

The present application claims the benefits of U.S. Provisional Application Ser. Nos. 60/821,225, filed Aug. 2, 2006, entitled "Ionic Liquid-Incorporated Gel Polymer Electrolytes", and 60/863,271, filed Oct. 27, 2006, entitled "High Performance Ultracapacitors with Carbon Nanomaterials and Ionic Liquids", each of which is incorporated herein by this reference in their entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract Nos. DE-FG02-05ER84218 and DE-FG02-07ER84688 awarded by the Department of Energy and OII-0610919 awarded by the National Science Foundation

FIELD OF THE INVENTION

The invention relates generally to electrochemical devices and particularly to ultracapacitors.

BACKGROUND OF THE INVENTION

High performance energy storage devices are critical in advanced transportation technologies, e.g., electrical vehicles (EVs) and hybrid electrical vehicles (HEVs). This is extremely useful in achieving better fuel economy, decreasing harmful emissions, and reducing our nation's reliance on foreign sources of petroleum.

Ultracapacitors (aka, supercapacitors, Electrical Double-Layer Capacitor (EDLC), or electrochemical capacitors) are being developed as power assists for HEVs. Ultracapacitors are energy storage devices which combine the high-energy storage potential of batteries with the high-energy transfer rate and high recharging capabilities of capacitors. Ultracapacitors can have orders of magnitude more energy density than conventional capacitors and power density than batteries. Generally, ultracapacitors have energy densities in the range of about 1 to about 10 Wh/kg, which is about one-tenth of that of secondary batteries, which have energy densities of about 20 to about 100 Wh/kg and power densities in the range of about 1000 to about 2000 W/kg, which is about ten times higher than those of secondary batteries, which have power densities in the range of about 50 to about 200 W/kg.

Energy storage in ultracapacitors can be either Faradaic or non-Faradaic. A common type of Faradaic ultracapacitor is a redox ultracapacitor in which electrons are transferred across the electrode interface. Such ultracapacitors are based on mixed metal oxides, such as ruthenium dioxide and other transition metal oxides. For reasons of high cost, scarcity, and toxicity of suitable metal oxides, Faradaic ultracapacitors are generally not preferred in most applications. In non-Faradaic ultracapacitors, no electron transfer takes place across the electrode interface, and the storage of the electric charge and energy is electrostatic. Positive and negative charges accumulate electrostatically on the electrodes at the electrode-electrolyte interface. Electrical energy is stored in the electric double layer from charge separation, i.e., the electrostatic force between an ionically conducting electrolyte and a conducting electrode. The ions displaced in forming the double layers are transferred between electrodes by diffusion through the electrolyte.

In both Faradaic and non-Faradaic ultracapacitor systems, capacitance is dependent on the characteristics of the electrode material. Ideally, the electrode material should be electrically conducting and have a porous structure. The characteristics of the porous structure, including pore size, pore size distribution, and pore volume fraction, can enable the formation of a large amount of surface area that can be used either for the development of the electrical double layer for static charge storage to provide non-Faradaic capacitance or for the reversible chemical redox reaction sites to provide Faradaic capacitance.

A major obstacle to the applications of ultracapacitors to advanced HEVs is the limited performance (energy and power densities), unsafe operation, and short cycle life of ultracapacitors. These parameters are strongly determined by the poor properties of the currently employed electrode materials (e.g., low electrolyte accessibility and low capacitance) and electrolytes (e.g., narrow electrochemical window, flammability, toxicity, volatility, thermal instability, and electrolyte depletion).

There is thus a need for an ultracapacitor capable of providing high energy and power densities, safe operation, and long cycle lives. This will need improved properties for both the electrode and electrolyte materials over those employed in current ultracapacitor technology.

SUMMARY OF THE INVENTION

These and other needs are addressed by the various embodiments and configurations of the present invention. The present invention is directed generally to the use of Carbon NanoTubes (CNTs) and/or ionic liquid/polymer structures in various electrochemical devices, particularly ultracapacitors.

In a first embodiment of the present invention, an ultracapacitor is provided that includes:

(a) first and second electrodes, the first and second oppositely charged electrodes primarily comprising carbon nanotubes; and (b) an electrolyte material, comprising oppositely charged ions, in contact with first ends of the first and second electrodes, with most, if not all, of the first ends of the carbon nanotubes being open to permit the charged ions to access interior surfaces of the nanotubes and the sizes of the ions being less than interior diameters of the carbon nanotubes.

The carbon nanotubes are preferably aligned nanotubes having lengths of about 75 microns or longer, inter-carbon nanotube spacings ranging from about 5 to about 1,000 nm, and diameters ranging from about 0.25 to about 250 DM.

Use of perpendicularly aligned CNTs as electrode materials can significantly improve capacitor performance. Perpendicularly aligned CNTs can provide an enhanced specific surface area, improved charge transport capability, and excellent electrolyte accessibility, making them ideal electrode materials for high performance ultracapacitors.

Compared to randomly entangled CNTs, aligned CNTs can be better synthesized for ultracapacitor applications. Randomly entangled CNT-based electrodes are commonly prepared by blending the CNTs with an insulating polymer binder (at 5~10 wt %), e.g., poly(vinylidene fluoride), polytetrafluoroethylenel, or poly(vinylidene chloride). The use of an insulating polymer can lower electrical conductivity of the resulting electrodes, leading to low performance for the capacitors. In contrast, aligned CNTs can be grown as a film perpendicularly on a substrate, including metal substrates, without a polymer binder being required, thereby ensuring high electrical conductivity for the electrode. The aligned CNT structure should provide improved charge transport properties, as each of the constituent aligned CNTs can be connected directly onto a common electrode to maximize the charge mobility, i.e., participation of each individual tube in the charge/discharge of the capacitor. This indicates a combined charge capacity from all individual tubes of the aligned CNT electrode, and thus enhanced energy density for the capacitor. In turn, the stored energy can be delivered rapidly through each individual tube of the electrode, thereby providing excellent power density for the capacitor.

Compared to randomly entangled CNTs, aligned CNTs can have better defined pore structures and higher specific surface areas. The surface area of randomly entangled CNTs is determined by the open space between entangled fibrils. Similarly, the surface area of aligned CNTs is determined by the open space between highly aligned tubes. The inter-CNT open space is in the range of tens of nanometers, indicating high mesoporosity and electrolyte accessibility. The aligned structure can provide a well-defined surface area for each of the constituent CNTs to be accessible to the electrolyte molecules, resulting in higher surface area for aligned CNTs. Moreover, under appropriate plasma conditions, the top endcaps of aligned CNTs can be properly opened without any observable structural change for the sidewalls. Once opened, the aligned structure allows access to the inner cavity of each of the constituent aligned CNTs collectively through a conducting substrate, thereby introducing additional mesoporosity to the electrode. The diameters of the opened tubes (up to tens of nanometers) are commonly larger than the sizes (ionic diameters) of the charged electrolyte ions. The well-defined alignment, in connection with the tip-opened structure, can impart to the aligned CNTs a higher specific surface area than that of randomly entangled CNTs. Higher specific surface area in turn translates into enhanced energy density for ultracapacitors.

Mesoporosity can be important to realizing high capacitance for the electrode and high performance for the ultracapacitor. As will be appreciated, the capacitance of conventional carbon-based electrodes decreases gradually with increasing discharging current density. This is so because currents, which are too large, may block the entrances of the micropores. Therefore, the energy stored can be withdrawn only at limited discharge rates and at low frequencies or by Direct Current ("DC") techniques. In contrast, due to the high mesoporosity and enhanced electrolyte accessibility of aligned CNTs, fast charge injection and withdrawal are feasible for CNTs, meaning high capacitance at high frequencies. In other words, the overall enhanced mesoporosity (from both internal and external walls of tubes) and electrolyte accessibility of aligned CNTs can result in even higher capacitance and performance than capacitors fabricated from randomly entangled CNTs.

In a second embodiment, an ultracapacitor is provided that includes:
(a) first and second carbon-based electrodes; and
(b) a solid-phase electrolyte material comprising an ionic liquid and a polymer host, the polymer host forming a self-supporting film comprising the ionic liquid.

Preferably, the ionic liquid includes one or more cations selected from the group consisting essentially of pyridinium, pyridazinium, pyrimidinium, pyrazinium, imidazolium, pyrazolium, thiazolium, oxazolium, triazolium, ammonium, pyrrolidinium, pyrrolinium, pyrrolium, piperidinium, phosphonium, and mixtures thereof and one or more anions selected from the group consisting essentially of $F^-$; $Cl^-$, $Br^-$; $I^-$; $NO_3^-$; $N(CN)_2^-$; $BF_4^-$; $ClO_4^-$; $PF_6^-$; $RSO_3^-$; $RCOO^-$; where R is an alkyl group, substituted alkyl group, or phenyl group; $(CF_3)_2PF_4^-$, $(CF_3)_3PF_3^-$, $(CF_3)_4PF_2^-$, $(CF_3)_5PF^-$, $(CF_3)_6P^-$, $(CF_2SO_3^-)_2$, $(CF_2CF_2SO_3^-)_2$, $(CF_3SO_2^-)_2N^-$, $CF_3CF_2(CF_3)_2CO^-$, $(CF_3SO_2^-)_2CH^-$, $(SF_5)_3C^-$, $(CF_3SO_2)_3C^-$, $[O(CF_3)_2C_2(CF_3)_2O]_2PO^-$, $(CF_3(CF_2)_7SO_3^-$, and mixtures thereof.

Preferably, the polymer host is selected from the group consisting essentially of homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof.

The solid-phase electrolyte material can include a substantially nonconductive, inorganic filler having a surface area of at least about 10 m²/g, a maximum dimension of about 50 micrometers, and an average pore size of less than about 10 micrometers.

In a third embodiment, a method is provided that includes the steps:
(a) contacting a polymer host with an organic solvent to form a first composition;
(b) contacting an ionic liquid with the first composition; and
(c) removing at least most of the organic solvent from the first composition to form a freestanding film comprising the polymer host and ionic liquid.

The polymer host is dissolved substantially in the first composition, and the organic solvent is removed from the first composition by heating the first composition to a selected temperature under a vacuum. The selected temperature is preferably higher than a boiling point of the solvent but lower than decomposition temperatures of the ionic liquid and polymer host.

In a fourth embodiment, a method is provided that includes the steps:
(a) first forming a self-supporting polymer film comprising a host polymer.
(b) second contacting the film with an ionic liquid; and
(c) heating the film and ionic liquid, while in contact with one another, to a selected temperature above a glass transition temperature of the polymer host but below decomposition temperatures of the ionic liquid and polymer host to impregnate the polymer film with the ionic liquid.

The present invention can provide a number of advantages depending on the particular configuration. For example, the combination of an ionic liquid and a polymer host can provide environmentally friendly solid-state electrolytes suitable for use in high performance and stable electrochemical devices. Environmentally stable ionic liquids can have attractive properties, including high ionic conductivity, large electrochemical window, excellent thermal and chemical stability, nonvolatility, non-flammability, non-toxicity, and negligible electrolyte depletion and are readily combinable with well-developed Gel Polymer Electrolyte (GPE) technology to provide an environmentally friendly, solid-state, Ionic Liquid-incorporated, Gel Polymer Electrolyte (ILGPE). Being solid-state, ILGPEs can possess distinct advantages over liquid electrolytes, including reduced reactivity, reduced leakage, improved safety, better shape flexibility, better processing characteristics, and better manufacturing integrity. In a conventional GPE, an organic solvent is needed as the plasticizer. In an ILGPE, the ionic liquid acts as both the salt and the solvent (plasticizer) without a conventional organic solvent. Absence of the environmentally unstable organic solvents in the ILGPE ensures the improved stability of ILGPEs over conventional GPEs. The combination of the unique properties of aligned CNTs (e.g., high electrical conductivity, high specific surface area, high charge transport capability, and high electrolyte accessibility) as electrodes with the unique properties of environmentally friendly ionic liquids (e.g., high ionic conductivity, large electrochemical window, excellent thermal stability, non-volatility, non-flammability, non-toxicity, and negligible electrolyte depletion) as electrolytes can overcome the limitations of currently available ultracapacitors, achieve high performance and long cycle life, and are capable of delivering high power pulses that can satisfy the requirements for Hybrid Electric Vehicles (HEVs).

These and other advantages will be apparent from the disclosure of the invention(s) contained herein.

As used herein, the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Alkyl" refers to monovalent alkyl groups preferably having from 1 to 8 carbon atoms and more preferably 1 to 6 carbon atoms. An alkyl group is typically a paraffinic hydrocarbon group, which may be derived from an alkane by dropping one hydrogen from the formula. Examples are methyl, ethyl, n-propyl, iso-propyl, n-butyl, iso-butyl, n-hexyl, and the like.

"Aryl" refers to an unsaturated aromatic carbocyclic group of from 6 to 14 carbon atoms having a single ring (for example phenyl) or multiple condensed rings (for example naphthyl or anthryl). Preferred aryls include phenyl, naphthyl, and the like.

The terms "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

An ionic liquid is generally understood to be a liquid composed almost entirely, if not completely, of ions. An ionic liquid commonly acts as both a salt and solvent or is said to be 100% salt and 100% solvent. Ionic liquids are liquid even at low temperatures (<100 degrees Celsius), cannot decompose at high temperatures (>400 degrees Celsius), and have relatively high viscosities.

"Polymer" refers to both polymers and copolymers. Copolymers include all polymers having more than one monomer type. Copolymers therefore include terpolymers, tetrapolymers, and other polymers with multiple monomer types.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 27 is a table listing ionic liquid structures and characteristics;

DETAILED DESCRIPTION

Figure 1:
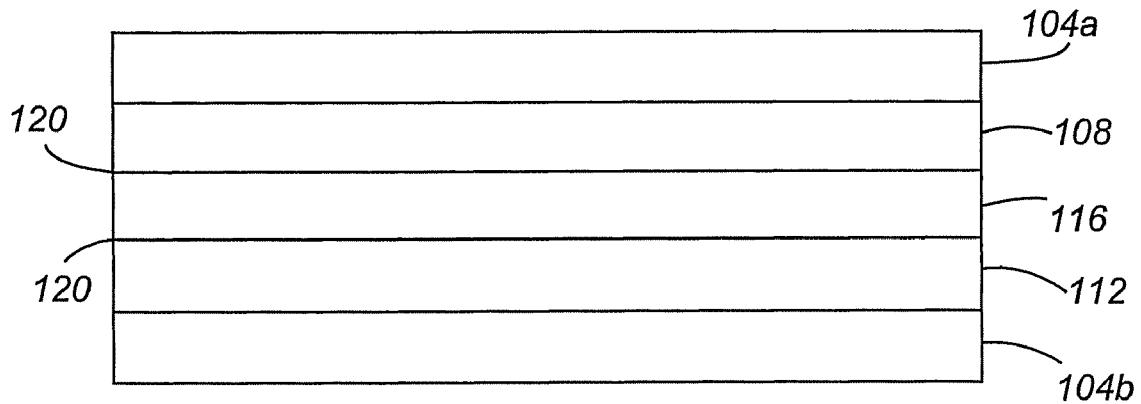
FIG. 1 is a side view of an ultracapacitor according to an embodiment of the present invention.

An electrochemical device according to a first embodiment of the present invention is shown in FIG. 1. The device is a Faradaic or non-Faradaic ultracapacitor 100 comprising first and second current collectors 104a,b, anode 108, cathode 112, and Ionic Liquid-incorporated Gel Polymer Electrolyte (ILGPE) 116 positioned between the anode 108 and cathode 112. As will be appreciated, the ultracapacitor can be of other designs, including, without limitation, stacked and spiral-wound configurations. Additionally, the anode and cathodes can act both as electrode and current collector, thus, eliminating the need for separate current collectors.

The first and second conductive collectors 104a,b are any highly conductive or superconductive material. Examples include conductive metals (e.g., copper, aluminum, nickel, and stainless steel), superconductive ceramics, and the like.

The anode 108 and cathode 112 electrodes can be any material having relatively high degrees of electrolyte accessibility and high capacitance. The electrodes can be, for example, high-surface-area activated carbons or carbon nanotubes, transition metal oxides, and electroactive polymers. As noted, in carbon-based ultracapacitors the charge is stored in an electrical double layer formed at the interface between the electrolyte and electrode (i.e., double layer capacitance).

In a particularly preferred configuration, the electrodes are formed primarily from aligned or nonaligned single- or multi-walled carbon nanotubes, with aligned carbon nanotubes being preferred. Even more preferably, at least about 75% by volume of each electrode is formed from CNTs. The electrodes can also be formed by mixing CNTs with high surface area activated carbons (ACs), forming the CNT/AC composite electrodes that combine the advantages of high electrolyte accessibility of CNTs and high surface area of ACs. This can deduce a high capacitance for the composite electrodes. Moreover, an ionic liquid can be further introduced into this two-component system to fabricate a CNT/AC/IL composite electrode. Presence of the ionic liquid in the resultant three-component composite electrode can provide a facilitated ion transport pathway so as to further improve capacitance and charge delivery capability for the electrode. Carbon nanotubes are generally categorized as Single-Wall carbon NanoTubes (SWNT) and Multi-Wall carbon NanoTubes (MWNT). SWNT are fullerenes consisting essentially of sp²-hybridized carbon typically arranged in hexagons and pentagons. These carbon cylindrical structures, known commonly as "buckytubes," have extraordinary properties, including both high electrical and thermal conductivity, as well as high strength and stiffness. Multi-wall carbon nanotubes are nested single-wall carbon cylinders formed by rolling up additional graphene tubes around a core of an SWNT and possess some properties similar to single-wall carbon nanotubes.

Figure 2:
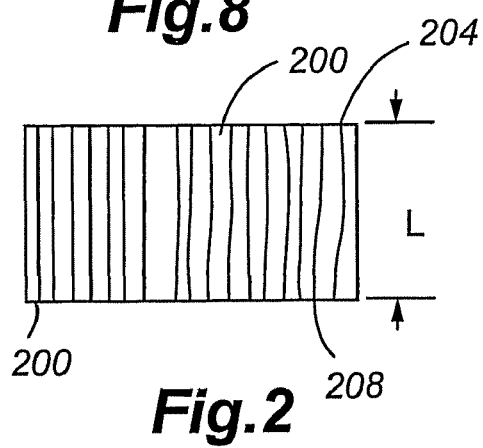
FIG. 2 is an exploded view of a portion of an electrode of FIG. 1.
Figure 3:
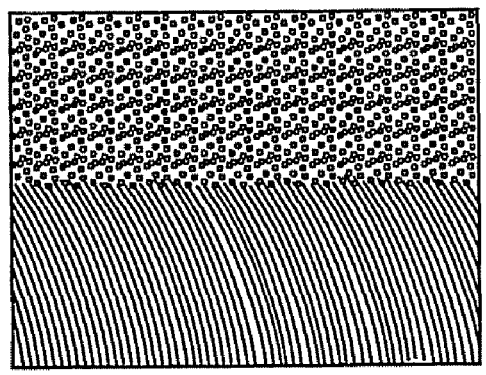
FIG. 3 is a Scanning Electron Microscope (SEM) image of perpendicularly aligned CNTs.
Figure 4:
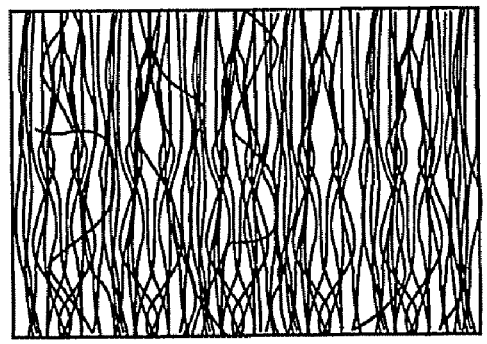
FIG. 4 is a high magnification SEM image of perpendicularly aligned CNTs of FIG. 3.
Figure 5:
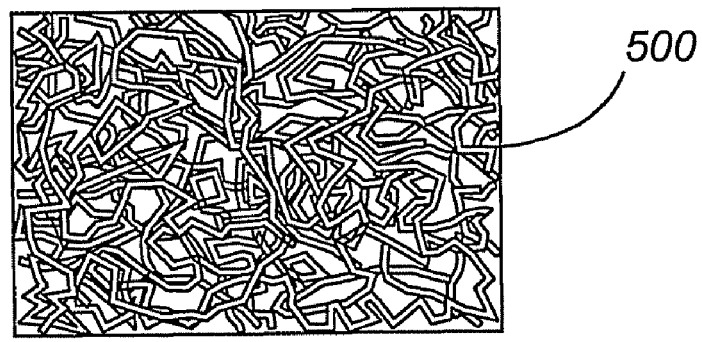
FIG. 5 is an SEM of randomly entangled CNTs.

Morphologically, CNTs can be produced in randomly entangled and aligned forms. By way of illustration, aligned CNTs 200 are depicted in FIGS. 2-4. As can be seen from this figures, the longitudinal axes of the individual CNTs are substantially parallel to one another along substantially their entire lengths very much like the fibers on a brush. The longitudinal axes are normal or perpendicular to the planar interface 120 between the electrode and ILGPE 116. In contrast, FIG. 5 shows randomly entangled CNTs 500 in which the longitudinal axes of the individual CNTs are not substantially parallel to one another along their entire lengths. SWNTs and MWNTs can provide high electrical conductivity, high surface area, high mesoporosity, and high electrolyte accessibility. As will be appreciated, mesopores (2 to 50 nm) are accessible by organic electrolytes and contribute the most to capacitance in an EDLC. While not wishing to be bound by any theory, it is believed that aligned or patterned CNTs (due to their well-defined spacing between tubes) are even more accessible by electrolytes, particularly organic electrolytes.

Compared to high-surface-area activated carbons, CNTs possess moderate specific surface area (~400 m$^2$/g for randomly entangled CNTs). Nevertheless, much higher capacitance (up to 200 F/g) has been demonstrated for CNTs, in contrast to that of only tens of F/g for good activated carbons. Based on the commonly realizable charge densities of 20–50 µF/cm$^2$ for activated carbon-based EDLCs, the capacitance for CNT-based EDLCs (using a CNT specific surface area of about 357 m$^2$/g) is normally at least about 70 F/g and more preferably ranges from about 71 to about 200 F/g.

Figure 6:
FIG. 6 is an SEM of aligned CNTs after plasma-treatment to open the top end-caps of the CNTs.
Figure 7:
FIG. 7 is an SEM of aligned CNTs before plasma-treatment showing the occluded top end-caps of the CNTs.

To provide optimal results, the ends or tips of the CNTs are preferably removed by etching to "open up" the interior of the CNTs to the electrolyte, thereby effectively doubling the electrolyte-accessible surface area of the CNT-based electrode. Etching also purifies CNTs by eliminating residual catalysts. With etching CNTs can have an electrolyte-accessible surface area of at least about 800 m$^2$/g. FIG. 7 depicts CNTs prior to etching, and shows that the tips or ends are occluded. FIG. 6 shows CNTs after etching and shows that the ends or tips of the CNTs are opened. In the absence of etching, CNTs display low capacitance and impurity peaks due to the presence of residual catalysts. To provide effective electrolyte access, the diameters of the CNTs must exceed the molecular size(s) of the cations and anions in the electrolyte. In multi-layered CNTs, the annular space between the inner and outer CNT walls, or difference between the outer CNT diameter and inner CNT diameter, preferably is larger than the molecular size(s) of the cations and anions. Preferably at least one and more preferably both of the upper and lower surfaces 204 and 208 of each electrode are etched to remove substantially the tips or ends of at least most of the CNTs. Although etching one surface can increase the capacitance, it fails to remove substantially completely catalysts remaining from CNT fabrication. Etching both surfaces can not only further increase the capacitance but also remove, substantially completely, catalysts and other impurities.

The lengths of the CNTs influences the overall specific surface area of the CNTs and charge storage capability (capacitance) of the electrodes. The lengths "L" of the CNTs, or thickness of each electrode, preferably are at least about 75 microns and more preferably range from about 150 to about 200 microns. The inter-CNT spacing preferably ranges from about 5 to about 1,000 nanometers and even more preferably from about 10 to 500 of nanometers. The CNT diameter preferably ranges from about 5 to about 250 nm and even more preferably from about 10 to about 100 nm.

Carbon nanotubes can be made by known methods, such as by gas-phase synthesis from high temperature, high pressure carbon monoxide, catalytic vapor deposition using carbon-containing feedstocks and metal catalyst particles, laser ablation, the arc method, or any other method for synthesizing single-wall carbon nanotubes. Preferred methods are chemical vapor deposition to grow random CNTs and plasma-enhanced chemical vapor deposition to grow aligned CNTs. The carbon nanotubes can be used as synthesized or after purification. Metals, such as Group VIB and/or VIIIB, are possible catalysts for the synthesis of carbon nanotubes. In one configuration, the CNTs are grown directly on conductive substrates, which are later used as the current collectors in the ultracapacitor.

Figure 8:
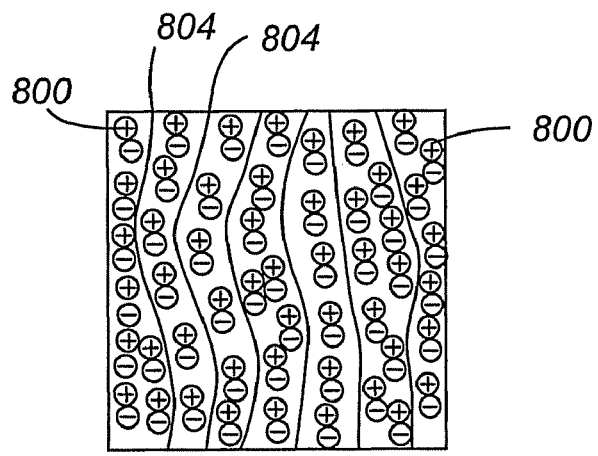
FIG. 8 is an exploded view of a portion of the ILGPE layer of FIG. 1.

Returning to FIGS. 1 and 8, the ILGPE layer 116 includes an electrolyte, preferably an ionic liquid, 800 and a microporous and permeable polymer host 804. The polymer host 804 provides a structurally stable and solid carrier for the ionic liquid, thereby providing a solid-state ultracapacitor. The thickness of the layer 116 preferably is at least about 5 microns and preferably ranges from about 10 to about 200 microns. Alternatively, the layer 116 can be replaced by electrolytes other than ionic liquids, with or without the polymer host 804.

The ionic liquid can be any suitable electrochemically stable, water miscible and immiscible (with immiscible being preferred) ionic liquid having a relatively low melting point (e.g., preferably less than about 100 degrees Celsius and more preferably no more than about –10 degrees Celsius), a relatively high decomposition temperature (e.g., preferably greater than about 200 degrees Celsius and even more preferably greater than about 300 degrees Celsius), a low viscosity (e.g., preferably no more than about 200 Cp and even more preferably ranging from about 5 to about 150 Cp), a relatively high ionic conductivity (e.g., preferably at least about 0.1, more preferably at least about 1, and even more preferably ranging from about 1 to about 100 mS/cm) and a wide electrochemical window (e.g., preferably at least about 2 Volts, more preferably at least about 3 Volts, and even more preferably ranging from about 3.5 to about 10 Volts).

Figure 9:
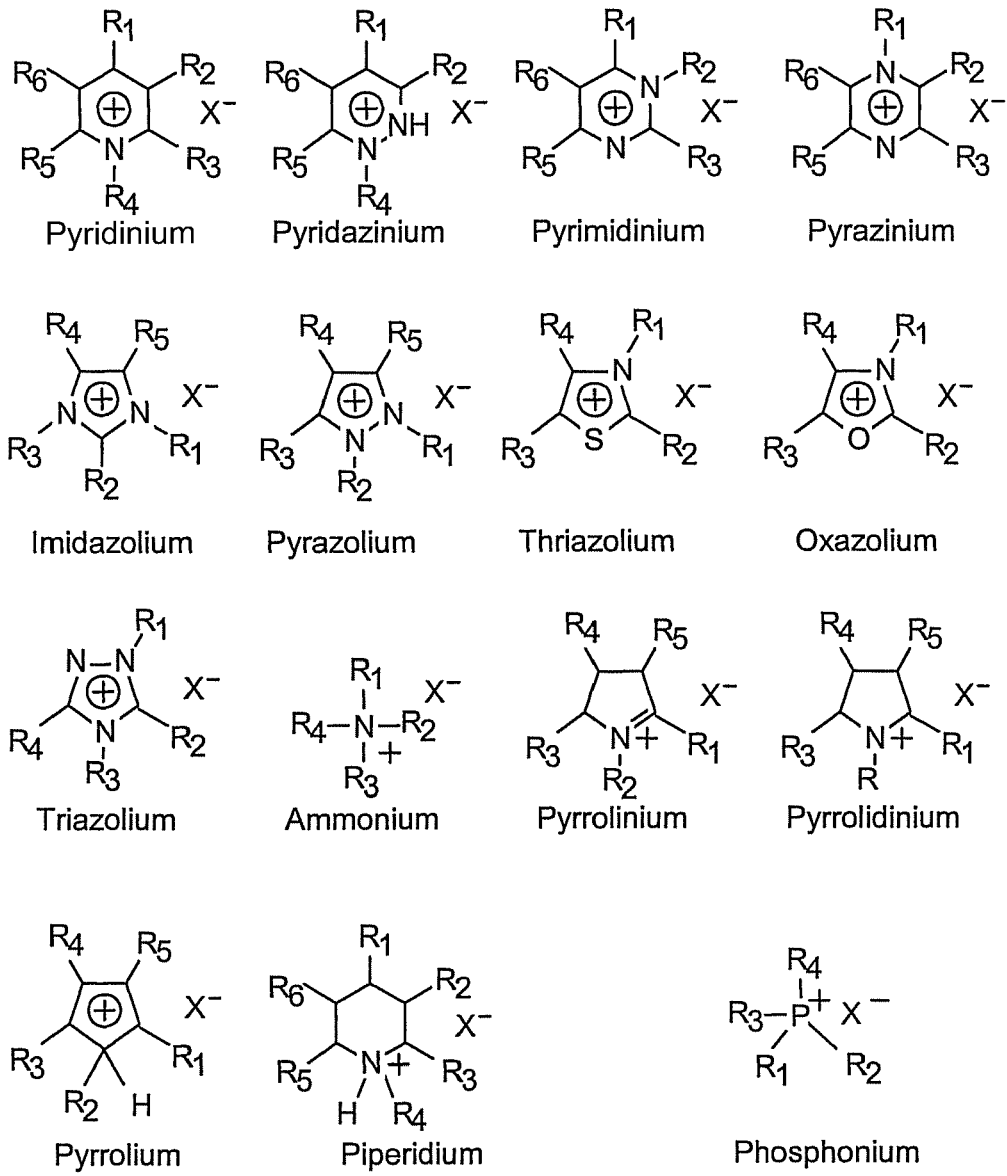
FIG. 9 shows examples of ionic liquids based on various monocations.
Figure 10:
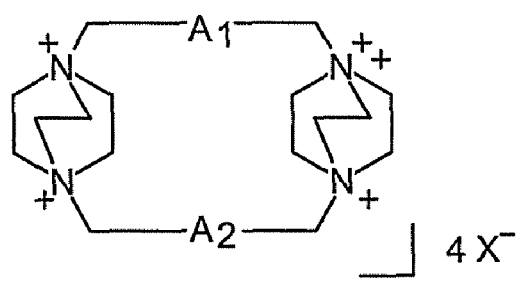
FIG. 10 shows examples of ionic liquids based on various polycations.
Figure 10:
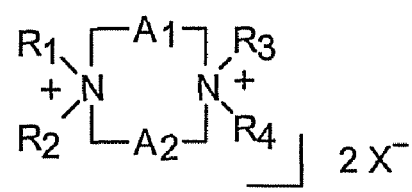
Figure 10:
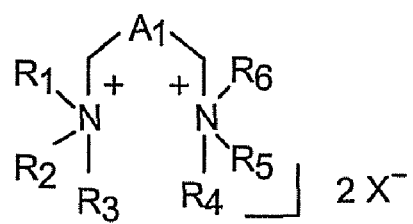
Figure 10:
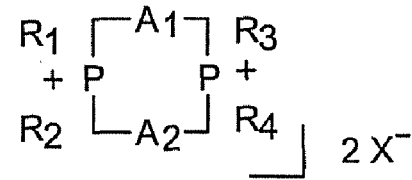

FIG. 9 shows examples of suitable ionic liquids based on various monocations, while FIG. 10 shows examples of suitable ionic liquids based on polycations. The $R_1$, $R_2$, $R_3$, $R_4$, $R_5$, and $R_6$ of the cationic components are identical or different and are preferably selected from the group consisting essentially of:

(a) a hydrogen (—H)
(b) a halogen (—Cl, —Br, —I, or —F)
(c) a hydroxyl (—OH)
(d) an amine (—NH$_2$)
(e) a thiol (—SH)
(f) a $C_1$ to $C_{2-5}$ straight-chain, branched aliphatic hydrocarbon radical
(g) a $C_5$ to $C_{30}$ cycloaliphatic hydrocarbon radical
(h) a $C_6$ to $C_{30}$ aromatic hydrocarbon radical
(i) a $C_7$ to $C_{40}$ alkylaryl radical
(j) a $C_2$ to $C_{25}$ linear or branched aliphatic hydrocarbon radical having interruption by one or more heteroatoms, such as, oxygen, nitrogen or sulfur
(k) a $C_2$ to $C_{25}$ linear or branced aliphatic hydrocarbon radical having interruption by one or more functionalities selected from the group consisting essentially of:
    a. a carbonyl (—C(O)—)
    b. an ester (—C(O)O—)
    c. an amide (—C(O)NR'—), where R' selected from the group consisting essentially of hydrogen, $C_1$-$C_{12}$ straight-chain, branched or cyclic alkane or alkene
    d. a sulfonate (—S(O)$_2$O—)
    e. a sulfonamide (—S(O)$_2$NR'—), where R' selected from the group consisting essentially of hydrogen, $C_1$-$C_{12}$ straight-chain, branched or cyclic alkane or alkene
(l) a $C_2$ to $C_{25}$ linear or branced aliphatic hydrocarbon radical terminally functionalized by Cl, Br, F, I, NH, OH, NH$_2$, NHCH$_3$ or SH
(m) a $C_5$ to $C_{30}$ cycloaliphatic hydrocarbon radical having at least one heteroatom selected from the group consisting essentially of O, N, S, and optionally substituted with at least one of the following Cl, Br, F, I, NH, OH, NH$_2$, NHCH$_3$ or SH
(n) a $C_7$ to $C_{40}$ alkylaryl radical heteroatom selected from the group consisting essentially of O, N, S, and optionally substituted with at least one of the following
    a. a $C_2$ to $C_{25}$ straight-chain, branched hydrocarbon radical substituted with at least one of the following Cl, Br, F, I, NH, OH, NH$_2$, NHCH$_3$ or SH b. a $C_5$ to $C_{30}$ cycloaliphatic hydrocarbon radical substituted with at least one of the following Cl, Br, F, I, NH, OH, $NH_2$, $NHCH_3$ or SH
c. a hydroxyl
d. an amine
e. a thiol
(o) a polyether of the type —O—(—$R_7$—O—)$_n$—$R_8$ or block or random type —O—(—$R_7$—O—)$_n$—(—$R_{7'}$—O—)$_n$—R where
  a. $R_7$ is a linear or branched hydrocarbon radical having from 2 to 4 carbon atoms
  b. $R_{7'}$ is a linear or branched hydrocarbon radical having from 2 to 4 carbon atoms
  c. n is from 1 to 40
  d. $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical
(p) a polyether of the type —O—(—$R_7$—O—)$_n$—C(O)—$R_8$ or block or random type —O—(—$R_7$—O—)$_n$—(—$R_7$—O—)$_m$—C(O)—$R_8$ where
  a. $R_7$ is a linear or branched hydrocarbon radical having from 2 to 4 carbon atoms
  b. $R_{7'}$ is a linear or branched hydrocarbon radical having from 2 to 4 carbon atoms
  c. n is from 1 to 40
  d. $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical.

The anionic component is preferably selected from the group consisting essentially of:
(a) halides, i.e., chloride, bromide, and iodide, preferably iodide
(b) phosphates
(c) halophosphates, preferably hexafluorophosphate
(d) alkylated phosphates
(e) nitrate
(f) sulfates, i.e., hydrogen-sulfate
(g) allyl sulfates, preferably octyl sulfate
(h) aryl sulfates
(i) perfluorinated alkyl sulfates
(j) perflorinated alkyl ether sulfates
(k) halogenated alkyl sulfates
(l) perfluorinated aryl sulfates
(m) perflorianted aryl ether sulfates
(n) sulfonates
(o) allylsulfonates
(p) arylsulfonates
(q) perfluorinated allyl- and arylsulfonates, preferably triflate (or trifluoromethan sulfonate)
(r) perfluorinated alkyl ether and aryl ether sulfonates
(s) halogenate alkyl- and arylsulfonates,
(t) perchlorate
(u) tetrachloroaluminate
(v) tetrafluoroborate
(w) alkylated borates, preferably $B(C_2H_5)_3C_6H_{13}^-$
(x) tosylate
(y) saccharinate
(z) alkyl carboxylates, and
(aa) bis(perfluoroalkylsulfonyl)amide anions, preferably the bis(trifluoromethylsulfonyl)amide anion, or is
(bb) a mixture of two or more of these anionic species.

In one preferred embodiment of the polymer composition of the invention, the ionic liquid has halogen-free anions selected from the group consisting essentially of phosphate, alkyl phosphates, nitrate, sulfate, alkyl sulfates, aryl sulfates, sulfonate, alkylsulfonates, arylsulfonates, alkyl borates, tosylate, saccharinate, and alkyl carboxylates, particular preference being given to allyl sulfates, in particular octyl sulfate, and to tosylate.

In another preferred embodiment of the polymer composition of the invention, the ionic liquid has various anions and/or cations. The ionic liquids used by way of example as plasticizers may therefore be used individually or in a mixture in the polymer composition of the invention.

Ionic liquids based on polycations are formed when monocations are joined together; FIG. 10 shows monocations joined to form polycationic ring structures, where $A_1$ and $A_2$ are allylene groups and substituted alkylene groups. The anion $X^-$ includes, without limitation, but is not limited to, $F^-$; $Cl^-$, $Br^-$; $I^-$; $NO_3^-$; $BF_4^-$; $N(CN)_2^-$; $BF_4^-$; $ClO_4^-$; $PF_6^-$; $RSO_3^-$; $RCOO^-$, where R is an alkyl group; substituted alkyl group; phenyl group; $(CF_3)_2PF_4^-$, $(CF_3)_3PF_3^-$, $(CF_3)_4PF_2^-$, $(CF_3)_5PF^-$, $(CF_3)_6P^-$, $(CF_2SO_3^-)_2$, $(CF_2CF_2SO_3^-)_2$, $(CF_3SO_2^-)_2N^-$, $CF_3CF_2(CF_3)_2CO^-$, $(CF_3SO_2^-)_2CH^-$, $(SF_5)_3C^-$, $(CF_3SO_2 SO_2)_3C^-$, $[O(CF_3)_2C_2(CF_3)_2O]_2PO^-$, and $CF_3(CF_2)_7SO_3^-$. Preferably, the ionic liquid is a composition having at least one cation selected from the group consisting essentially of pyridinium, pyridazinium, pyrimidinium, pyrazinium, imidazolium, pyrazolium, thiazolium, oxazolium, triazolium, ammonium, pyrrolidinium, pyrrolinium, pyrrolium, and piperidinium and at least one anion selected from the group consisting essentially of $F^-$; $Cl^-$, $Br^-$; $I^-$; $NO_3^-$; $N(CN)_2^-$; $BF_4^-$; $ClO_4^-$; $PF_6^-$; $RSO_3^-$; $RCOO^-$; where R is an alkyl group, substituted alkyl group, or phenyl group; $(CF_3)_2PF_4^-$, $(CF_3)_3PF_3^-$, $(CF_3)_4PF_2^-$, $(CF_3)_5PF^-$, $(CF_3)_6P^-$, $(CF_2SO_3^-)_2$, $(CF_2CF_2SO_3^-)_2$, $(CF_3SO_2^-)_2N^-$, $CF_3CF_2(CF_3)_2CO^-$, $(CF_3SO_2^-)_2CH^-$, $(SF_5)_3C^-$, $(CF_3SO_2)_3C^-$, $[O(CF_3)_2C_2(CF_3)_2O]_2PO^-$, and $CF_3(CF_2)_7SO_3^-$. Particularly preferred ionic liquids include 1-ethyl-3-methylimidazolium bis(trifluoromethylsulfonyl)imide ([EMIM] [$Tf_2N$]).

The polymer host can be any thermoplastic or thermosetting polymer having a melting point of at least about 60 degrees Celsius and a high solubility in a selected low boiling point (organic) solvent. When thermosetting polymers are used, the polymer preferably cross-links at a temperature below the decomposition temperature of the ionic liquid and/or in response to ultraviolet light or heat. Thermosetting polymers, when cross-linked, form three-dimensional polymer networks through which the ionic liquid can move. Cross-linked polymers do not crystallize and have the advantage of superior dimensional stability and mechanical strength. When thermoplastic polymers are used, the polymer preferably melts at a temperature above the decomposition temperature of the ionic liquid.

The polymer host can be any suitable high molecular weight polymer. Examples of suitable host polymers include homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polylcetones/thioketones, polysulfones/sulfoxides/sulfonates/sulfoamides, polyphylenes, and mixtures thereof.

Figure 11:
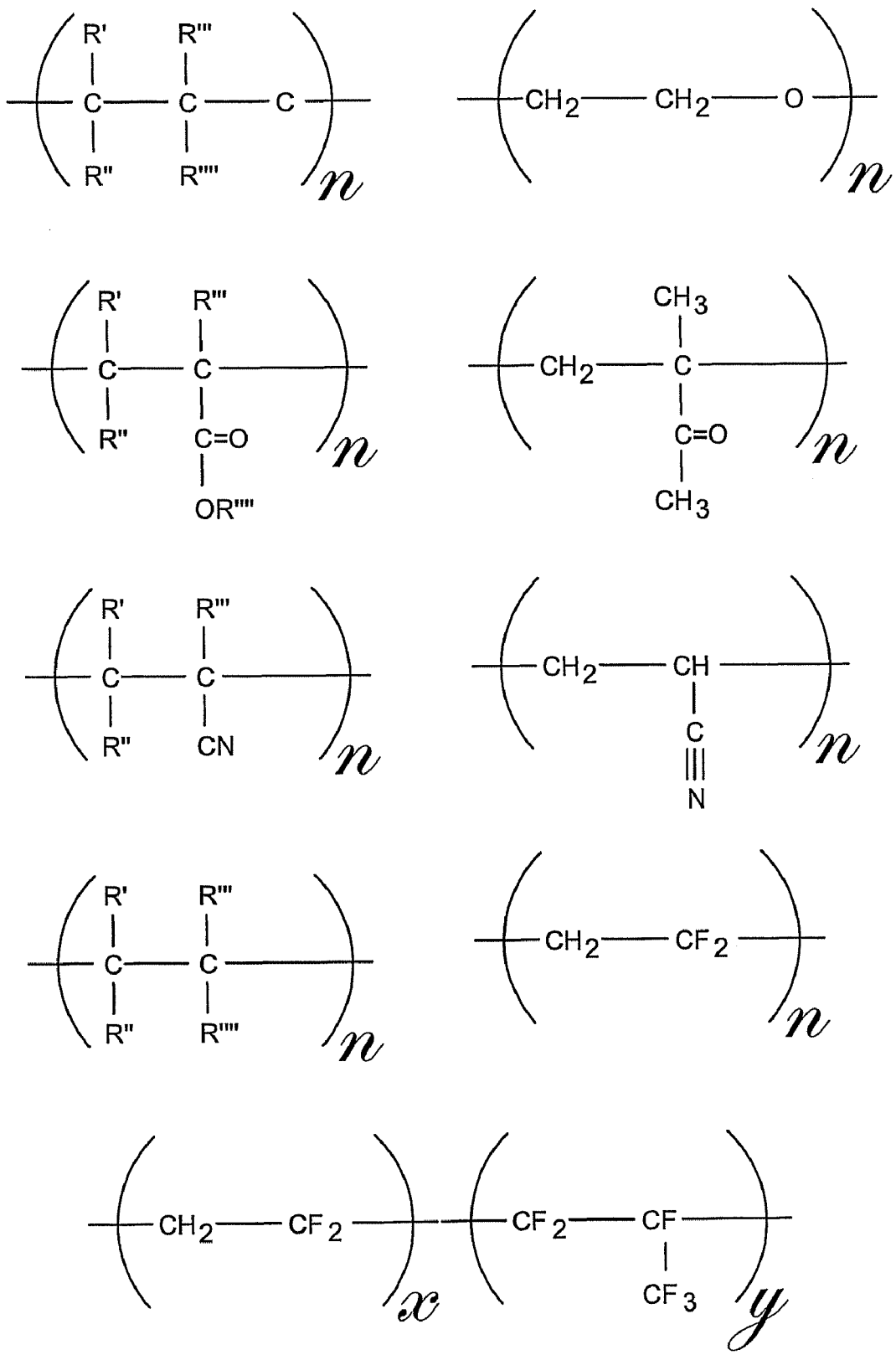
FIG. 11 shows examples of polymer hosts.

Preferred polymers are semicrystalline or amorphous polymers having no ionic groups. Examples of suitable host poly mers are shown in FIG. 11. Particularly preferred host polymers include:

Polyoxides formed by the homo- or co-polymerization of alkylene oxides, R'R"C(O)CR'"R"", where R', R", R'", and R"" can separately be hydrogen and/or a $C_1$-$C_{18}$ linear or branch alkyl group, or a $C_2$-$C_{26}$ cyclic alkyl and/or aryl group, wherein the cyclic or aryl group can contain at least hetero atom selected from the group consisting essentially of O, N and S and wherein the cyclic and/or acyclic alkyl group can be saturated or unsaturated. Preferred the linear or branched allyl groups are $C_1$-$C_4$. The most preferred polyoxide is poly(ethylene oxide) (PEO).

Polyacrylics formed by the homo- or co-polymerization of:
acrylic acid or its derivatives: R'R"C=CR'"C(=O)OR"", and/or R'R"C=CR'"C(=O)SR"", and/or R'R"C=CR'"C(=O)NR""R'""; and/or
acrylontrile, R'R"C=CR'"CN,
where R', R", R'", R"", and R'"" can be hydrogen and/or a $C_1$-$C_{18}$ linear or branch alkyl group, or a $C_2$-$C_{26}$ cyclic alkyl and/or aryl group, wherein the cyclic or aryl group can contain at least hetero atom selected from the group consisting essentially of O, N and S, and wherein the cyclic and acyclic allyl group may be saturated or unsaturated. Preferred linear or branched alkyl groups are $C_1$-$C_{12}$, and the more preferred are $C_1$-$C_6$ linear or branched alkyl groups. The most preferred are methyl methacrylate homopolymer and acrylonitrile homopolymer.

Polyhalo-olefins formed by the homo- or co-polymerization of holgenated olefins, R'R"C=CR'"R"", where R', R", R'", and R"" that can independently be:
a hydrogen,
a halogen,
a $C_1$-$C_{18}$ linear or branched, saturated or unsaturated, alkyl group that may be partially or fully halogenated,
a $C_2$-$C_{26}$ cyclic, saturated or unsaturated, alkyl group and/or aryl group, the cyclic alkyl or aryl group may be partially or fully halogenated.

A preferred linear or branched allyl group is $C_1$-$C_{12}$ that can be partially or fully halogenated. The more preferred halogen is fluoride and the more preferred linear or branched alkyl group is $C_1$-$C_{12}$ that can be halogenated, wherein the alkyl group may be partially or fully halogenated. The most preferred are poly(vinyldiene fluoride) where R' and R" are hydrogen and R'" and R"" are fluoride, and poly(vinyldiene fluoride-co-hexafluoropropylene), a co-polymer wherein one component is R' and R" are hydrogen and R'" and R"" are fluoride and the other component is R', R", R'" are fluoride and R"" is trifluoromethyl.

For any polymer formula "N" refers to the number of repeating units in the polymer chain and typically is at least 25 and even more typically ranges from 50 to 50,000. "X" and "Y" is an integer value preferably in the range of 3 to 1,000. "X" and "Y" may, of course, have different values.

Particularly preferred polymer hosts include poly(ethylene oxide) (PEO), polyacrylonitrile (PAN), poly(methyl methacrylate) (PMMA), poly(vinylidene fluoride) (PVdF), and poly(vinylidene fluoride-co-hexafluoropropylene) (PVdF-HFP), with PAN and PVdF-HFP being even more preferred. PAN and PVdF, have relatively high thermal stability. In addition, PVdF-based polymer electrolytes are highly anodically stable due to the strongly electron-withdrawing functional group —C—F. PVDF co-polymerized with hexafluoropropylene (PVdF-HFP), can be used to improve the gel properties of the polymer electrolytes because of its greater solubility in organic solvents, lower crystallinity, and lower glass transition temperature than the PVdF polymer alone in the gel.

In a preferred polymer composition, the mass ratios of ionic liquid to polymer host range from about 0.1:1 to about 1:1 and even more preferably from about 0.1:1 to about 10:1. Stated another way, the ILGPE layer 116 preferably comprises from about 9 to about 50 and even more preferably from about 9 to about 90 wt. % ionic liquid, with the remainder being the polymer host.

The ionic liquid can include additives to provide more desirable electrochemical properties. By way of example, viscosity reducers can be added to the ionic liquid to lower viscosity and increase ionic conductivity for ILGPEs. Examples of potential viscosity reducers include propylene carbonate, ethylene carbonate, dimethylformamide, and acetonitrile.

In an alternative configuration, the layer 116 includes an inorganic filler in addition to the ionic liquid and polymer host. The filler increases the mechanical strength of the ILGPE layer 116 and decreases the level of crystallinity of the polymer host. Introduction of inorganic fillers disrupts polymer chain packing (and crystallinity) and thus enhances ionic conductivities for the ILPGE layer 116. The filler preferably has a high surface area (e.g., preferably a surface area of at least about 10 and more preferably ranging from about 10 to about 500 $m^2$/g) and electrochemical inertness (e.g., is insulative or nonconductive) to avoid shorting the opposing electrodes. Preferred fillers include zeolites, metal oxides such as $ZrO_2$, $TiO_2$, and $Al_2O_3$, hydrophobic fumed silica, fiberglass, silicates, cellulosic materials, lignin, diatomaceous earth, and mixtures thereof. At least most of the filler particles, and more preferably at least about 80% of the particles, have a particle size preferably not greater than about 50 microns. The particles have a preferred maximum dimension of about 50 micrometers, more preferably about 25 micrometer, even more preferably about 10 micrometers, and even more preferably about 5 micrometers and a preferred average pore size of less than about 10 micrometers and more preferably of no more than about 5 micrometers. The pores preferably constitute from about 25 to about 95 percent by volume of the microporous material. Preferably, the layer 116 comprises from about 9 to about 90 wt. % ionic liquid and from about 9 to about 90 wt. % polymer host, and from about 1 to about 10 wt. % of the filler particles.

The ILGPE layer 116 can have desirable properties. By way of example, the ionic conductivity of the layer 116 is preferably at least about 5 mS/cm at about 50 degrees Celsius and more preferably ranges from about 5 to about 50 mS/cm at about 50 degrees Celsius.

The various methods of manufacturing the ILGPE layer 116 will now be discussed.

Figure 12:
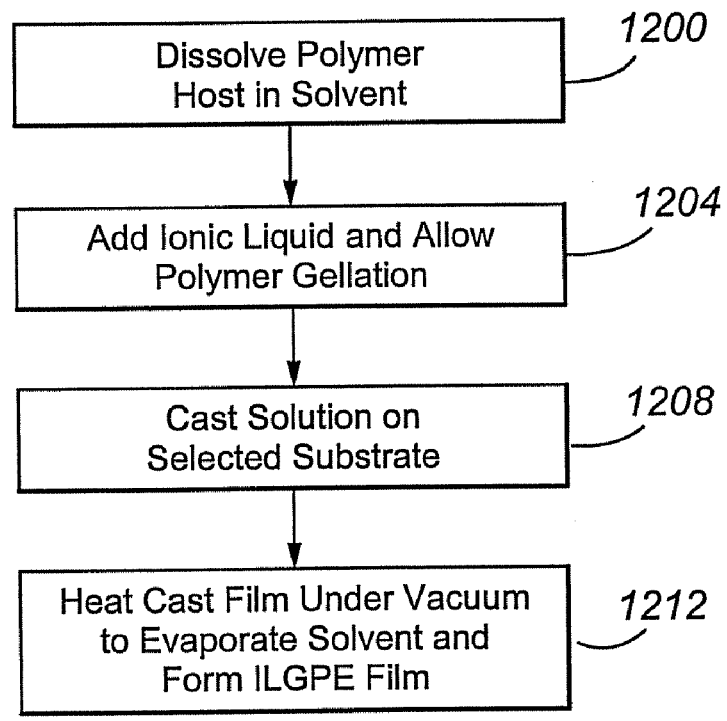
FIG. 12 is a flowchart of a method to produce an ILGPE layer according to an embodiment of the invention.

FIG. 12 illustrates a method of manufacturing the layer 116 according to an embodiment of the invention. This method is hereinafter referred to as the ionic liquid-polymer gellation method.

In step 1200, the polymer host (preferably in powder form) is dissolved in a low-boiling point solvent under magnetic stirring. To effect rapid dissolution, the average or mean particle size of the host preferably is no more than about 50 micrometers. The polymer host can be precipitated, spray-dried, or milled.

The solvent, or swelling agent, is preferably an organic solvent for the polymer host. The solvent preferably has a low boiling point, which is more preferably no more than about 200 degrees Celsius and even more preferably ranges from about 50 to about 200 degrees Celsius. Particularly preferred solvents include pyrrolidinone, acetone, dimethylformamide, acetonitrile, and tetrahydrofuran.

In step 1204 when the polymer host is fully dissolved in the solvent, the viscous solution is mixed with an appropriate amount of an ionic liquid under magnetic stirring to allow the gellation of polymer with the ionic liquid. As will be appreciated, "gellation" of the polymer refers to the polymer chains being placed in a more disordered state, thereby occupying a greater volume than the volume of the undissolved, more highly ordered polymer host before step 1200.

In step 1208, the resultant mixture is processed by solution casting on a selected substrate, such as a glass plate.

In step 1212, the solvent cast mixture is heated under a dynamic vacuum to evaporate at least most, if not all, of the low boiling-point solvent to form an ILGPE layer 116. This heating process is preferably performed at a temperature higher than the boiling point of the low-boiling point solvent but lower than the decomposition temperature of the ionic liquid and polymer host. The freestanding and self-supporting ILGPE film can be easily peeled off from the substrate for later assembly of the ultracapacitor.

Figure 13:
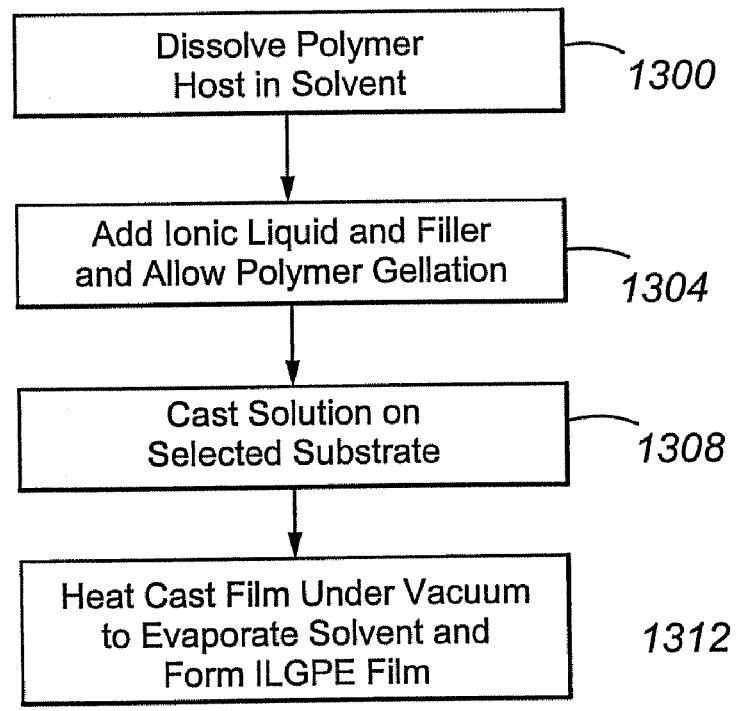
FIG. 13 is a flowchart of a method to produce an ILGPE layer according to an embodiment of the invention.

FIG. 13 illustrates a method of manufacturing the layer 116 according to another embodiment of the invention. This method is hereinafter referred to as the ionic liquid-inorganic-polymer composite method. In this method, inorganic particulate fillers are introduced into the ILGPE to enhance the mechanical strength of the ILGPE system. Further, introduction of inorganic fillers can also decrease the level of polymer crystallinity and thus enhance ionic conductivities for the polymer composite electrolytes.

Similar to the ionic liquid-polymer gellation method described above, a polymer solution is prepared, in step 1300, by dissolving a polymer host in a low-boiling point solvent.

In step 1304, the resultant solution is mixed with an ionic liquid and an appropriate amount of inorganic particulate filler (appropriately in fine powder form) under magnetic stirring, ensuring the complete dispersion of the filler powder in the solution and the gellation of polymer with the ionic liquid.

In step 1308, the resultant mixture is processed by solution casting on a selected non-adhesive substrate.

In step 1312, the solvent-cast film is heated under dynamic vacuum to evaporate at least most, if not all, of the low boiling point solvent to form an inorganic filler-embodied ILGPE film. This heating process is preferably performed at a temperature higher than the boiling point of the low-boiling point solvent but lower than the decomposition temperatures of the ionic liquid and polymer host. The obtained ILGPE layer 116 can be peeled off easily from the substrate for later assembly of the ultracapacitor.

In either of the above methods, when the polymer host is a thermosetting polymer the polymer is cross-linked while in the presence of the ionic liquid and/or filler. To produce such ILGPEs, appropriate monomers are mixed with the selected ionic liquid, followed by cross-linking reactions. The ionic liquid molecules are trapped in the resulting cross-linked polymer structures. Suitable plasticizers and cross-linking agents may be added to the mixture. For the cross-linking step, several methods, such as ultraviolet (UV) irradiation, electron-beam irradiation, and thermal polymerization, can be selected to initiate cross-linking.

Exemplary cross-linking monomers include acrylate monomers (e.g., ethylene glycol diacrylate, polyethylene glycol diacrylate, trimethylolpropane triacrylate, vinyl acetate, and divinyl adipate, 1,6-hexanediol diacrylate, 1,9-nonanediol diacrylate, 2-butyl-2-ethyl-1,3-propaneiol diacrylate, 2-hydroxy 3-phenyoxy propyl acrylate, 2-hydroxyl-ethyl acrylate, 2-hydroxypropyl acrylate, butoxy ethyl acrylate, behenyl acrylate, diaccrylate of ethylene oxide modified bisphenol A, dipentaerythritol hexaacrylate, neopentyl glycol diacrylate, ethoxy diethyleneglycol acrylate, hexyl polyethyleneglycol acrylate, diethylene glycol diacrylate, isoamyl acrylate, isobornyl acrylate, lauryl acrylate, methoxy triethyleneglycol acrylate, neopentglycol diacryalate, tetraethylene glycol di(chloroacrylate), neopenthylglycol benzoate acrylate, PEG#200 diacrylate, PEG#400 diacrylate, PEG#600 diacrylate, perflorooctylethyl acrylate, triethylene glycol diacrylate, phenoxy ethyl acrylate, diglycerol diacrylate, trimethylolpropane triacrylate, teterahethylene glycol diacrylate, phenoxoy polyethyleneoglycol acrylate, atearyl acrylate, tetrahydro furfuryl acrylate, triethyleneglycol diacrylate, triethyleneglycol diacrylate, trimethylpropane triacrylate, trimethylpropane benzoate acrylate, 2-ethylhexyl acrylate, butyl acrylate, can combinations thereof), methyacrylate monomers (e.g., methyl methacrylate, ethylene glycol dimethacrylate, diglycerol tetramethacrylate, butylene glycol dimethacrylate, polyethylene glycol dimethacrylate, hcyrosyproply methacrylate, diethylene glycol dimethacrylate, triethylene glycol dimethacrylate, tetraethylene glycol dimethacrylate, di(pentamethylene glycol) dimethacrylate, and combinations thereof)

Figure 14:
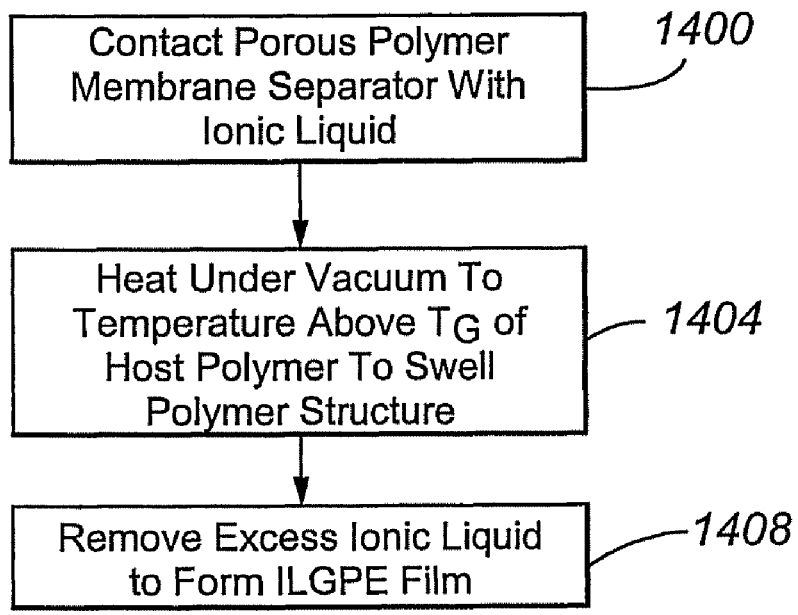
FIG. 14 is a flowchart of a method to produce an ILGPE layer according to an embodiment of the invention.

FIG. 14 shows a further method according to an embodiment of the invention. In this method known as the ionic liquid-inorganic-polymer composite method, a pre-made microporous and permeable polymer separator is impregnated with a selected ionic liquid. The dispersion of the ionic liquid in the polymer composition occurs by means of diffusion. Preference is given to impregnation of polymer powders by an ionic liquid, and particular preference to impregnation of films, fibers, foams, or injection moldings, using auxiliaries, e.g., solvent.

Any microporous polymer membrane that is permeable to the selected ionic liquid may be employed. Examples of suitable membranes include battery and ultracapacitor separators, such as those sold by PPG Industries Inc. under the tradename Teslin™ (a microporous, highly filled polyethylene matrix sheet material), EXCELLERATOR PTFE separators sold by W. L. Gore & Associates, Inc., Daramic Industrial CL™ (a microporous, highly filled polyethylene matrix sheet material) sold by Daramic, Inc., Solufill™ and Solupor™, both sold by DSM Solutech of the Netherlands and Teijin Fibers Limited of Japan, Tyvek™ (spunbonded polyethylene fibers) sold by E.I. du Pont de Nemours and Company, and the battery separator membranes sold by Celgard, or by Daramic, Inc. under the tradename Artisyn™. Artisyn™ is an uncoated, mono-layer, highly filled polyolefin sheet. Other preformed microporous and permeable organic membranes, such polymer membrane separators designed for energy storage applications (i.e., batteries and ultracapacitors), may also be employed.

In step 1400, the preformed, microporous and permeable polymer membrane is contacted with the ionic liquid by placing the membrane in a bath of the ionic liquid.

In step 1404, the polymer membrane, while contacted with the ionic liquid or ionic liquid/solvent mixture, is heated at a temperature above the glass transition temperature of the polymer host in the membrane but below the decomposition temperatures of the ionic liquid and polymer host to directly swell/gell the polymer host and form the ILGPE layer 116. Preferably, the temperature to which the membrane is heated is at least about 50 and more preferably ranges from about 50 to about 200 degrees Celsius. Swelling/gellation of the polymer membrane by the ionic liquid is enhanced at an elevated temperature and under dynamic vacuum. The vacuum is preferably at a pressure of no more than about −0.1 atm and more preferably ranges from about −0.1 to about −1 atm. The vacuum can improve the uptaking of ionic liquid in the polymer network and thus enhance ionic conductivity of the resulting ILGPEs. Use of the dynamic vacuum can help the penetration of the ionic liquid into the depth of the polymer network and thus enhance ionic conductivity of the resulting ILGPEs.

In step 1408, the resultant ILGPE membrane is removed from the ionic liquid and the excess ionic liquid on the membrane is removed, such as by hanging the membrane for a few minutes.

Figure 15:
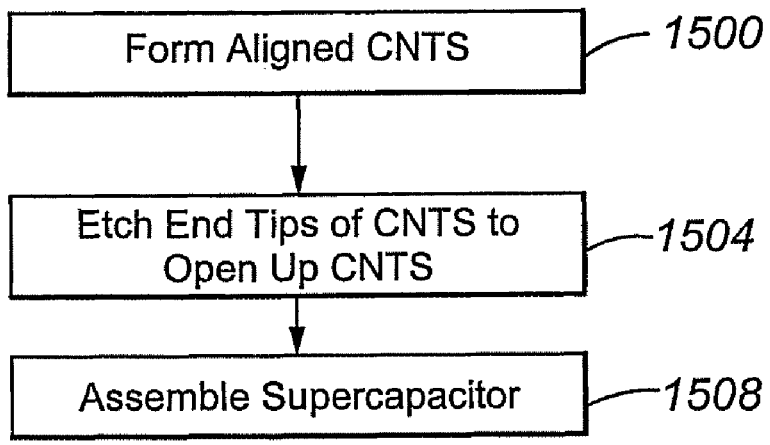
FIG. 15 is a flowchart of a method to produce an ILGPE layer according to an embodiment of the invention.

FIG. 15 depicts the process for assembling an ultracapacitor according to an embodiment of the invention.

In step 1500, the aligned CNTs are formed by known techniques to form the anode and cathode electrode layers 108 and 112.

In step 1504, the layers 108 and 112 are etched by suitable techniques to open up one or both of the ends of at least most of the CNTs. Etching can be performed by (oxygen) plasma etching and/or chemical etching techniques, with plasma etching being preferred.

In step 1508, the ultracapacitor is assembled by sandwiching the anode and cathode electrodes 108 and 112 and ILGPE layer 116 between current collectors 104*a* and b. Typically, the current collectors are sputter-coated onto the anode and cathode and a dry transfer method is used to transfer aligned CNTs from the substrate on which they are grown.

The ultracapacitors can have highly attractive properties. By way of example, the power density of the ultracapacitors can be at least about 10 kW/kg with an energy density of at least about 10 Wh/kg.

EXPERIMENTAL

An example of an ILGPE layer 116 was manufactured by the process of FIG. 12 using PVdF-HFP/[EMIM][Tf$_2$N]. PVdF-HFP was the polymer host, 1-methyl-2-pyrrolidinone (NMP) the low-boiling point solvent, and [EMIM][Tf$_2$N] the ionic liquid. PVdF-HFP is one of the polymers that have been most frequently used in conventional gel polymer electrolytes owing to its relatively high thermal stability. PVdF-based polymer electrolytes are expected to have high anodic stability due to the strong electron-withdrawing functional group —C—F. Furthermore, PVdF co-polymerized with hexafluoropropylene (PVdF-HFP), can be used to improve the gel properties of the polymer electrolytes because of its greater solubility in organic solvents, lower crystallinity, and lower glass transition temperature than the PVdF polymer alone in the gel. First, 0.34 g of PVdF-HFP powder was dissolved in 1.7 ml of NMP under magnetic stirring for three hours. The resultant viscous polymer solution was then mixed with 0.8 ml of [EMIM] [Tf$_2$N] under magnetic stirring for two hours to complete the polymer gellation with the ionic liquid. 0.4 ml of the obtained homogeneous polymer-solvent-ionic liquid mixture was then poured onto a piece of glass slide (6.25 cm$^2$). Heating this solution-containing glass slide at 110° C. under dynamic vacuum (22 InHg) for fifteen hours completely evaporated the solvent NMP and formed a uniform and transparent PVdF-HFP/[EMIM][Tf$_2$N] film.

An example of an ILGPE layer 116 was manufactured by the technique of FIG. 13 using PVdF-HFP/[EMIM] [Tf$_2$N]/Zeolite. Zeolite was the inorganic particulate filler. First, 0.34 g of PVdF-HFP powder was dissolved in 1.7 ml of NMP under magnetic stirring for three hours. The resultant viscous polymer solution was then mixed with 0.02 g of zeolite and 0.8 ml of [EMIM][Tf$_2$N] under magnetic stirring for two hours to complete the dispersion of zeolite powder in the solution and the gellation of the polymer with the ionic liquid. 0.4 ml of the obtained homogeneous polymer-solvent-ionic liquid mixture was then poured onto a piece of glass slide (6.25 cm$^2$). Heating this solution-containing glass slide at 110° C. under dynamic vacuum (22 InHg) for fifteen hours completely evaporated the solvent NMP and formed a uniform and light brown PVdF-HFP/[EMIM][Tf$_2$N]/Zeolite film. The PVdF-HFP/[EMIM][Tf$_2$N]/Zeolite composite ILGPE was a light brown rubbery film and was mechanically stronger than the ILGPE without zeolite. The zeolite was found to be uniformly distributed within the polymer gel. In this fashion, addition of inorganic particulate fillers to improve the mechanical strength of ILGPEs was demonstrated. Addition of zeolites into a conventional gel polymer electrolyte system consisting essentially of polyacrylonitrile, propylene carbonate/ethylene carbonate, and LiAsF$_6$ resulted in the increase of ionic conductivity from $10^{-3}$ to $10^{-2}$ S/cm, which is the highest so far in the field of polymer electrolytes.

An example of an ILGPE layer 116 was manufactured by the process of FIG. 14 using PTFE/[EMIM][Tf$_2$N] by directly gelling poly(tetrafluoroethylene) (PTFE) membrane (thickness: 23 μm, pore size: 0.05-15 μm, porosity: 50-70%) obtained from W.L. Gore & Associates with [EMIM] [Tf$_2$N]. This was done by soaking a piece of PTFE membrane (2×2 cm$^2$) in a 4 cm-diameter aluminum pan containing 0.5 ml [EMIM] [Tf$_2$N], followed by heating the membrane (in the ionic liquid) at 110° C. and under dynamic vacuum (22 InHg) for fifteen hours. The obtained ILGPE membrane was then taken out from the ionic liquid and hung for five minutes to exclude the excess of the ionic liquid. Incorporation of ionic liquids into the polymer membrane can be improved by imbibing it at elevated temperature and under reduced pressure. This helps swelling/gelling the polymer membrane, enhancing the uptake of ionic liquid into the polymer network, and thus increasing ionic conductivity for the resultant ILGPEs (up to $10^{-3}$ S/cm even at room temperature). Use of the dynamic vacuum can help the penetration of the ionic liquid into the depth of the membrane's pore network and thus enhance ionic conductivity of the resulting ILGPEs. Ionic conductivity of the resultant PTFE/[EMIM][Tf$_2$N] was $1.1 \times 10^{-3}$ S/cm. As a comparison, a lower ionic conductivity of $5 \times 10^{-4}$ S/cm was observed for the PTFE/[EMIM] [Tf$_2$N] prepared using the similar procedure but without the use of heating during the gelling/swelling of polymer membrane with ionic liquid. This demonstrates the importance of an elevated temperature in improving the swelling of the polymer and the uptaking of the ionic liquid and thus the ionic conductivity of the ILGPE.

Electrochemical window, ionic conductivity, and thermal stability are important properties of electrolytes in determining the performance and lifetime of an electrochemical device. These properties were measured for a variety of ILGPEs. Electrochemical characterization included measurements of the ionic conductivity and electrochemical windows of ILGPEs by AC impedance spectroscopy using a cell that sandwiched the ILGPE film between two stainless steel electrodes. The cell consisted of two identical stainless steel electrodes (2 cm×2 cm for each) and a plastic spacer having a circular cut-out area of 0.785 cm$^2$ and a thickness of 0.0245 cm. Ionic conductivity of ILGPEs was measured by AC impedance spectroscopy with an AC voltage amplitude of 5 mV and a frequency range of 500 kHz~0.1 Hz. The real resistance Z' at the imaginary resistance Z"=0 was used to calculate ionic conductivity of the ILGPE according to ρ=t/(SZ') (t and S are thickness and area of the electrolyte between the two electrodes). The electrochemical window was measured by linear sweep voltammetry.

Ionic conductivities of a number of ILGPEs were measured. The results are summarized in Table 1 below in comparison with those of pure ionic liquids. It can be seen that ionic conductivities of all ILGPEs are lower than the pure ionic liquids. This is associated with the relatively slower ion movement in a gel polymer matrix than in the pure liquid form. Nevertheless, all ILGPEs show a reasonable conductivity of >1 mS/cm, which is believed to be sufficient for the fabrication of electrochemical devices. From the AC impedance spectra, a high ionic conductivity of 1~3.5×10$^{-3}$ S/cm was calculated for all ILGPEs tested.

Figure 16:
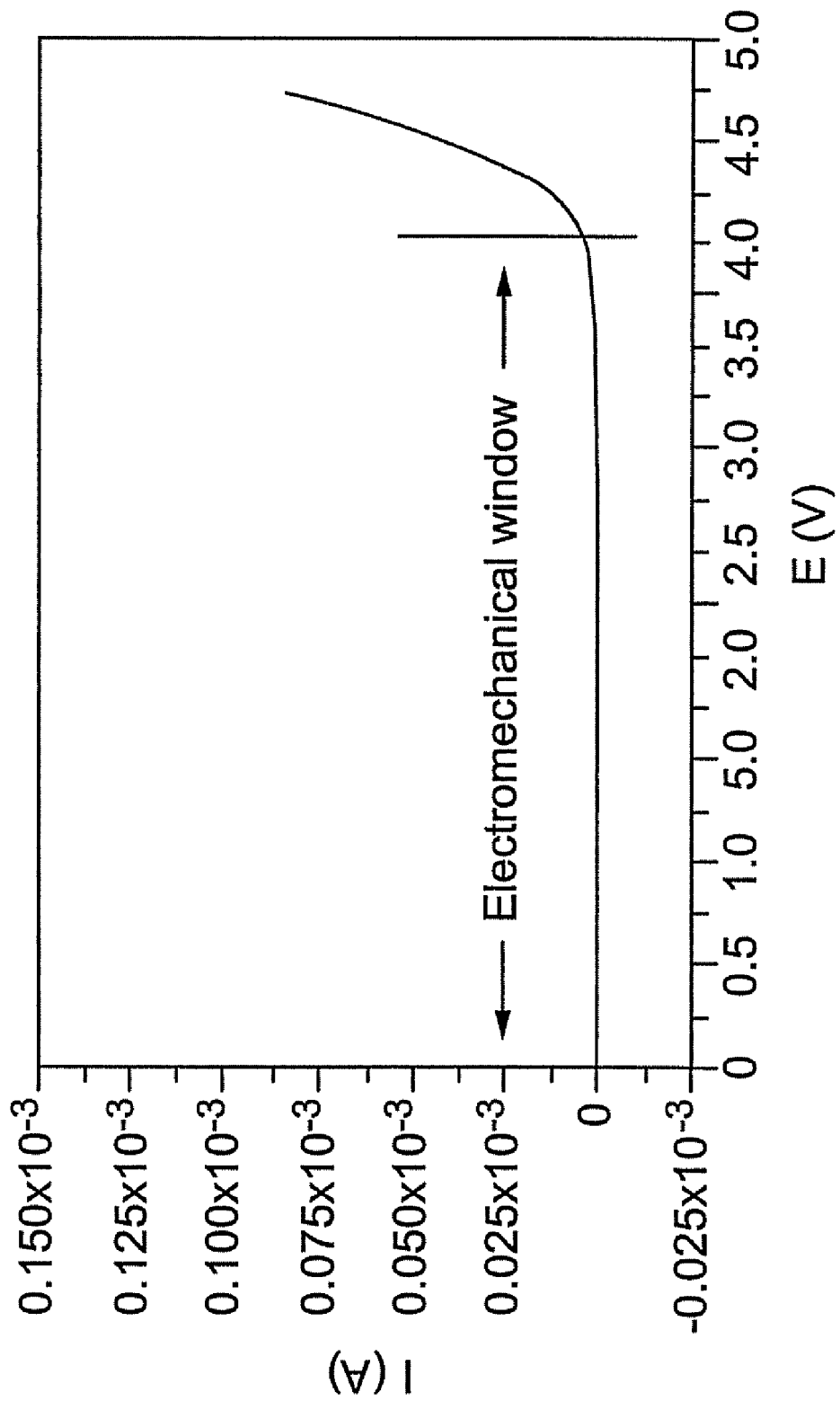
FIG. 16 is a voltammogram of a PVdF-HFP/[EMIM][Tf$_2$N]/Zeolite film sandwiched between two stainless steel electrodes (the voltammogram being obtained by voltage scanning from 0 to 4.5 V at a scan rate of 20 mV/s)
Figure 17:
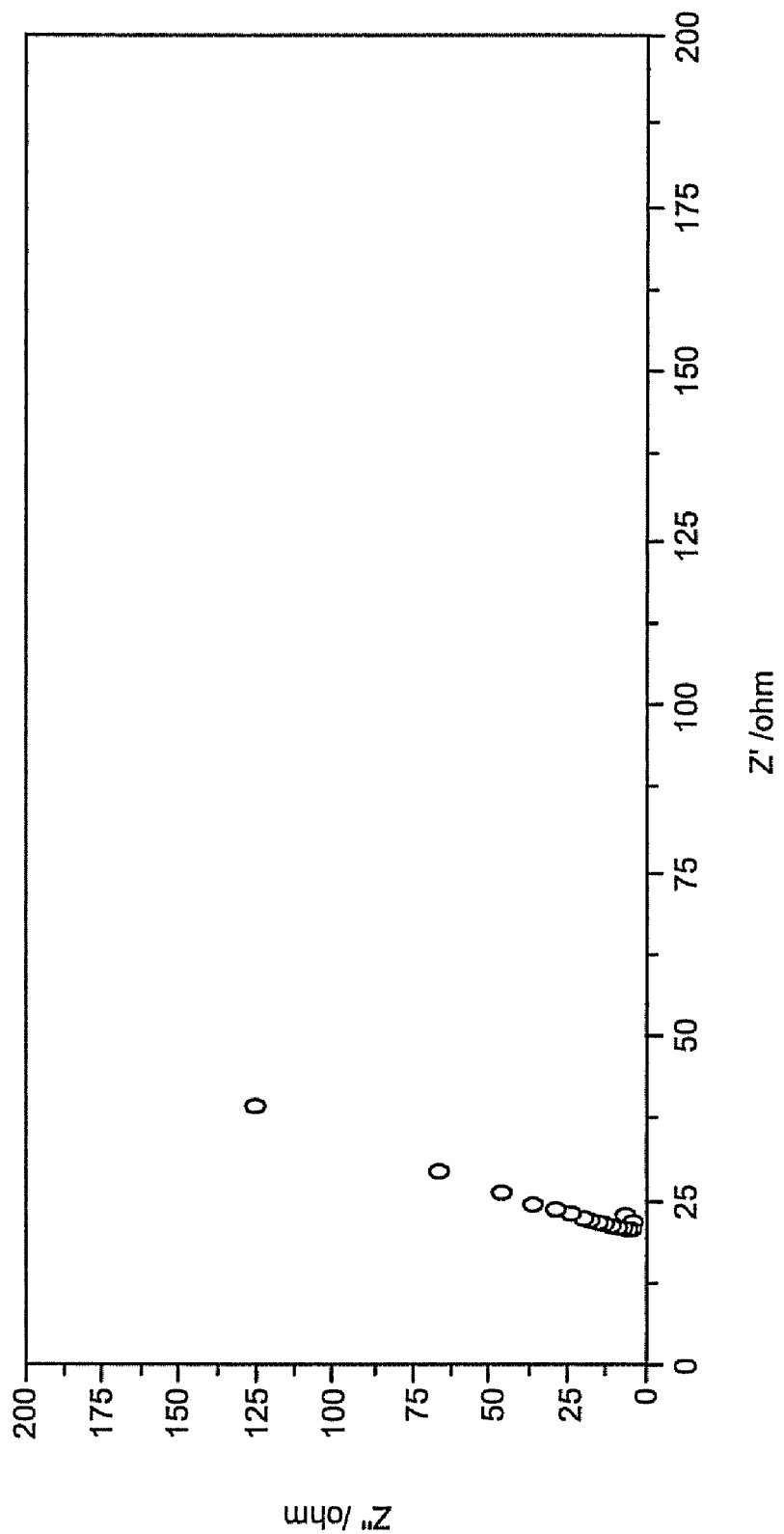
FIG. 17 is a Z'~Z" plot of a PVdF-HFP/[EMIM][Tf$_2$N]/Zeolite film sandwiched between two stainless steel electrodes (with the frequency range being 0.1~500K Hz and amplitude of sine wave being 5 mV)

Incorporation of zeolite in the PVdF-HFP/[EMIM] [BF$_4$] system resulted in a further decrease of ionic conductivity for the resultant composite. FIGS. 16-17 show the result for PVdF-HFP/[EMIM] [Tf$_2$N]/Zeolite as the example. The polymer-ionic liquid-filler mixture solution of the PVdF-HFP/[EMIM] [BF$_4$]/zeolite system was not as homogeneous as the PVdF-HFP/[EMIM][Tf$_2$N]/zeolite system. This may reflect a phase separation existing between the hydrophilic ionic liquid ([EMIM] [BF$_4$]) and the hydrophobic filler (zeolite), hindering the ion movement and thus decreasing the ionic conductivity. By contrast, addition of zeolite in PVdF-HFP/[EMIM] [Tf$_2$N] did not significantly change the ionic conductivity (but enhanced the mechanical strength) for the resulting composite ILGPE. Hydrophobicility of both the ionic liquid and the filler should be responsible for this observation, providing greater homogeneity of the mixture. Further optimization of the inorganic filler concentration in the composite system should lead to the improvement of conductivity.

The electrochemical windows of the ILGPEs were measured by linear sweep voltammetry. The results are summarized in Table 1 below. FIG. 16 shows the voltammogram of PVdF-HFP/[EMIM] [Tf$_2$N]/Zeolite as the example. As can be seen, upon the voltage scanning from 0 to 4.5 V, breakdown of the electrolyte begins at a voltage higher than 4.10 V. Below 4.10 V, the electrolyte is electrochemically stable, indicating a wide electrochemical window of 4.10 V of the PVdF-HFP/[EMIM] [Tf$_2$N]/zeolite. All ILGPEs tested have a wide electrochemical window of 4 V or higher, showing their high electrochemical stability. This will allow the operation of ultracapacitors with a high cell voltage and thus high energy storage capacity for the ultracapacitors.

TABLE 1

Ionic conductivities and electrochemical windows of pure ionic liquids and ILGPEs.

| Ionic liquid or resulting ILGPE | Ionic conductivity (mS/cm) | Electrochemical window (V) |
|---|---|---|
| [EMIM][BF$_4$] (pure ionic liquid) | 7.56 | 4.05 |
| PVdF-HFP/[EMIM][BF$_4$] (1:2.5) | 3.44 | 4.02 |
| PVdF-HFP/[EMIM][BF$_4$]/Zeolite (1:2.5:0.06) | 2.41 | 4.02 |
| PTFE/[EMIM][BF$_4$] | 1.20 | 4.03 |
| [EMIM][Tf$_2$N] (pure ionic liquid) | 4.85 | 4.28 |
| PVdF-HFP/[EMIM][Tf$_2$N] (1:2.5) | 1.54 | 4.10 |
| PVdF-HFP/[EMIM][Tf$_2$N]/Zeolite (1:2.5:0.06) | 1.52 | 4.10 |
| PTFE/[Tf$_2$N] | 1.10 | 4.15 |

Thermal properties of ILGPEs were screened by performing selected measurements using Differential Scanning Calorimetry (DSC) and Thermal Gravimetric Analysis (TGA). Different instruments were used with common samples in order to identify any instrumental artifacts-none were determined to exist. The DSC was performed using either a TA DSC Q1000 or a PE Pyris 1 DSC. These measurements were made using "crimped" Al pans. The DSC was run to a maximum of 200° C. with a low temperature (using liquid N$_2$) of 0° C. or (-100° C. for a few samples). Sample size was typically ~25 mg and runs had one heating cycle from room temperature, then a cooling cycle to 0° C. (or lower), and then a final heating cycle using a 10° C./min ramp with a 1 minute hold at the end points. The TGA was performed using either a Sieko TG/DTA200 or a TA TGA Q500. In either case, the purge gas was N$_2$, the sample size was ~7-10 mg (Pt pans), and the TGA was performed between 30-700° C. using a 60 minute hold at the starting (for baseline stabilization) and end points and a heating rate of 5° C./min.

With respect to the calorimetry (DSC) results, it was found that during the first heating cycle a small, broad endotherm occurred between 80-120° C. This would be consistent with the TGA results and could be water being evaporated or, alternatively, a low order structural re-arrangement. The cooling cycle generated a small, broad exotherm usually in the range of 40-70° C. The second heating cycle was generally consistent with the first one. No glass transition-type events were identified. The ILGPE's based on the imbibed Gore-Text membrane (PTFE) were different than the others in that a small transition (perhaps the crystallization of PTFE) was identified and the broad endotherm between 80-120° C. wasn't discerned-probably due to less water and no NMP, and consistent with the lowest mass loss (0.4%) observed in the TGA measurements. In general, the heat capacity of the samples decreased continuously as the temperature increased between 80-200° C. In general, the DSC measurements indicate some variations in the thermal transitions depending on whether the matrix was PVdF-HFP, PVdF-HFP+zeolite, or PTFE. The presence of the zeolite resulted in bimodal transitions and long continuous changes in the heat capacity as the temperature increased.

Figure 18:
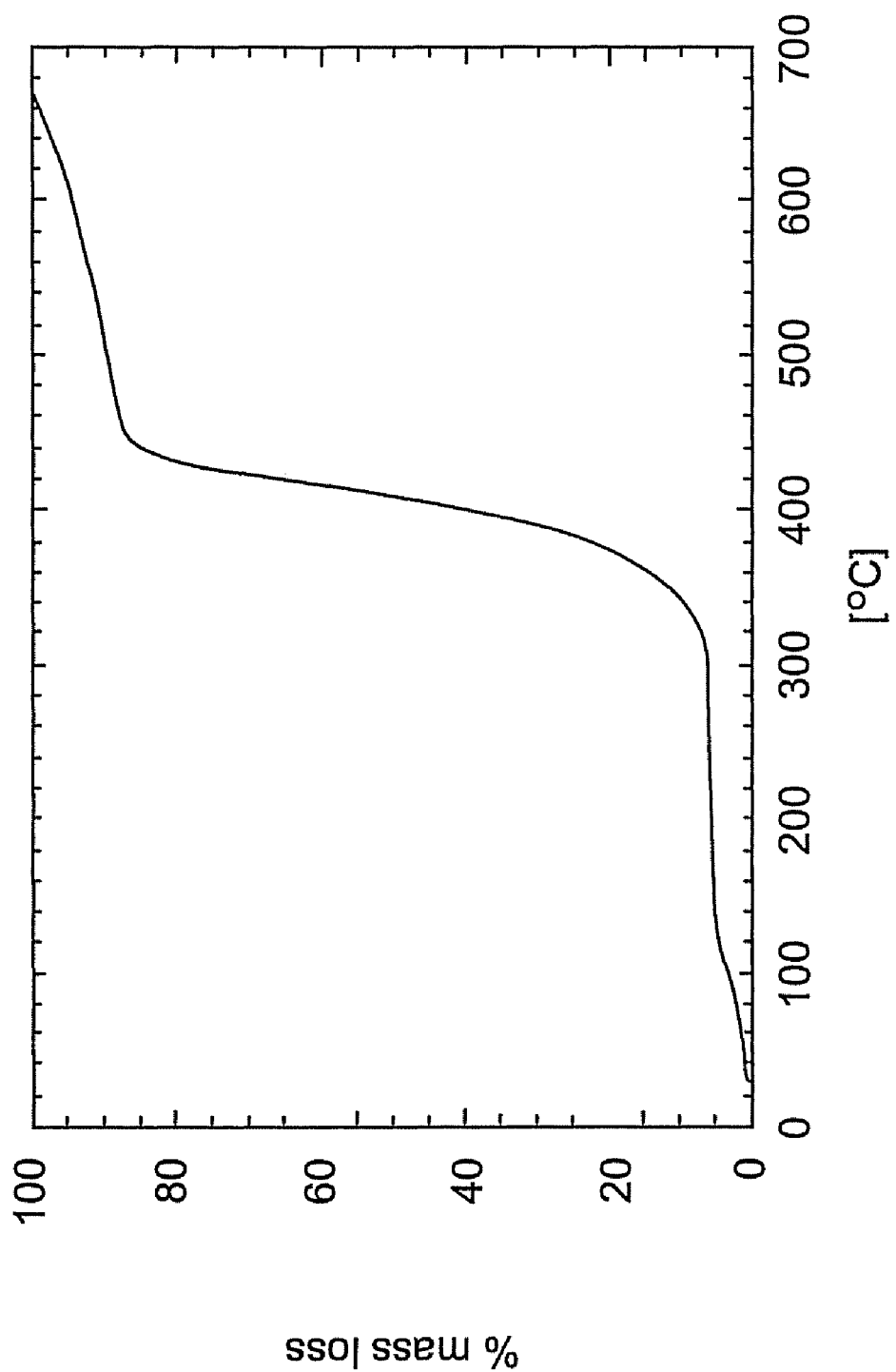
FIG. 18 is a TGA graph of a PVdF-HFP/[EMIM][Tf$_2$N]/zeolite film (the measurements being made in a N$_2$ purge)

Thermal stability of ILGPEs was measured by thermogravimetric analysis (TGA) (mass loss resulting from increasing temperature) by measuring the weight loss of the gel with increasing temperature. FIG. 18 shows the TGA result of PVdF-HFP/[EMIM] [Tf$_2$N]/zeolite as an example. These indicated three main mass loss regimes. The first regime was between 30° C. and 160° C., with the main transition occurring in the range of 80 to 110° C. In this transition 0.4 to 5% of mass (depending on the specific sample) was lost. This transition is probably absorbed water and residual NMP solvent. A second regime occurs between 250 to 460° C. In this transition, the majority of mass is lost, with the total mass loss being on the order of 60-85% at this point. This transition is probably the breakdown (pyrolysis) and volatilization of the ionic liquids in each of the samples. The final regime is >450° C. In this transition, most of the remaining mass is released and is probably due to the breakdown (pyrolysis) of the polymer. The results showed that the main thermal decomposition/pyrolysis of these ILGPEs occurs in the range of 250-450° C. with the majority above 350° C., indicating the high thermal stability of these ILGPEs.

These results support the contention that ILGPEs, especially [EMIM][Tf$_2$N] containing ILGPEs, are highly thermally stable gel polymer electrolytes and can be used at an elevated temperature up to 350° C. High thermal stability of these ILGPEs ensures the long lifetime and duration of electrochemical devices. Considering the commonly used operation temperature of about 60° C. for HEVs, these ILGPEs are highly suitable for ultracapacitors for vehicular applications.

Application of ILGPEs to electrochemical devices was demonstrated by their use in the fabrication of ultracapacitors. The ultracapacitor was fabricated by sandwiching a piece of ILGPE with two identical activated carbon electrodes. Any type of ILGPEs discussed above can be used to fabricate the ultracapacitor. Each electrode had a size of 1.5 cm×1.5 cm. Prior to use, the aluminum foil current collector of the electrode assembly was attached onto a polypropylene plate with epoxy. To ensure the good contact and low interfacial resistance between the electrode and the ILGPE of the capacitor, the electrodes were pretreated with the ionic liquid [EMIM] [Tf$_2$N] prior to capacitor assembly. This was done by putting a small amount of ionic liquid on the electrodes and then placing the ionic liquid-containing electrodes under dynamic vacuum for two hours. The ionic liquid that was used for ILGPE synthesis was employed for electrode pretreatment. By doing this, gas bubbles were excluded from the depth of electrodes, and the ionic liquid can penetrate into the bulk of the electrode materials. Subsequently, the ultracapacitor was assembled by sandwiching the ILGPE with the two ionic liquid-pretreated electrodes. Edges of the capacitor were sealed with epoxy. For PVdF-HFP/[EMIM] [Tf$_2$N] and PVdF-HFP/[EMIM][Tf$_2$N]/Zeolite, one piece of the ILGPE (thickness: ~100 μm) was used directly as a separator for capacitor fabrication. However, four pieces of PTFE/[EMIM] [Tf$_2$N] (thickness: 23 μm for each) needed to be stacked together to form the capacitor separator for that material. This minimized the difference in separator thickness between different capacitors. Capacitor testing included cyclic voltammetry, AC impedance spectroscopy, and galvanostatic charge/discharge.

Figure 19A:
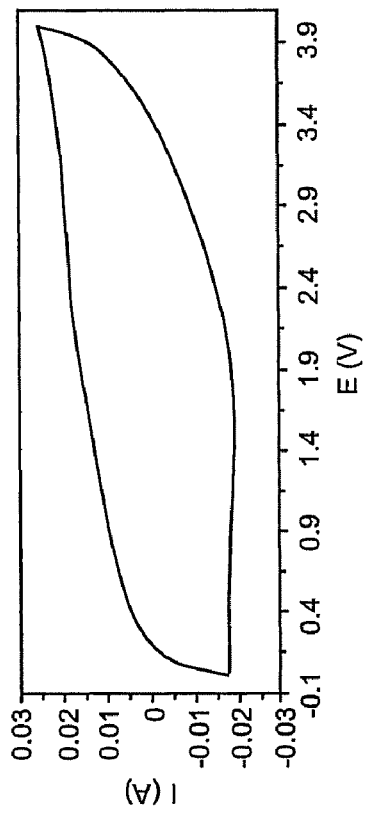
FIGS. 19A and B are, respectively, cyclic voltammogram and Z'~Z" plot of an ultracapacitor fabricated from two activated carbon electrodes with aluminum foil as the current collector and a PVdF-HFP/[EMIM][Tf$_2$N]/Zeolite ILGPE (the thickness and density of the carbon layer of the electrode being 100 μm and 6 mg/cm$^2$, respectively; the effective size of the capacitor being 2×2 cm$^2$, the scan rate for cyclic voltammetry being 20 mV/s, and the frequency range and amplitude of sine wave for AC impedance spectroscopy being 1 mm Hz ~100 KHz and 5 mV, respectively.
Figure 19B:
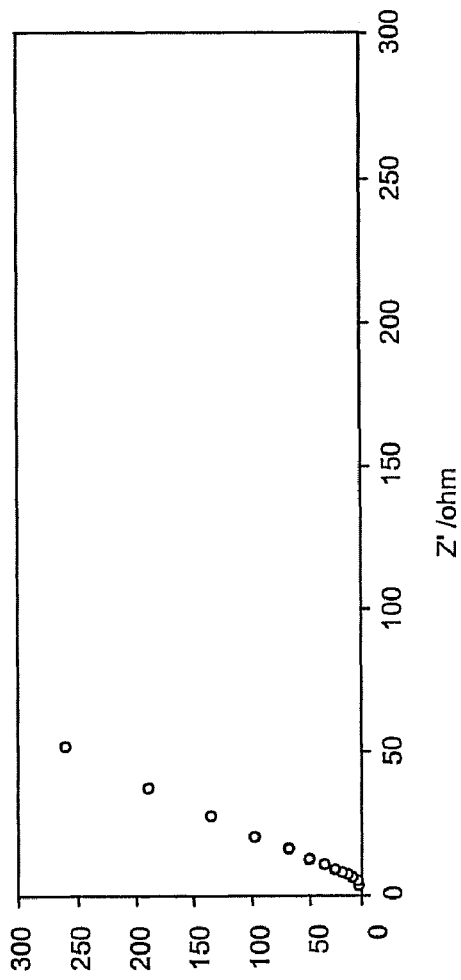

Cyclic voltammogram of an ultracapacitor fabricated from two activated carbon electrodes and a PVdF-HFP/[EMIM] [Tf$_2$N]/Zeolite ILGPE shows a rectangle shape (FIG. 19A, top), typical for a capacitor. Also, a cell voltage of up to 4 V can be determined from the cyclic voltammogram. Further, in the AC impedance measurement (FIG. 19B, bottom), capacitive behavior characterized by a nearly vertical line of the Z'~Z" plot for the same cell has been confirmed. From the Z'~Z" plot, a low effective series resistance (ESR) of about 5Ω of the capacitor was determined, indicating the high conductivity of the ILGPE used and the low interfacial resistance between the electrode and the ILGPE.

Figure 20A:
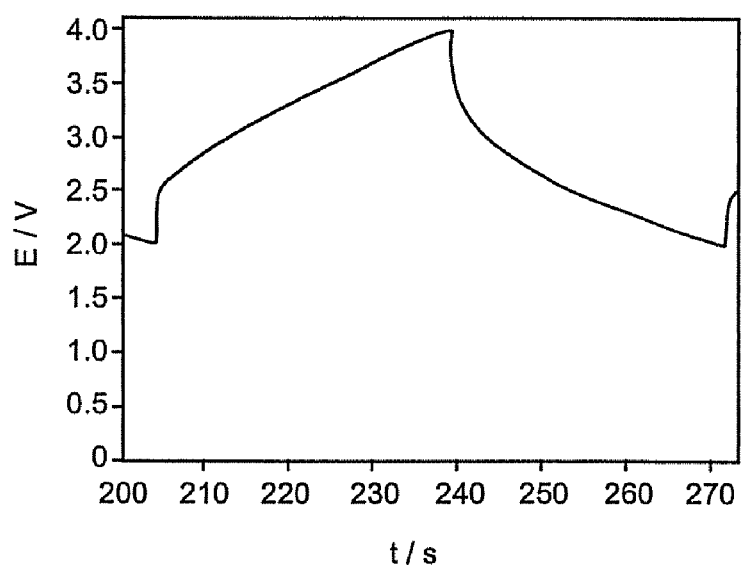
FIGS. 20A and B are, respectively, a galvanostatic charge/discharge of the same capacitor used in FIGS. 19A and B obtained at the rate of 10 mA/cm$^2$. and a Ragone plot of the same capacitor obtained from charge/discharge testing at different rates of 2~50 mA/cm$^2$.
Figure 20B:
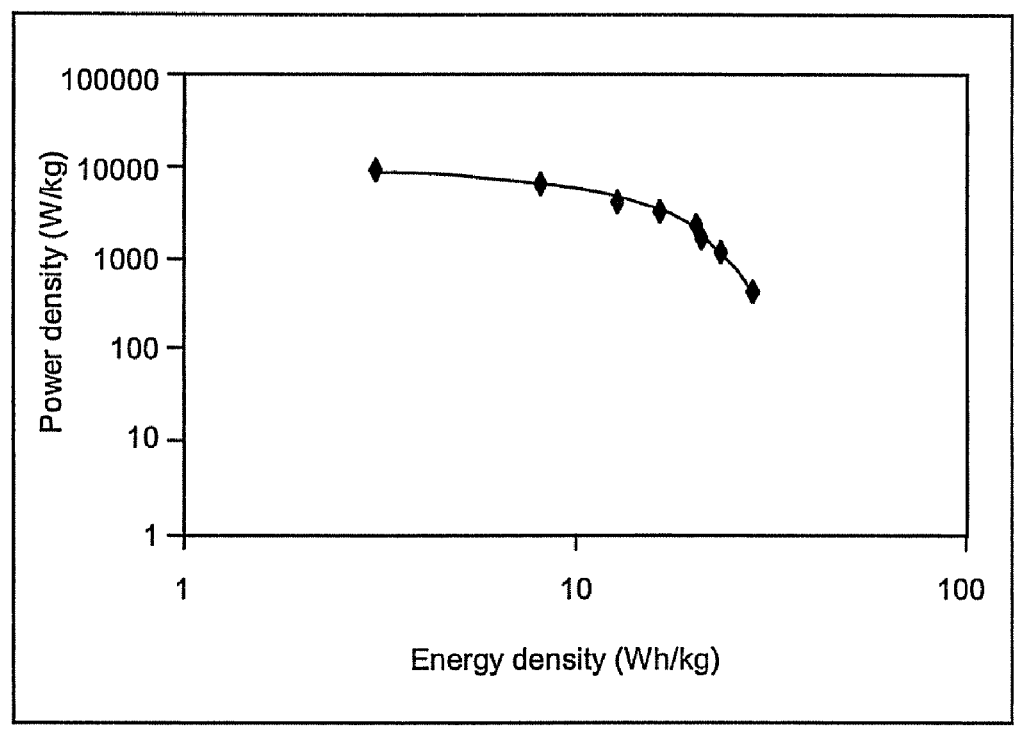

Gavlanostatic charge/discharge behavior of the same capacitor was investigated at different rates. An example charge/discharge cure obtained at the rate of 10 mA/cm$^2$ is shown in FIG. 20A (top). From the straight line portion of the discharge cure, energy density and power density of the capacitor at different rates were obtained (FIG. 20B (bottom)). In the range of discharge times of 3~30 seconds (the typical discharge time for HEVs), corresponding to the discharge rates of 10~40 mA/cm$^2$, a maximum energy density up to 20 Wh/kg and a maximum power density up 7000 W/kg have been achieved.

As part of synthesis of ILGPEs, a preliminary screening of ionic liquids was performed in terms of their capacitor performance relative to the most frequently used conventional organic electrolyte (IM Et$_4$NBF$_4$/acetonitrile). Several ionic liquids covering the imidazolium, phosphonium, ammonium, and pyrrolidinium groups were tested. All ionic liquid-incorporated capacitors showed a classic rectangle-shaped cyclic voltammogram similar to that of the acetonitrile electrolyte-based capacitor. Better performance (energy and power densities) was obtained for the imidazolium group, which is believed to be due to their relatively higher ionic conductivity and lower viscosity than other groups. Electrolyte properties of imidazolium ionic liquids, 1-ethyl-3-methylimidazolium tetrafluoroborate ([EMIM] [BF$_4$]), 1-ethyl-3-methylimidazolium trifluoromethanesulfonate ([EMIM] [CF$_3$SO$_3$]), and 1-ethyl-3-methylimidazolium bis(trifluoromethylsulfonyl) imide ([EMIM] [Tf$_2$N]), in comparison with those of the acetonitrile electrolyte, as well as the performance of capacitors fabricated from these electrolytes are summarized in Table 2.

TABLE 2

Properties and capacitor performance of imidazolium ionic liquids and acetonitrile electrolyte

| | Electrolyte property | | Capacitor performance | | |
|---|---|---|---|---|---|
| Electrolyte | Ionic conductivity (S/cm) | Viscosity (cp, at 20° C.) | Maximum cell voltage (V) | Energy density (Wh/kg) | Power density (W/kg) |
| [EMIM][BF$_4$] | 7.56 | 151.7 | 4.0 | 20.4 | 2302.8 |
| [EMIM][CF$_3$SO$_3$] | 4.54 | 51.7 | 4.0 | 10.0 | 2108.1 |
| [EMIM][Tf$_2$N] | 4.85 | 28.0 | 4.0 | 27.5 | 2316.5 |
| 1M Et$_4$NBF$_4$/acetonitrile | 15.45 | ~2 | 2.3 | 7.8 | 1418.3 |

Maximum cell voltage was determined by cyclic voltammetry (scan rate: 20 mV/s). Energy and power densities were determined by galvanostatic charge/discharge (current density: 10 mA/cm$^2$). Cut-off voltage for charge/discharge: 2.0 V/4.0 V for ionic liquid capacitors, 1.15 V/2.3 V for acetonitrile capacitor.

Capacitors incorporating imidazolium ionic liquids showed higher performance than the acetonitrile capacitor. This was mainly due to the wider electrochemical window of the ionic liquids, thus allowing higher cell voltages for the capacitor. Having the highest ionic conductivity, but also highest viscosity in the imidazolium group, [EMIM] [BF$_4$] exhibited a moderate performance. Lower viscosity and ionic conductivity provided lower performance for [EMIM] [CF$_3$SO$_3$]. The highest performance was achieved for [EMIM] [Tf$_2$N], the ionic liquid that had the lowest viscosity among all ionic liquids reported so far. This implies that viscosity of an ionic liquid plays a more important role than its conductivity in determining capacitor performance. It is likely that the lower viscosity of an ionic liquid reduces the interfacial resistance between the electrode and the electrolyte, facilitating the ion transport into and out of the electrical double layer, and thus enhancing the performance for a capacitor.

Testing demonstrated that capacitors incorporating [EMIM][Tf$_2$N]-containing ILGPEs showed better performance than those incorporating [EMIM][BF$_4$]-containing ones, which is consistent with the results observed for capacitors fabricated from the liquid form of ionic liquids (Table 2). This indicates that regardless of the form (either liquid or polymer gel) of the electrolyte, viscosity of an ionic liquid plays a more important role than its ionic conductivity in influencing capacitor performance. Having lower viscosity, [EMIM][Tf$_2$N] based ILGPE electrolytes produced higher performance for the capacitors. Because of its highest capacitor performance, [EMIM][Tf$_2$N] was selected as the primary ionic liquid for the synthesis of ILGPEs. Moreover, combining these electrokinetic attributes with the attractive properties including water immiscibility and high decomposition temperature (400° C.), [EMIM][Tf$_2$N] promises to be a good electrolyte for ultracapacitors for vehicular applications.

Figure 21A:
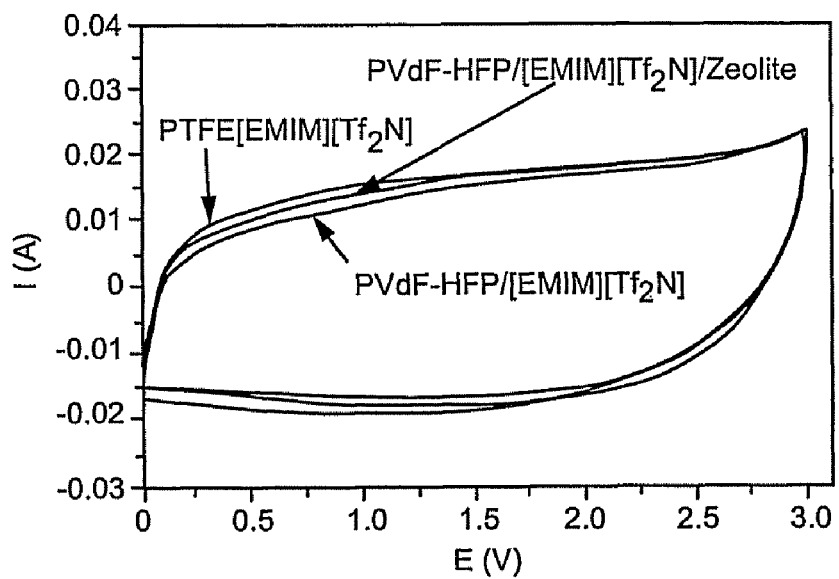
FIGS. 21A and B are cyclic voltammograms of capacitors fabricated from [EMIM][Tf$_2$N]-containing ILGPEs (indicated on the graph) (with the voltage range being 0~3 V (FIG. 21A) and 0~4 V (FIG. 21B) and the scan rate being 20 mV/s)
Figure 21B:
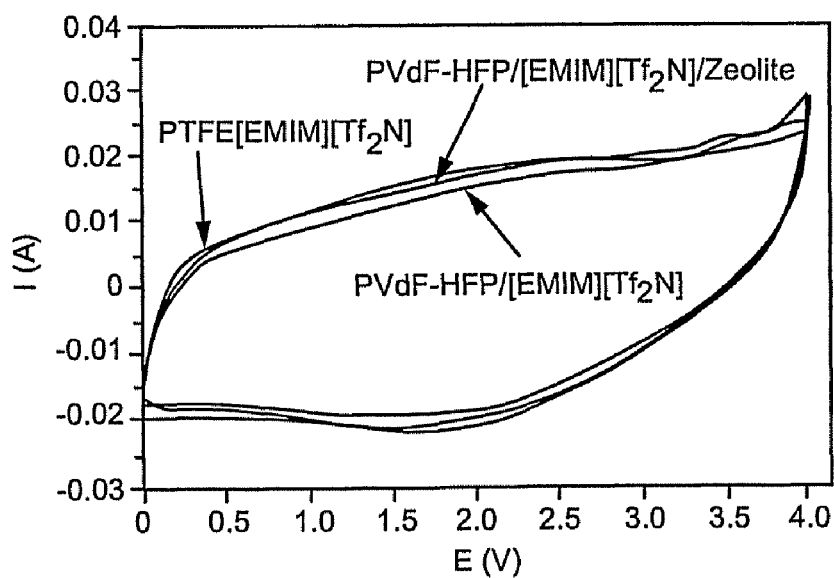
Figure 22:
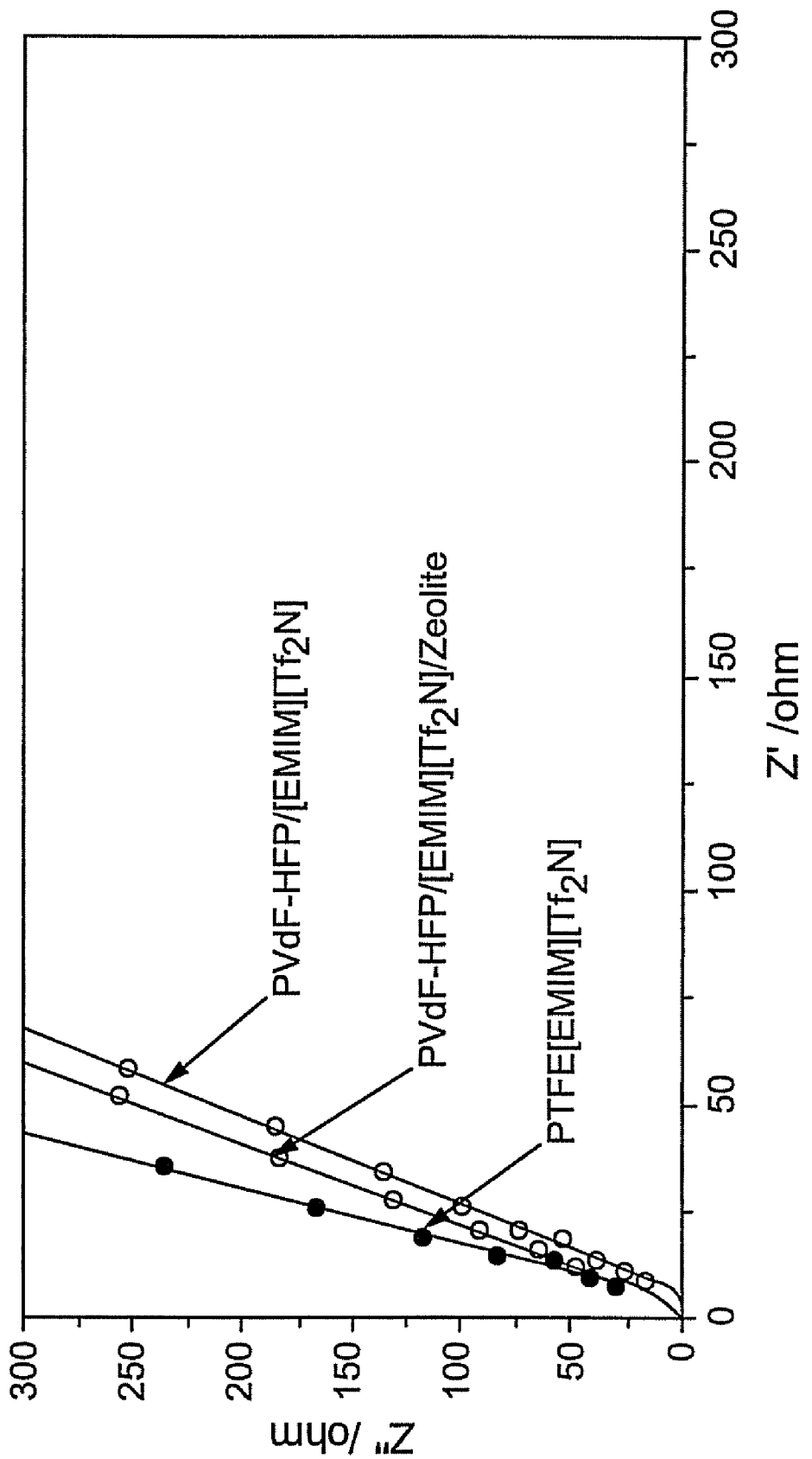
FIG. 22 shows AC impedance spectra of the same capacitors used in FIGS. 19A and B (the spectra being recorded for all capacitors at open-circuit, using an AC voltage amplitude of 5 mV and a frequency range of 1 mHz-100 kHz)

The capacitors showed well-defined cyclic voltammograms characterized with a rectangle shape (FIG. 21A (left)), indicating their typical capacitor behavior. Maximum cell voltages of these capacitors were determined to be 4 V (FIG. 21B (right)), consistent with electrochemical windows of ILGPEs (Table 1). Shape and current magnitude of voltammograms of these ILGPE-incorporated capacitors were similar to those (not shown) of the capacitors fabricated from the liquid form of the ionic liquid [EMIM][Tf$_2$N], suggesting that the ionic liquid functions well in the polymer network of an ILGPE in the capacitor. Capacitive behavior of these ILGPE-incorporated capacitors can be confirmed by AC impedance spectra (FIG. 22), showing nearly-vertical lines at low frequencies, typical phenomenon for capacitors.

Figure 23A:
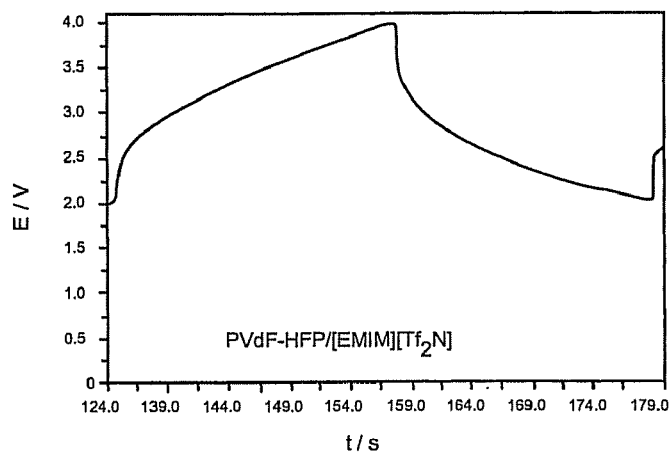
FIGS. 23A-C are galvanostatic charge/discharge profiles of the same capacitors used in FIGS. 19A-B (with the charge/discharge current density being 10 mA/cm² and cut-off voltage being 2.0V/4.0V)
Figure 23B:
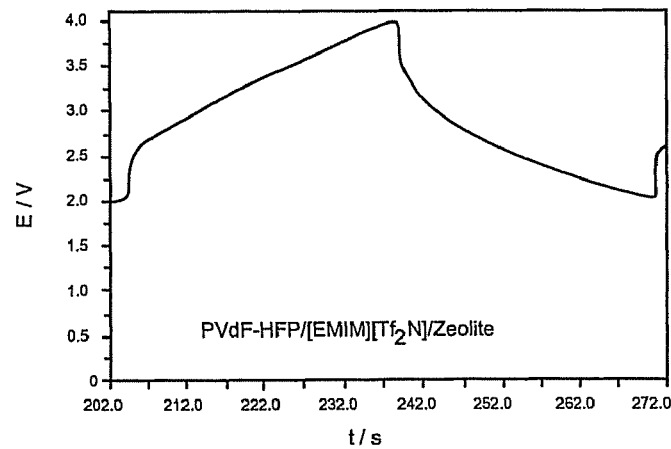
Figure 23C:
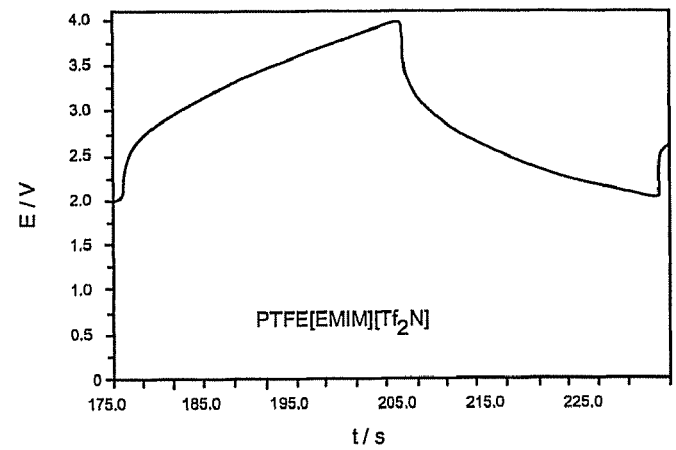

Furthermore, these ILGPE-incorporated capacitors were subjected to galvanostatic charge/discharge tests at different current densities of 2-50 mA/cm$^2$. FIGS. 23 A-C show the charge/discharge curves of capacitors obtained at 10 mA/cm$^2$. They are similar to that (not shown) of a capacitor fabricated from the liquid form of ionic liquid EMIM][Tf$_2$N]. From linear portion of the discharge curves, energy and power densities for all capacitors were calculated and summarized in Table 3 below. As can be seen, relatively lower performances were obtained for ILGPE-incorporated capacitors. This should be associated with the relatively lower ionic conductivity of ILGPEs compared to that of pure ionic liquids (Table 1) and the more difficult transport of electrolyte ions within a solid-state polymer network of the ILGPE and/or between the ILGPE and the electrode. Nevertheless, these figures-of-merit are still promising for solid-state-electrolyte-based capacitors, especially when considering the overall advantages of the solid-state electrolytes over liquid ones such as reduced reactivity, reduced leakage, improved safety, better shape flexibility, better processing characteristics, and better manufacturing integrity.

Figure 24:
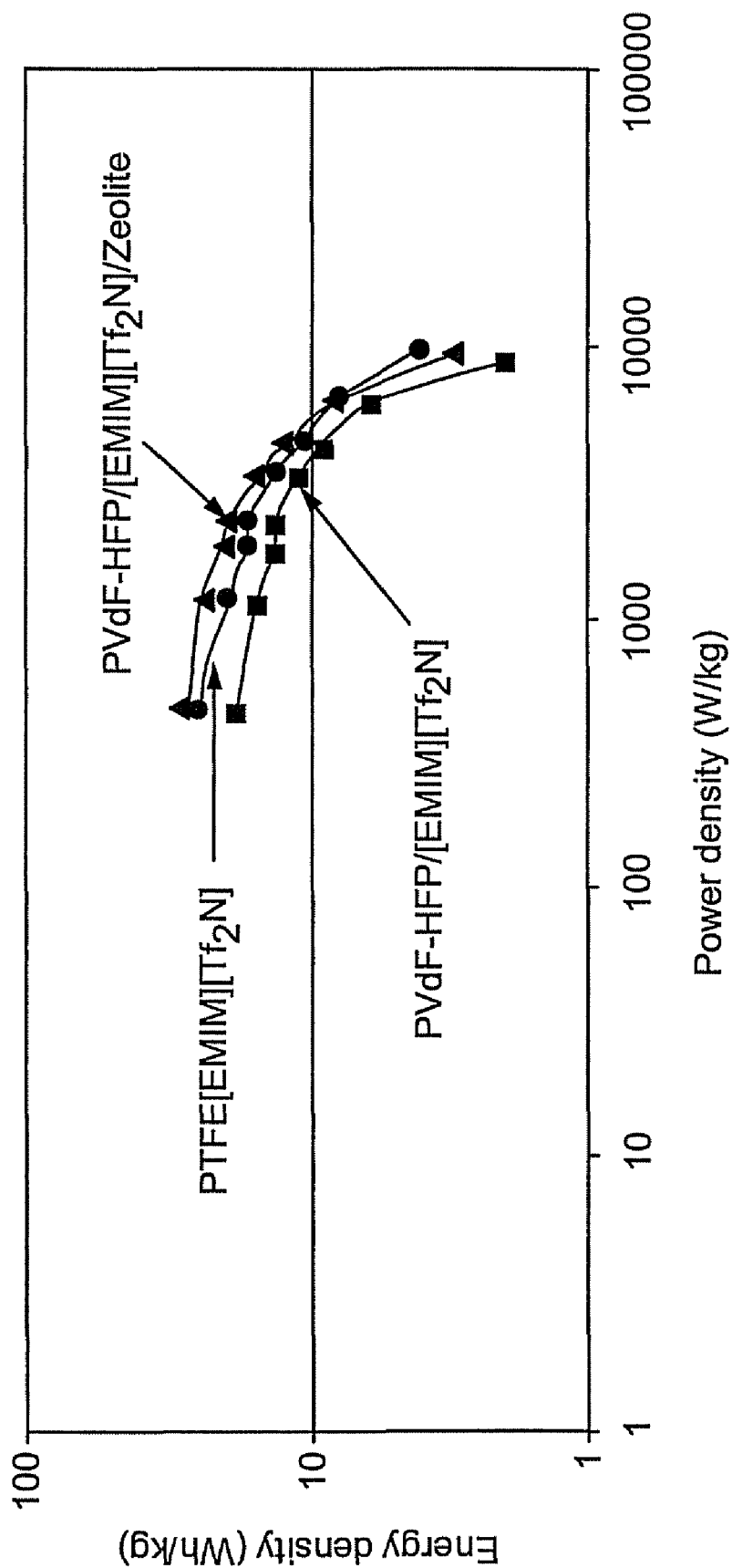
FIG. 24 presents Ragone plots of the same capacitors used in FIGS. 19A-B (with the charge/discharge current density being 2~50 mA/cm² and cut-off voltage being 2.0V/4.0V)

Typical Ragone plots of ILGPE-incorporated capacitors obtained using the current densities of 2-50 mA/cm$^2$ are shown in FIG. 24. Upon discharge at the highest rate of 50 mA/cm$^2$, resulting in a very short discharge period of 0.8-1.5 seconds, very high power densities of 9,000~9,900 W/kg were obtained for these capacitors. Practically, regarding the discharge times of 3-30 seconds (the typical range for HEVs), a maximum energy density and a maximum power density were obtained (Table 4). It should be noted that the present research was focused on the synthesis of ILGPEs and demonstration of their application in ultracapacitors. Optimization of electrode materials and capacitor packaging materials was not studied. Capacitor performance for the ILGPEs was evaluated based on the mass of the active material (carbon) of electrodes rather than overall weight of the packaged capacitor. Based on a simplified estimation method, the active-material-based performances can be converted (multiplying by a factor of 0.35) to the performances for a packaged capacitor (Table 4). The results exceed the performance metrics (4-5 Wh/kg, 1,000-1,800 W/kg) of currently available ultracapacitors. Again, the wider electrochemical window of ionic liquids over conventional organic electrolytes, and thus the larger maximum cell voltages for such capacitors, is the primary cause for this observation.

TABLE 4

Maximum energy and power densities of ultracapacitors fabricated from ILGPEs.

| ILGPE | Maximum energy density (Wh/kg) | Maximum power density (W/kg) | Maximum energy density for packaged cell* (Wh/kg) | Maximum power density for packaged cell* (W/kg) |
|---|---|---|---|---|
| PTFE/[EMIM][Tf$_2$N] | 17 | 8120 | 6 | 2842 |
| PVdF-HFP/[EMIM][Tf$_2$N] | 15 | 7000 | 5 | 2450 |
| PVdF-HFP/[EMIM][Tf$_2$N]/zeolite | 20 | 7791 | 7 | 2727 |

*Estimated by multiplying the active-material-based performances by a factor of 0.35

Figure 25A:
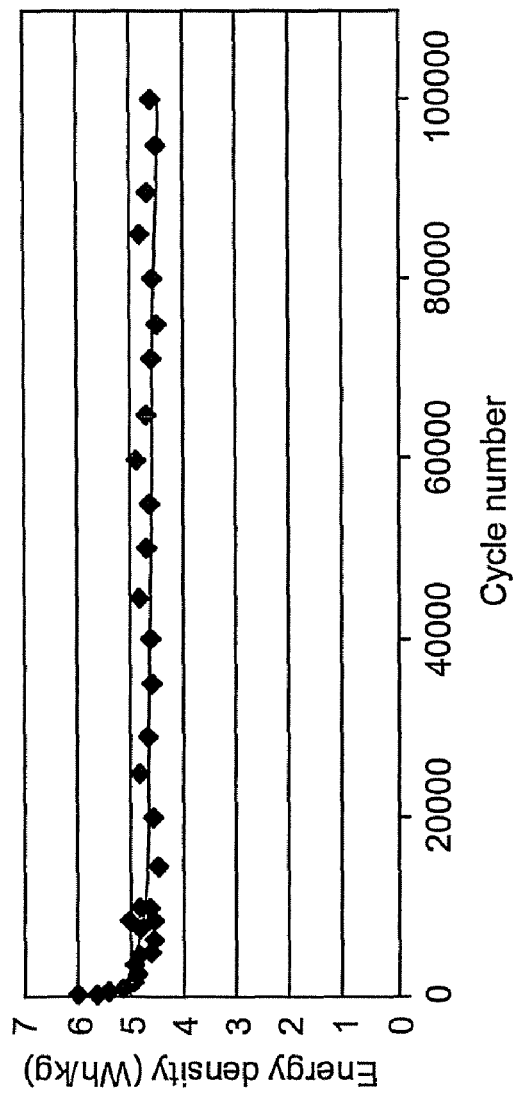
FIGS. 25A-B present galvanostatic charge/discharge cycle life tests of a capacitor fabricated from a PVdF-HFP[EMIM][Tf$_2$N]/Zeolite ILGPE and two carbon electrodes (with the current density being 20 mA/cm² and cut-off voltage being 1.5V/3.0V)
Figure 25B:
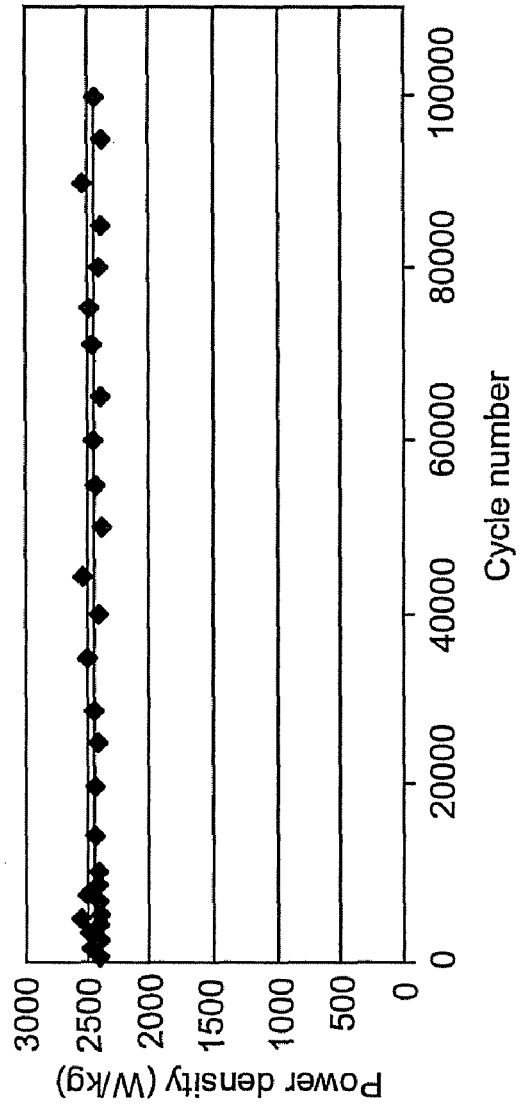

Finally, we performed a preliminary cycle life test for an ILGPE-incorporated capacitor. Based on the fact that all capacitors made in the current work were fabricated in ambient air, the presence of moisture and oxygen in the cell may limit the maximum cell voltage of the capacitor. Therefore, for the proof-of-concept, we cycled the capacitor using a relatively low voltage of 3 V. As shown in FIG. 25, after an initial decrease of ~20% in the first 2000 cycles, the energy remained stable. The power was fairly stable over the entire time tested. The test was stopped at the 10,000$^{th}$ cycle. The excellent cycle life achieved indicates the possibly longer cycles of the ILGPE-based capacitors. Moreover, careful fabrication of capacitors in a dry glove box will allow the capacitors to be cycled to a higher cell voltage of 4 V.

The above promising results prompted the construction of prototype ultracapacitors using plasma-etched, aligned CNTs as the electrodes and selected ionic liquids as the electrolyte. Activated carbon (AC) electrodes and the same ionic liquids were used to fabricate capacitors as reference for evaluating the CNT capacitors.

Aligned CNT arrays were synthesized by vacuum chemical vapor deposition on SiO$_2$/Si wafers as described elsewhere. Controlling the reaction time and pressure during synthesis of aligned CNTs, properties of the nanotubes could

TABLE 3

Performance of capacitors fabricated from [EMIM][Tf$_2$N] in liquid form and in polymer gels.

| Electrolyte | Energy density (Wh/kg) | Power density (W/kg) |
|---|---|---|
| [EMIM][Tf$_2$N] (pure ionic liquid) | 27.5 | 2316.5 |
| PTFE/[EMIM][Tf$_2$N] | 16.7 | 2277.3 |
| PVdF-HFP[EMIM][Tf$_2$N] | 13.3 | 2280.0 |
| PVdF-HFP[EMIM][Tf$_2$N]/zeolite | 20.2 | 2272.5 |

Capacitor performance was obtained at the current density of 10 mA/cm$^2$. Cut-off voltage: 2.0 V/4.0 V.

be adjusted. For the ultracapacitor study in this work, aligned CNT film electrodes with the nanotube specifications of the tube length of 150~200 µm, tube diameter of 10~15 nm, and spacing of tens to hundreds of nanometers were obtained. A gold layer was deposited to the (upper) tube tips of the aligned CNT film and the resulting CNT/gold assembly was physically removed from the silicon wafer using a commercially available double-sided conducting tape. Finally, water or oxygen plasma etching was applied on the CNT film. After the plasma etching, the amorphous carbon layer that covers the CNT film can be properly removed without damaging the CNTs. Prolonged plasma treatment was able to cause a controllable disintegration of the graphitic structure, leading to the opening of some CNT end-caps.

Electrochemical and capacitive behavior of aligned CNT electrodes in ionic liquids was investigated using a PGSTAT30 potentiostat purchased from Eco Chemie B.V. The measurements were performed in a three-electrode electrochemical cell consisting essentially of the aligned CNT electrode (0.5×0.5 cm$^2$) as the working electrode, a platinum wire (1.5 mm diameter) as the auxiliary electrode, and a silver wire (1.5 mm diameter) as the quasi-reference electrode. Investigation was also performed for an activated carbon electrode (specific surface area: 1000~2000 m$^2$/g, thickness: 150 µm) that is currently employed for commercial supercapacitors. Ionic liquids 1-ethyl-3-methylimidazolium tetrafluoroborate ([EMIM] [BF$_4$]), 1-ethyl-3-methylimidazolium trifluoromethanesulfonate ([EMIM] [CF$_3$SO$_3$]), and 1-ethyl-3-methylimidazoliumbis(trifluoromethylsulfonyl) imide ([EMIM][Tf$_2$N]) were purchased from Sigma-Aldrich.

Figure 26A:
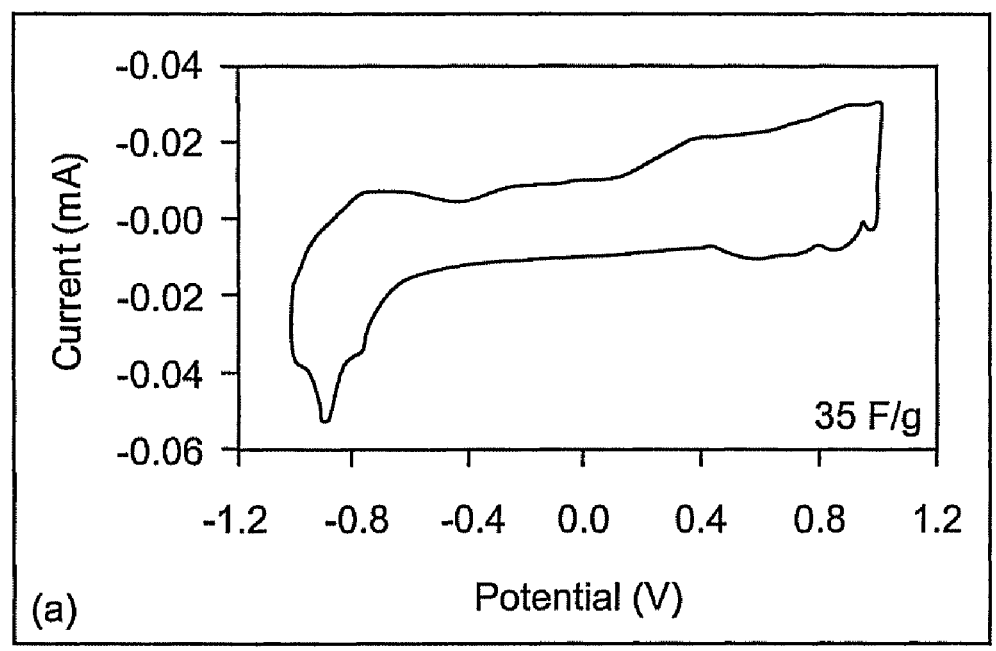
FIGS. 26A-B are cyclic voltammograms obtained in [EMIM][Tf$_2$N] for aligned CNT electrodes without (a) and with (b) plasma etching on the CNT film (the scan rate being 20 mV/s and capacitance being indicated in the CVs)
Figure 26B:
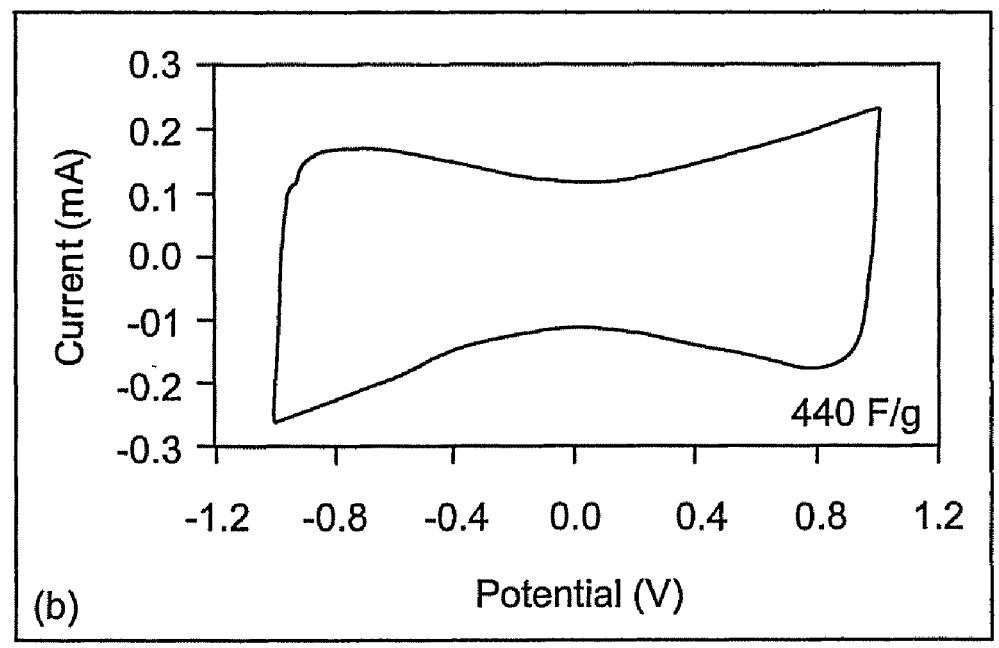

Electrochemical and capacitive behavior of the aligned CNTs in the ionic liquid was determined by the properties of both the aligned CNTs and the ionic liquids. First of all, plasma etching was demonstrated to be important in improving the charge capacity and charge storage/delivery capability for the aligned CNT electrodes. Without etching, the CNT electrode showed a low current (FIG. 26). After etching, the current magnitude of the CNT electrode increased significantly. It has been demonstrated previously that plasma etching can properly remove the amorphous carbon layer that covers the CNT film without damaging the CNTs. Electrochemically, this indicates the exposure of the open (loosely-packed) nanostructure of the CNTs to the electrolyte. Consequently, well-defined spacing (tens to hundreds of nanometers) of the CNTs ensures an intimate contact between the nanotubes and the electrolyte ions resulting in improved capacitance for the CNT electrode. Further, prolonged plasma treatment was able to cause a controllable disintegration of the graphitic structure, leading to the opening of some CNTs on the end-caps. Given the fact that diameters (10~15 nm) of these tubes are larger than the ionic diameters of the ionic liquids (see table of FIG. 27), the internal walls of the opened tubes of the CNTs are electrochemically accessible to the electrolyte. These factors resulted in an enhanced overall surface area and enhanced electrolyte accessibility and thus improved capacitance for the CNT electrode from 35 F/g to 440 F/g, after etching, clearly demonstrating the significant enhancement of plasma etching.

Figure 29:
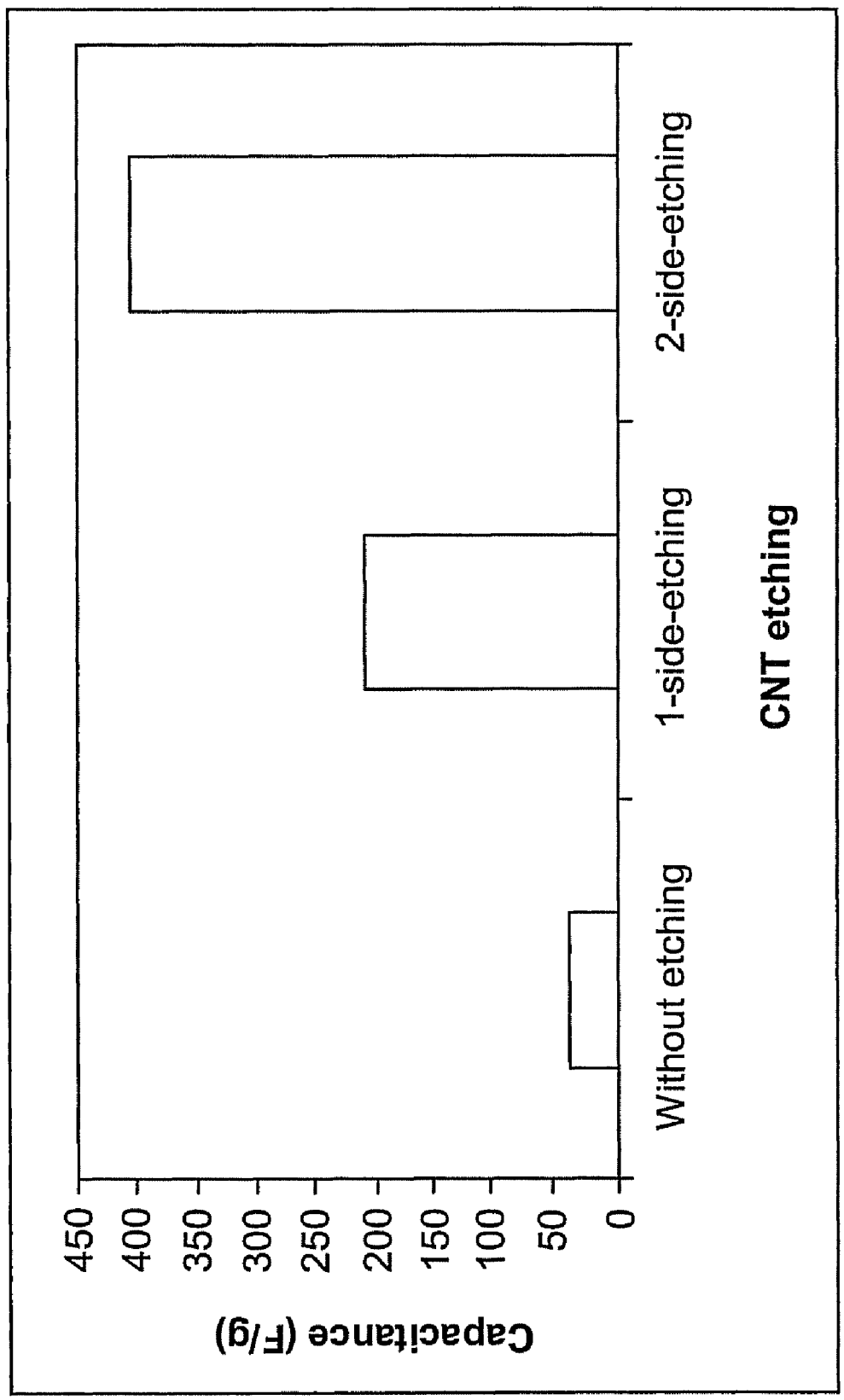
FIG. 29 is a plot of capacitance (bottom) obtained in [EMIM][Tf$_2$N] for aligned CNT electrodes without and with plasma etching on one side and two sides of the CNT film.

Furthermore, the results demonstrated that the plasma etching technique is also useful in removing loosely-bonded catalysts from the CNT film surface. As shown in (FIG. 6), after etching, an open (loosely-packed) nanostructure has been achieved for the CNT film. Thus, well-defined spacing ensures an intimate contact between the CNTs and the electrolyte ions, resulting in improved capacitance for the CNT electrode. Further, prolonged plasma treatment was able to cause a controllable disintegration of the graphitic structure, leading to the opening of some CNTs on the end-caps. Given the fact that diameters (10~15 nm) of these tubes are larger than the ionic diameters of the ionic liquids (FIG. 27), the internal walls of the opened tubes of the CNTs can be electrochemically accessible to the electrolyte. This improves the overall specific surface area and introduces additional charge capacity to the electrode. Moreover, etching on both sides of the CNT film can further improve the charge capacity for the CNT electrode. As shown in FIG. 29, after etching on both sides, the CNT electrode shows a capacitance two times higher than that of a one-side etched electrode and more than ten times higher than that of an untreated electrode, clearly demonstrating the significance of etching. Without etching, the appearance of some CV peaks of a CNT electrode (FIG. 26A) may be attributed to the presence of residual catalyst materials in the CNTs. Etching effectively removes these loosely-bonded catalysts from the CNTs and thus ensures a stable electrochemical behavior for the CNT electrode. Therefore, plasma etching was used for preparing all of the aligned CNT film electrodes in the following work.

Electrolyte choice is another important factor in determining the electrochemical and capacitive behavior of the CNTs. Among five groups of ionic liquids (imidazolium, pyridinium, pyrrolidinium, phosphonium, and ammonium), the imidazolium group was selected because of its relatively higher ionic conductivity and lower viscosity (two important properties for electrochemical applications). Further, in the imidazolium group, three ionic liquids (having the best combination of large electrochemical window, high ionic conductivity, and low viscosity) that have been tested in the above ultracapacitor research, were selected. Physical properties of these ionic liquids are summarized in FIG. 27.

Figure 32A:
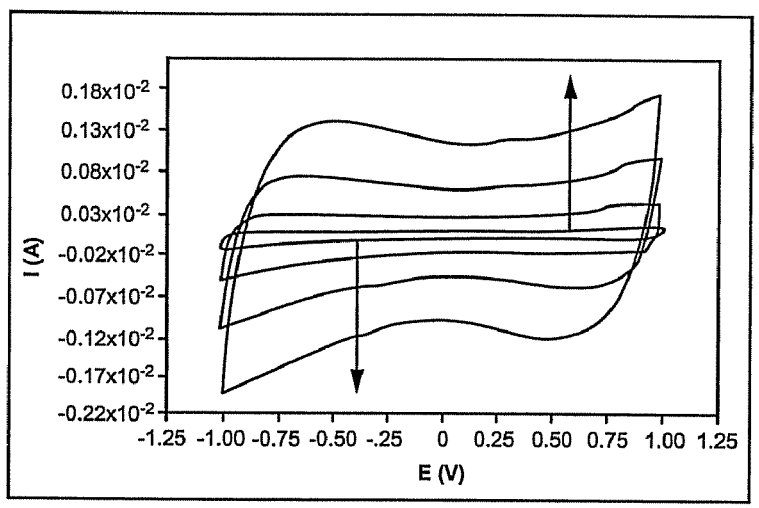
FIGS. 32A-C are CVs of aligned CNT electrodes obtained in [EMIM][BF$_4$] (FIG. 32A), [EMIM][Tf$_2$N] (FIG. 32B), and [EMIM][CF$_3$SO$_3$] (FIG. 32C) (with scan rate increasing from 5, 20, 50, to 100 mV/s as indicated by arrows)
Figure 32B:
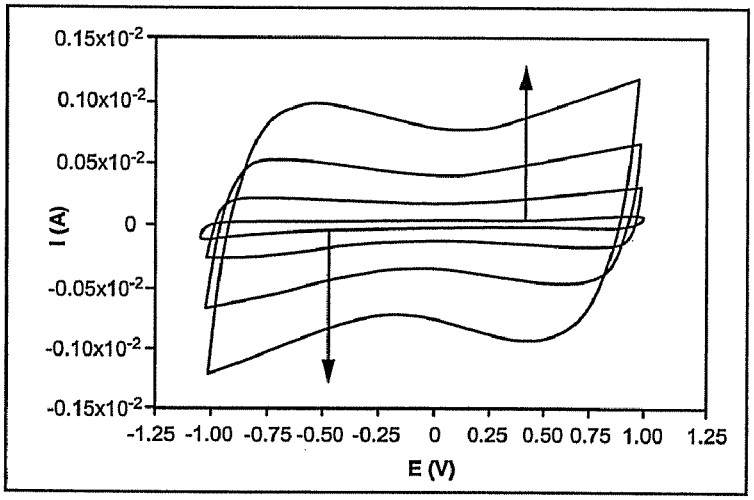
Figure 32C:
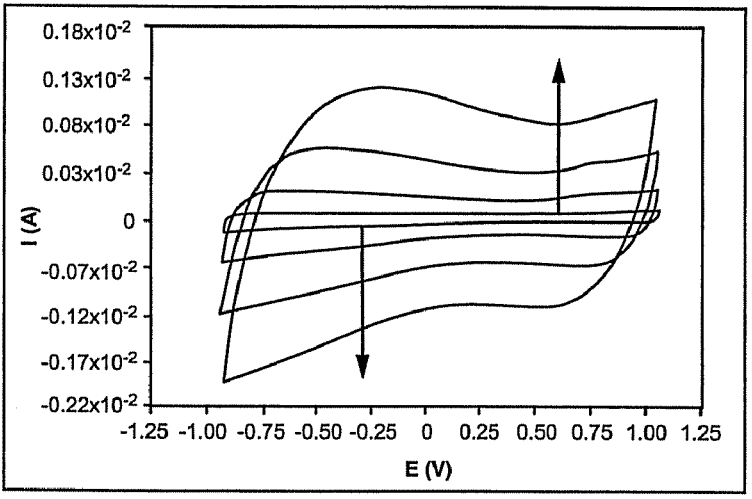

Similar butterfly-shape CVs were obtained for aligned CNT electrodes in all three ionic liquids (FIG. 32). Capacitive behavior of CNTs was determined by the combined effect of viscosity, ionic conductivity, and ion size of the ionic liquids. For example, [EMIM][BF$_4$] has the highest viscosity, thus, its higher ionic conductivity and smaller anion size (FIG. 27) is important in facilitating the transport of ions into the double layer of the CNT electrode. In contrast, the most import factor of [EMIM][Tf$_2$N] is its low viscosity, the lowest among all three ionic liquids. Low viscosity of [EMIM][Tf$_2$N] offsets the negative effect from its relatively lower ionic conductivity and the larger anion size. With moderate viscosity and anion size, [EMIM][CF$_3$SO$_3$] also produced a similar capacitance for CNTs. However, the less symmetric CV and the slower transient response at both ends of the CV in [EMIM][CF$_3$SO$_3$] suggest a slow charge/discharge process of CNTs in this ionic liquid. Due to this slow process, a pronounced decrease in capacitance of CNTs has been observed in [EMIM][CF$_3$SO$_3$] upon the increase of scan rate. In contrast, a fairly stable capacitance was observed for the CNTs in [EMIM][BF$_4$] and [EMIM][CF$_3$SO$_3$] upon increasing the scan rate up to 100 mV/s, indicating the fast charge/discharge process of CNTs in these two ionic liquids (FIG. 30).

Figure 31:
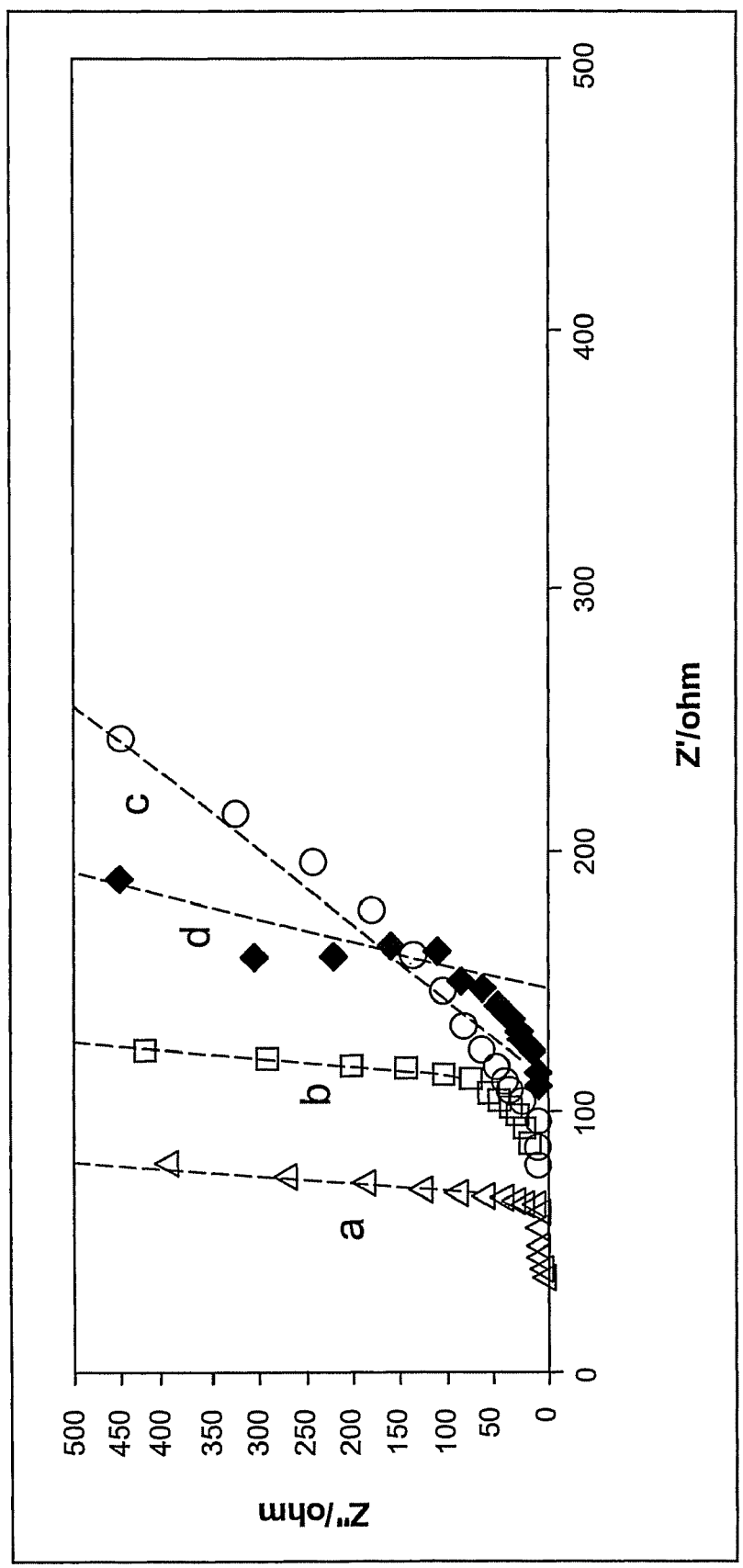
FIG. 31 is a plot of Z" against Z' providing AC impedance spectra obtained for aligned CNT electrodes in [EMIM][BF$_4$] (a), [EMIM][Tf$_2$N] (b), and [EMIM][CF$_3$SO$_3$] (c) and for an activated carbon electrode in [EMIM] [Tf$_2$N] (d) (with AC voltage amplitude being 5 mV, frequency range being 100K Hz-1 mHz, and the activated carbon electrode having a specific surface area of 1000~2000 m²/g and a thickness of 150 μm)

Capacitive behavior of CNTs in these ionic liquids was also investigated using AC impedance spectroscopy (FIG. 31). CNTs show a vertical line at low frequencies in all ionic liquids, a typical capacitive phenomenon, indicating that all ionic liquids functioned well as electrolytes for the CNTs. Steeper lines obtained in [EMIM][BF$_4$] and [EMIM][Tf$_2$N] suggest the better capacitive performance of CNTs in these two ionic liquids (Table 5). However, the more shallowly sloping line in [EMIM][CF$_3$SO$_3$] indicates its relatively poor capacitive behavior. At high frequencies, a 45° Warburg region, the consequence of the distributed resistance in a porous electrode, was observed for all ionic liquids. This 45° Warburg region expands following an order of [EMIM][BF$_4$] <[EMIM][Tf$_2$N]<[EMIM][CF$_3$SO$_3$], indicating the increase of the distributed resistance of the CNTs in these ionic liquids according to this order. In the cell set-up for this experiment, it was difficult to maintain a constant distance between the CNT electrode and the Pt wire auxiliary electrode, making it difficult to compare ESR (effective series resistance, i.e., the combination of electrolyte resistance, electrode resistance, and contact resistance) in different ionic liquids. However, EDR, the equivalent distributed resistance related to ion transport at the electrode interface, is a good indicator to measure the ion transport behavior at the electrode/electrolyte interface of the CNTs in different ionic liquids. A low EDR would be expected for a fast/easy ion transport at the electrode/electrolyte interface. This suggests that the ease of ion transport at the CNT/ionic liquid interface follows the order of [EMIM][BF$_4$]>[EMIM][Tf$_2$N]>[EMIM][CF$_3$SO$_3$] (Table 5). Accordingly, a higher ionic resistance (interfacial resistance between the electrode and the ionic liquid) due to the slower/more difficult transport of ions at the CNTs is confirmed in [EMIM][CF$_3$SO$_3$]. This will result in a low charge storage/delivery capability for the CNTs in this ionic liquid. Moreover, a frequency "knee" can be used to evaluate the frequency dependence of a capacitor material. At a frequency higher than the "knee", the real part of the impedance is frequency dependent and very small capacitance will be obtained. At a frequency below this value, the resistance changes weakly with frequency and the capacitor behavior tends to approach that of a pure capacitance. The knee frequency decreases following the order of [EMIM][BF$_4$]>[EMIM][Tf$_2$N]>[EMIM][CF$_3$SO$_3$], suggesting the capacitive behavior of the CNTs in these ionic liquids decreases according to this order. Having the lowest knee frequency, [EMIM][CF$_3$SO$_3$] produces the smallest capacitive property for the CNTs.

Figure 30:
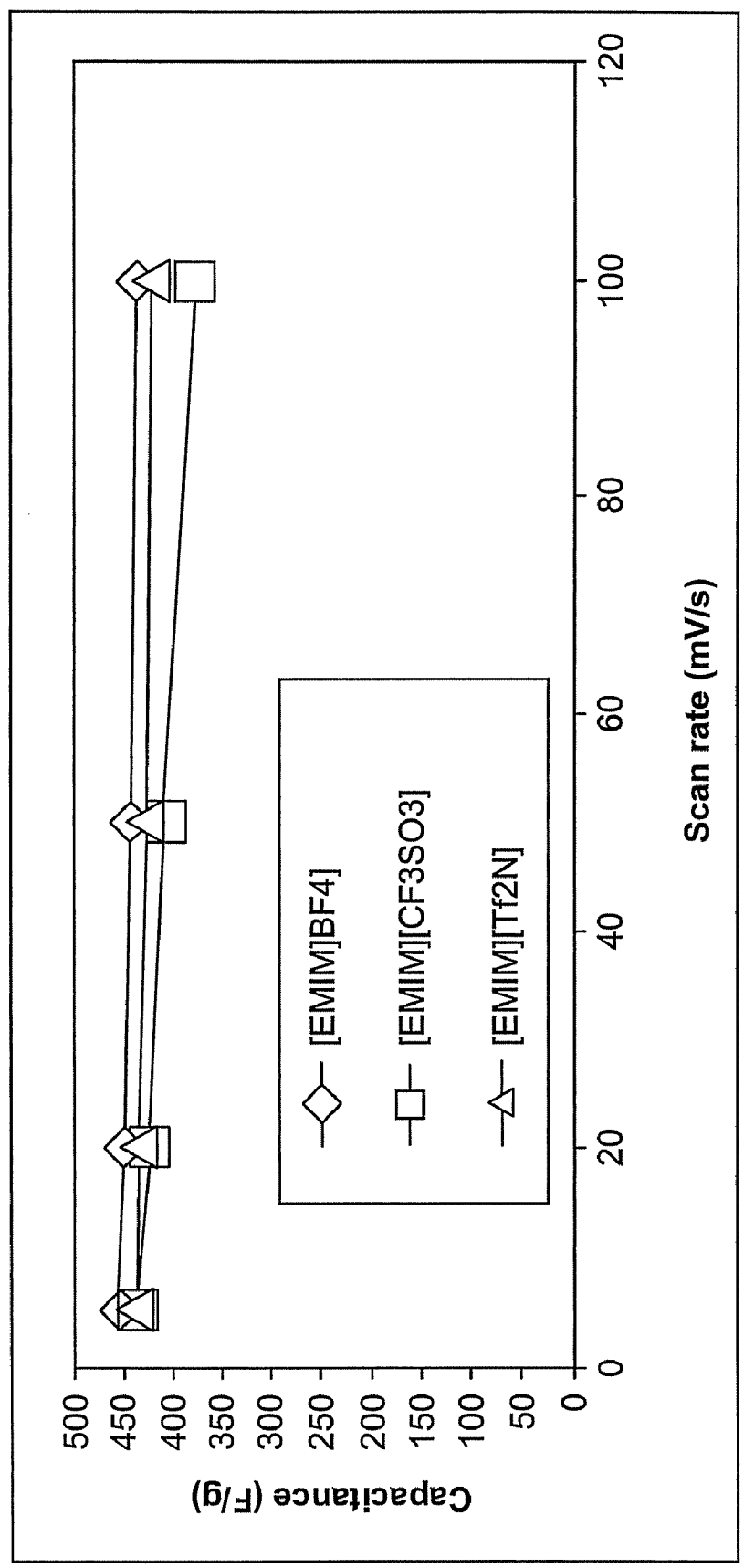
FIG. 30 is a plot of capacitance versus scan rate showing the effect of scan rate on capacitance of aligned CNT electrodes obtained in different ionic liquids (data being from FIGS. 28A-D)

Poor capacitive performance of [EMIM][CF$_3$SO$_3$] determined by AC impedance spectroscopy is consistent with the less symmetric CV and the slower transient response at both ends of the CV (FIG. 32C) and the decrease in capacitance of CNTs at a high scan rate (FIG. 30).

TABLE 5

Capacitive behavior of aligned CNTs and activated carbon (AC) in different ionic liquids

| Sample | EDR (Ω) | Knee frequency (Hz) | Line slope at low frequencies |
|---|---|---|---|
| CNTs in [EMIM][BF$_4$] | 4.6 | 0.87 | 25.2 |
| CNTs in [EMIM][Tf$_2$N] | 8.2 | 0.60 | 24.3 |
| CNTs in [EMIM][CF$_3$SO$_3$] | 84.5 | 0.13 | 4.0 |
| AC in [EMIM][Tf$_2$N] | 39.3 | 0.02 | 9.4 |

In short, determined by the low EDR, high knee frequency, and high low-frequency line slope, capacitive performance of the aligned CNT electrodes in these ionic liquids can be decided to be [EMIM][BF$_4$]>[EMIM][Tf$_2$N]>[EMIM][CF$_3$SO$_3$]. However, considering the overall requirements of high performance, safe operation, and long cycle life for ultracapacitors, [EMIM][BF$_4$], may not be the good choice due to its water miscibility and relatively narrow electrochemical window. Instead, [EMIM][Tf$_2$N] has been determined to be the best ionic liquid because of its large electrochemical window, low viscosity, water immiscibility, and high decomposition temperature, ensuring high performance and long cycle life for the resulting ultracapacitors.

Figure 33A:
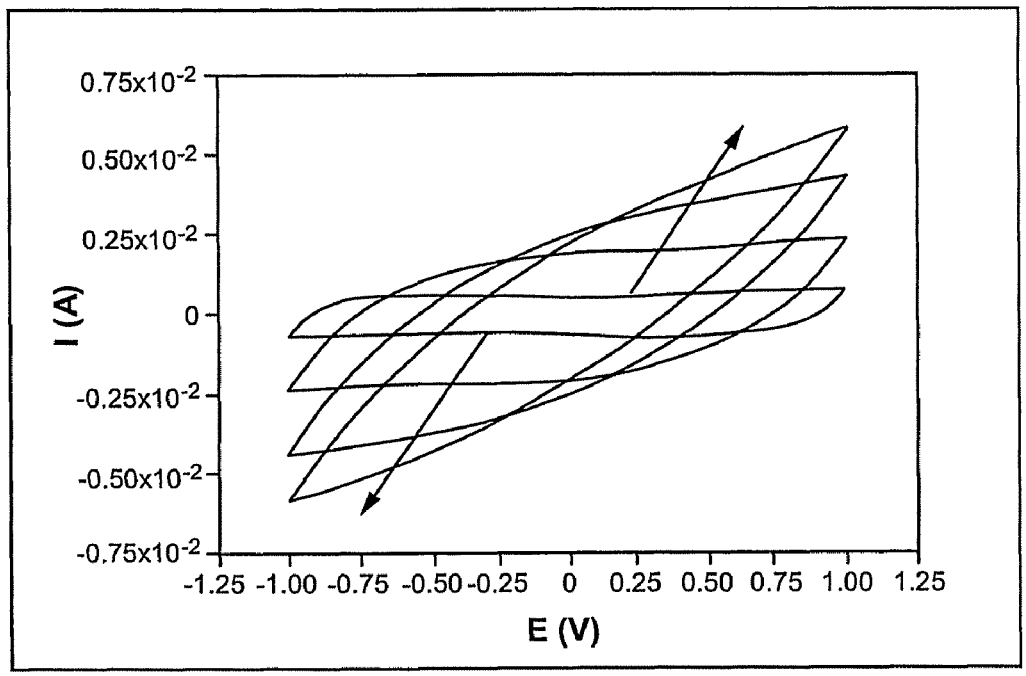
FIGS. 33A-B provide CVs (FIG. 33A) and capacitance (FIG. 33B) obtained for an activated carbon electrode in [EMIM] [Tf$_2$N] (with scan rate increasing from 5, 20, 50, to 100 mV/s as indicated by arrows)
Figure 33B:
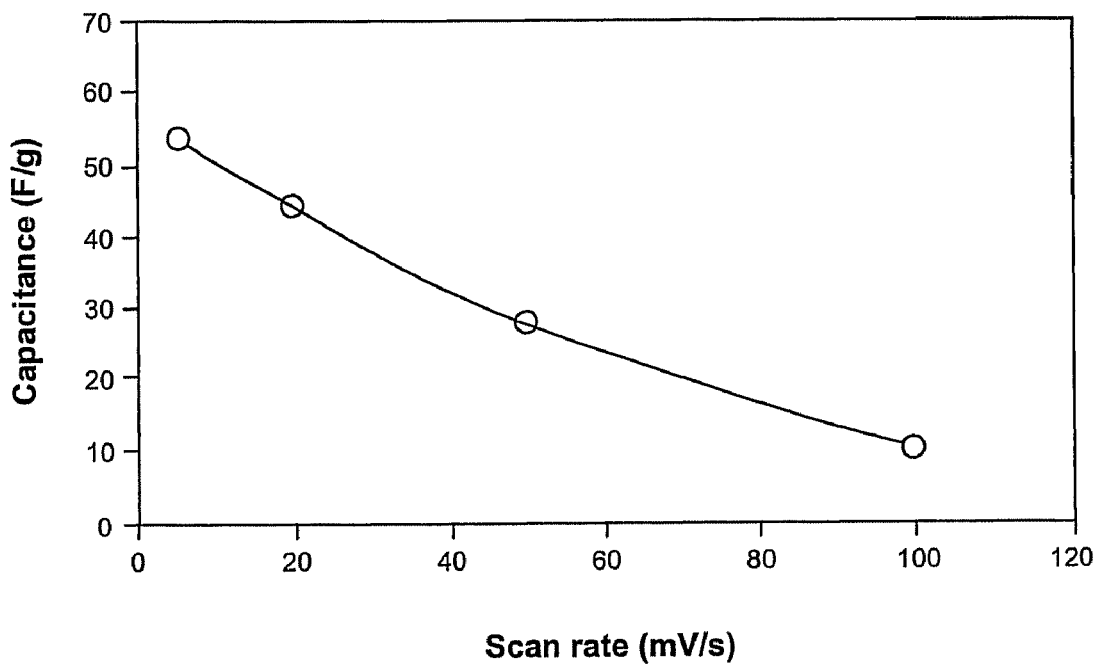

[EMIM][Tf$_2$N] demonstrates superior electrochemical and capacitive performance of aligned CNTs over the currently employed activated carbon electrode materials. Fast charge/discharge process and thus a high capacitance (FIGS. 32A-C) of aligned CNTs remained upon the fast potential cycling (up to 100 mV/s). However, at a scan rate higher than 5 mV/s, the typical rectangle-shape of an activated carbon electrode disappeared accompanying with the rapid decrease of its capacitance (FIGS. 33A-B), indicating a slow charge/discharge process for activated carbons in the ionic liquid. A very high capacitance (~430 F/g) has been achieved for aligned CNTs in [EMIM][Tf$_2$N], which is much higher than that (~50 F/g) of the activated carbons. Although they have a high surface area (1000~2000 m$^2$/g), low mesoporosity and thus low electrolyte accessibility of activated carbons is likely responsible for this observation. Again, poor capacitive behavior of the activated carbon can be confirmed by its higher EDR, lower knee frequency, and smaller low-frequency line slope comparing to those of the aligned CNTs (Table 5).

These results prove the concept that superior electrical properties and porosity of aligned CNTs can be utilized to produce high electrochemical and capacitive performance for the CNTs in ionic liquids. It should be mentioned that the relatively high viscosity of ionic liquids comparing to conventional aqueous and organic electrolytes is disadvantageous for electrochemical applications (including ultracapacitors). However, the discovery here indicates that, with their unique properties, aligned CNTs are ideal materials to overcome this problem. Also, the capacitance obtained in ionic liquids for these aligned CNTs is higher than that obtained in 1 M H$_2$SO$_4$ for a similar electrode material, namely, a CNT array electrode prepared by chemical vapor deposition in the template of porous alumina. This demonstrates that the template-free synthesis and the plasma etching (opening) procedure employed in this project are better approaches to prepare CNTs with highly aligned and open structures and high surface area, ensuring their higher capacitance (even in ionic liquids).

In conclusion, the template-free synthesis approach was used to obtain highly aligned CNTs for ultracapacitor applications. High alignment of nanotubes and well-defined spacing between the tubes provide the CNTs with a high surface area and high electrolyte accessibility, ensuring a high capacitance, fast charge/discharge process, and excellent capacitive behavior for the CNT film electrode in the ionic liquids. Plasma etching has been demonstrated to be very useful in removing the amorphous carbon layer from the top surface of the CNT film and in opening end-caps of the CNTs, enhancing the overall specific surface area of the CNT film and the electrolyte accessibility of the CNTs from both the external and internal surfaces so as to significantly improve the capacitance of the CNT film electrodes. In the optimized ionic liquid, [EMIM][Tf$_2$N], the optimized aligned CNTs film electrode (two-side etched) shows a much higher capacitance (430 F/g vs. 50 F/g) and faster charge/discharge process than an activated carbon electrode.

Figure 34A:
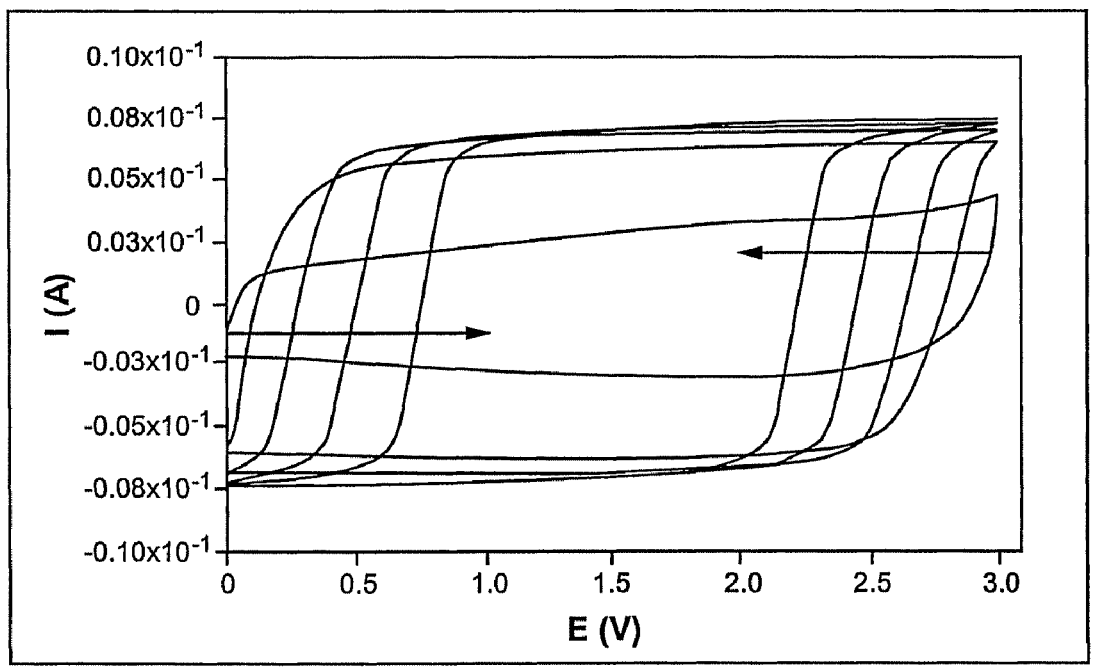
FIGS. 34A-B provide CVs of an ultracapacitor fabricated from activated carbon electrodes and [EMIM][Tf$_2$N], AC/IL capacitor (with FIG. 34A being from 0~3V and FIG. 34B being from 0~4V and the scan rate increasing from 5, 20, 50, 100, to 200 mV/s as indicated by arrows)
Figure 34B:
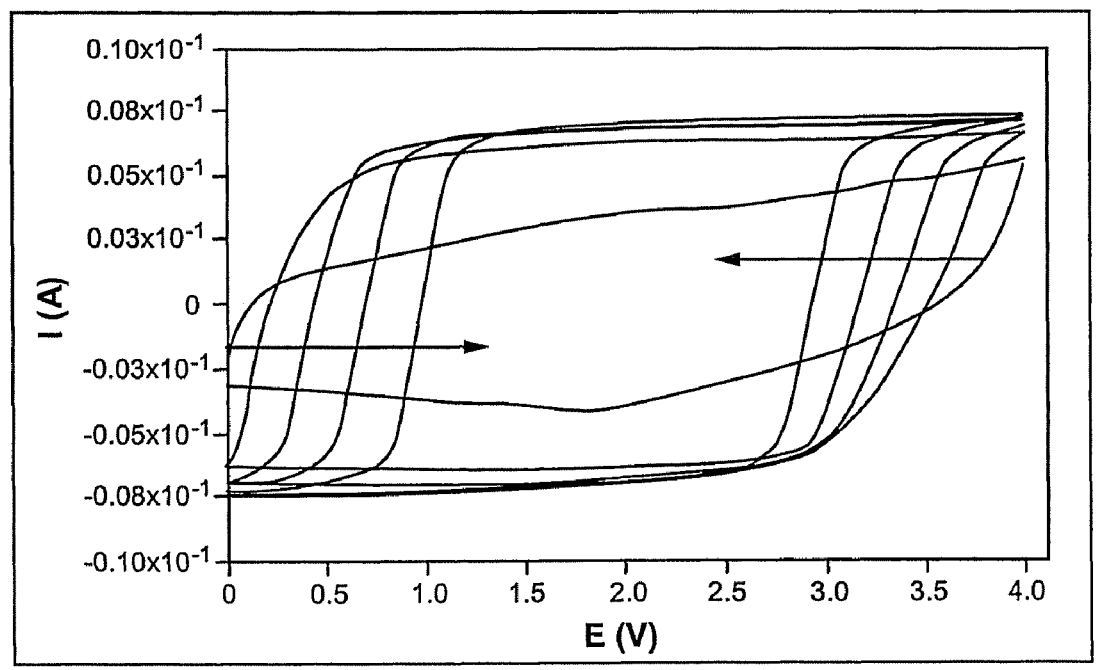
Figure 35A:
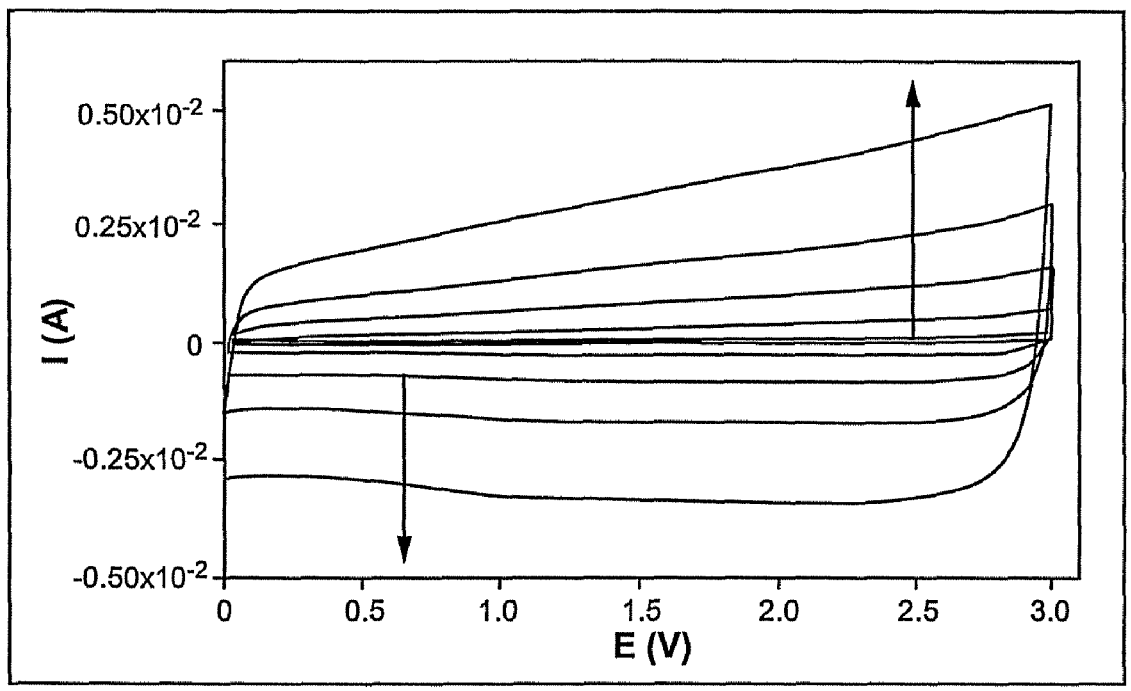
FIGS. 35A-B are CVs of an ultracapacitor fabricated from aligned CNT electrodes and [EMIM][Tf$_2$N], CNT/IL capacitor (with FIG. 35A being from 0~3V and FIG. 35B being from 0~4V and the scan rate increasing from 5, 20, 50, 100, to 200 mV/s as indicated by arrows)
Figure 35B:
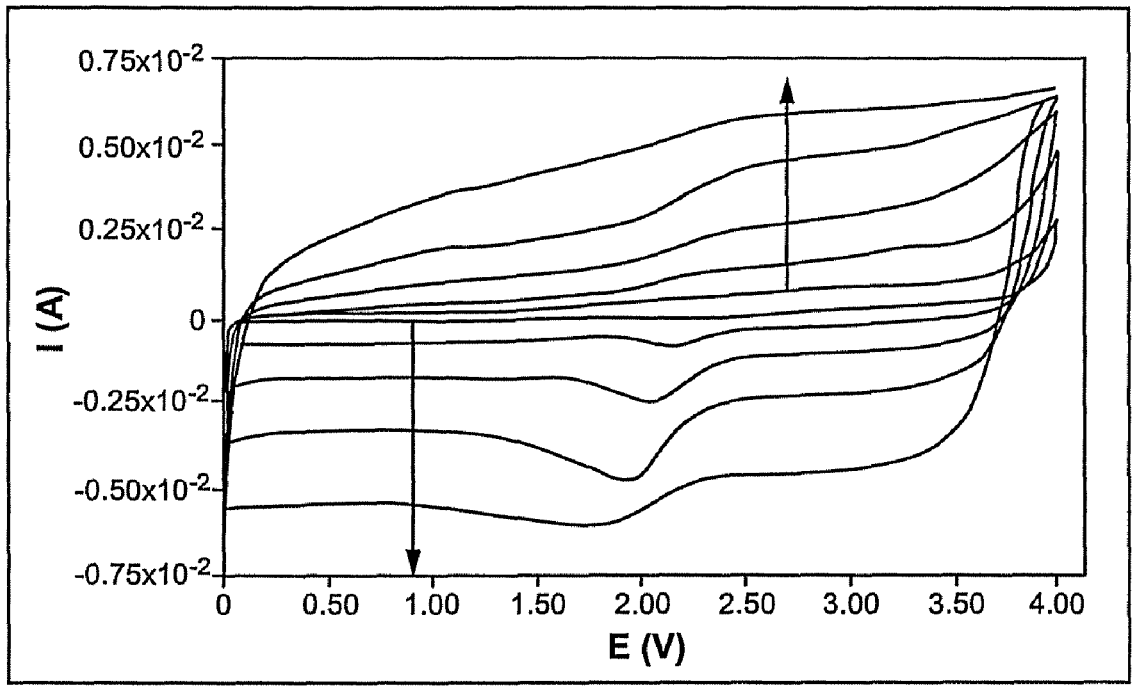

Finally, the CNT capacitors (CNT/IL) were compared to AC capacitors (AC/IL) using the same ionic liquids. Both capacitors showed well-defined rectangle-shape CVs (FIGS. 34A-B and FIGS. 35A-B). Due to the large electrochemical window of the ionic liquid employed, a large cell voltage of 4V was observed for both capacitors. Charging/discharging the AC/IL capacitor with an increased scan rate from 5 to 20 mV/s resulted in an increased current. However, further increase of the scan rate (>20 mV/s) did not lead to the increase of the current as expected. Instead, a fairly unchanged current and a shrunk CV (shown by arrows) were observed, indicating poor charge storage/delivery capability and slow charge/discharge process of the AC/IL capacitor (FIGS. 34A-B). This should be attributed to the low electrolyte accessibility and poor capacitive behavior of the activated carbons. In contrast, the CNT/IL capacitor shows an increased current (shown by arrows) and remains the well-defined rectangle CV upon charging/discharging up to 200 mV/s (FIGS. 35A-B), indicating its excellent charge storage/delivery capability and fast charge/discharge process. Moreover, upon cycling to 4 V, the CNT/IL capacitor showed an additional redox process at around 2 V. This may be due to the presence of the trace amount of firmly-bonded catalysts in the CNTs, whose electroactivity can be triggered upon charging the capacitor to a high voltage. It is likely that, different from the loosely-bonded catalysts, the firmly-bonded catalysts cannot be removed from the CNTs by plasma etching. Importantly, this additional redox process is fast and reversible, introducing additional pseudocapacitance and thus charge storage capacity to the capacitor.

Figure 36A:
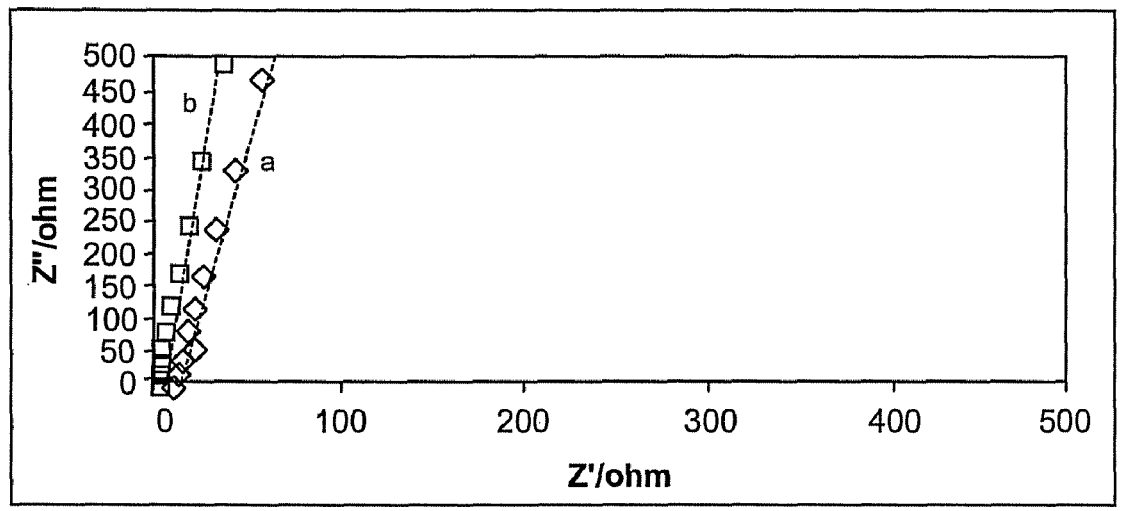
FIGS. 36A-B provide AC impedance spectra obtained for an AC/IL capacitor (a) and a CNT/IL capacitor (b) (the spectra being recorded for all capacitors at open-circuit AC voltage amplitude of 5 mV and a frequency range of 100K Hz-1 mHz)
Figure 36B:
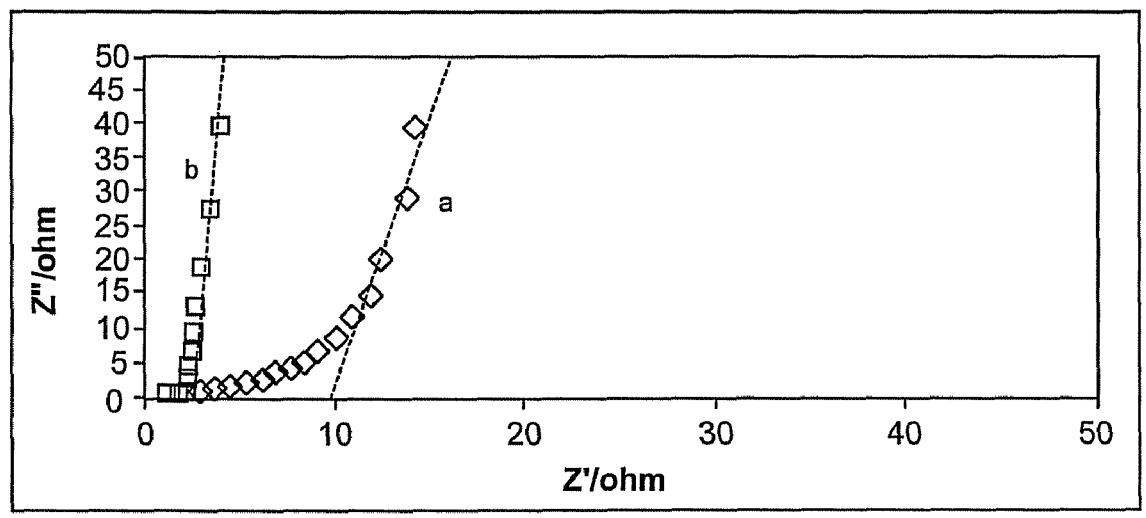

Capacitive behavior of these capacitors was further investigated by AC impedance spectroscopy, showing vertical lines at low frequencies for both capacitors (FIG. 36). From the AC impedance spectra, capacitive behavior parameters of capacitors are summarized as in Table 6. As can be seen, a similar ESR was observed for both capacitors, suggesting the similar electrical conductivity of the two types of electrode materials employed. However, the AC/IL capacitor shows a very high EDR and an expanded 45° Warburg region, indicating a high interfacial resistance and a slow/difficult transport of electrolyte ions at the electrode/electrolyte interface of the capacitor. Poor capacitive behavior of this capacitor can be confirmed by its small slope of the low-frequency line and a very small knee frequency.

charge straight line. Again, high interfacial resistance and slow/difficult ion transport at the interface between the activated carbon and the ionic liquid are responsible for this problem. In contrast, the CNT/IL capacitor can be charged/discharged rapidly. The well-defined discharge straight line clearly demonstrates that the stored energy of the capacitor can be delivered rapidly. Increasing the cell voltage from 3 V to 4 V resulted in a relatively slow charge process for the capacitor. This is believed to be due to the introduction of the redox process at a high voltage (as discussed above for FIGS. 35A-B). Nevertheless, due to the preferable nanostructures of the aligned CNTs, the stored energy still can be delivered rapidly. Importantly, use of the high capacitor voltage and the introduction of pseudo-capacitance to the CNTs can further enhance performance of the capacitor (FIG. 28).

Figure 28:
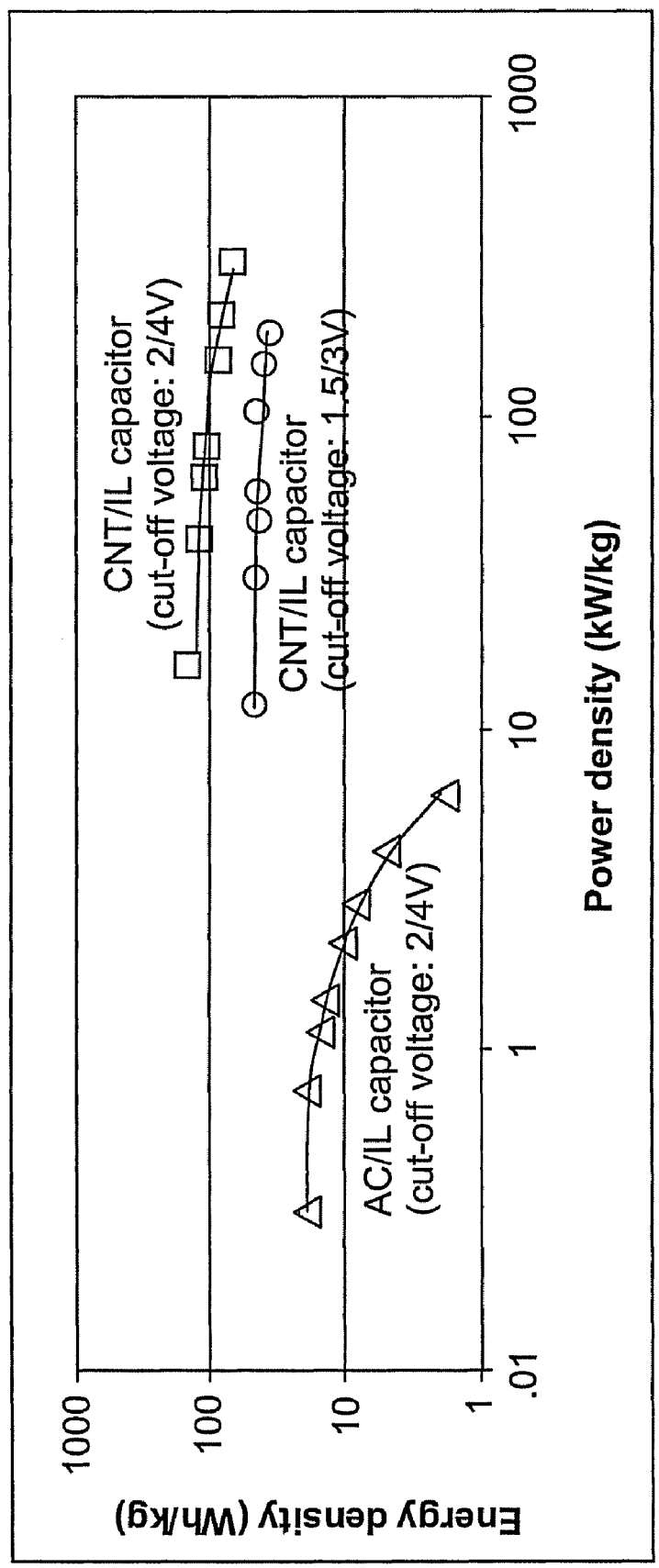
FIG. 28 provides Ragone plots of AC/IL and CNT/IL capacitors (with the charge/discharge current density being 2~50 mA/cm²)

From the discharge curves obtained at different current densities, energy and power densities were calculated for these two capacitors and are presented in Ragone plots (FIG. 28). For the AC/IL capacitor, upon the increase of the power density, the energy density decreases, a typical phenomena for most conventional ultracapacitors. This means that, to achieve a high power for the capacitor, its energy storage capacity will decrease rapidly. This has long been a problem for conventional ultracapacitors. In contrast, the CNT/IL capacitor shows a high power density at a high energy density, indicating that the high energy stored in CNTs can be delivered very rapidly to achieve a high power. For example, a high energy density of 100 Wh/kg can be maintained at a power density as high as 100 kW/kg. Unique properties of aligned CNTs discussed above are responsible for this significance. From these results, maximum energy density ($E_{max}$) and maximum power density ($P_{max}$) of the capacitors are obtained and included in Table 6. It should be stressed that energy and power densities of the CNT/IL ultracapacitor are also higher

TABLE 6

Capacitive behavior and performance of ultracapacitors.

| Electrode material of ultracapacitor | ESR ($\Omega$) | EDR ($\Omega$) | Line slope at low frequencies | Knee frequency (Hz) | $E_{max}$ (Wh/kg) | $P_{max}$ (kW/kg) | $E_{max}$ (Wh/kg)* | $P_{max}$ (kW/kg)* |
|---|---|---|---|---|---|---|---|---|
| Activated carbon | 1.55 | 8.2 | 10.1 | 0.09 | 19.6 | 6.3 | 6.9 | 2.2 |
| Aligned CNTs | 1.51 | 0.5 | 14.1 | 54.3 | 148.1 | 315 | 51.8 | 110.3 |

*Performance of packaged cells, estimated by multiplying the active-material-based performances by a factor of 0.35

In contrast to the AC/IL capacitor, excellent capacitive behavior was obtained for the CNT/IL capacitor. This can be clearly supported by its much lower EDR, larger slope of the low-frequency line, and higher knee frequency than those of the AC/IL capacitor (Table 6). Highly aligned and open structures and excellent electrolyte accessibility of the aligned CNTs are responsible for these findings. We noticed that the knee frequency of our CNT/IL capacitor (54 Hz) is also much higher than that of most commercially available ultracapacitors (usually <1 Hz), including those specially designed for high power applications, suggesting that most of the stored energy of the CNT/IL capacitor is accessible at frequencies as high as 54 Hz. This larger frequency response means better power performance in demand applications.

Figure 37A:
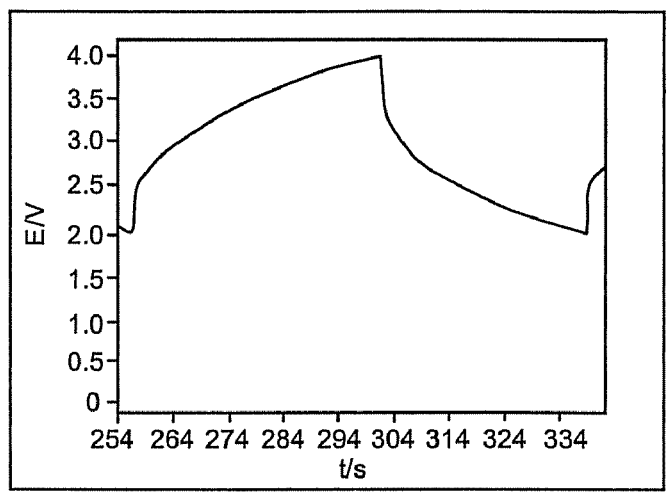
FIGS. 37A-C provide galvanostatic charge/discharge curves obtained for an AC/IL capacitor (FIG. 37A) and for a CNT/IL capacitor (FIGS. 37B and C) (with the current density being 10 mA/cm² and cut-off voltage for charge/discharge being 2.0/4.0V (FIGS. 37A and C) and 1.5/3V (FIG. 37B)).
Figure 37B:
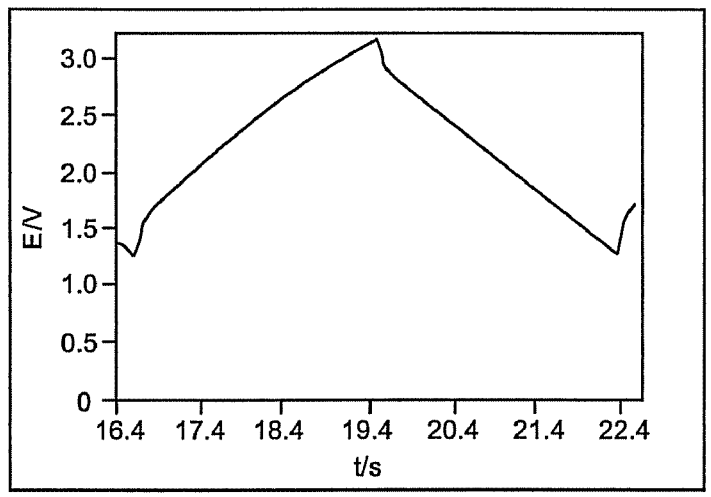
Figure 37C:
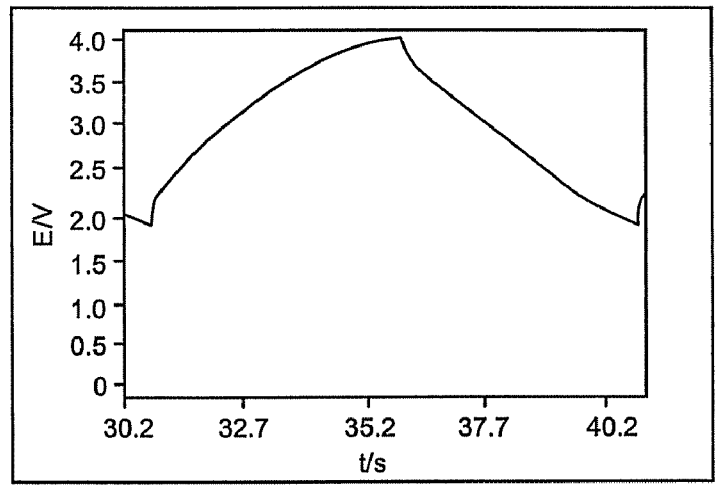

Furthermore, these capacitors were subjected to galvanostatic charge/discharge tests at a range of different current densities. As an example, the charge/discharge curves obtained at a moderate current density of 10 mA/cm² are shown in FIGS. 37A-C. As can be seen, a slow discharge process was obtained for the AC/IL capacitor evidenced by a bent discharge curve and the uncertainty of defining a disthan those CNT ultracapacitors (aqueous electrolyte-based) reported in the literature. This should be due to the use of not only highly aligned CNT electrodes but also high-electrochemical window ionic liquids in the present project. Indeed, as proposed and demonstrated, this combination of the unique properties of aligned CNTs with those of ionic liquids is an innovative aspect of the work and holds the potential to revolutionize ultracapacitor technology.

A number of variations and modifications of the invention can be used. It would be possible to provide for some features of the invention without providing others.

For example in one alternative embodiment, the solvent or swelling agent, which in this instance is identical with the ionic liquid, remains in the ILGPE composition. This is particularly advantageous for multiphase polymer systems in which, for example, only one of the polymeric components is compatible with the ionic liquid. An additional result can be novel properties for the multiphase system, preferably at the phase boundaries. Another possible use of the ILGPE composition in which the ionic liquid remains present is the dissolving or solvating of one polymer component of a multiphase system, where another polymer component is incompatible with the simple ionic liquid. Through mixing or kneading of this multiphase system it is possible for the ionic liquid to migrate into the phase which is incompatible with the simple ionic liquid.

In another embodiment, the dispersion of the ionic liquid in the polymer composition takes place by means of a mixing process. Here, the ionic liquid is brought into contact with, and then thoroughly mixed with, the molten phase of the polymer host. Another method brings the ionic liquid into contact with the solid phase of the polymeric component, melts the polymer host, and then thoroughly mixes the ionic liquid and polymer host. One way of achieving this is to use mechanical mixing of the polymer host and the ionic liquid by means of an extruder or stirrer at appropriate temperatures, and preference is given to mixing of the individual components of the ILGPE composition in a single- or twin-screw kneader, the polymer host being molten. It is also possible for the polymer host to become dissolved in the ionic liquid at relatively high temperatures during the mixing process, or for both the polymer host and the ionic liquid to be dissolved in a solvent. In one embodiment, the polymer host, which comprises precipitated, spray-dried, or (low-temperature-)milled polymer, for example, is mixed with the ionic liquid, where appropriate via addition of a solvent which can dissolve the ionic liquid but cannot dissolve the polymeric component, thus giving homogeneous dispersion of the ionic liquid in the polymer composition of the invention.

In other embodiments, the ultracapacitors of the present invention are used in applications other than hybrid electric vehicles. For example, in consumer electronics, they can be used for notebook computers, cellular telephones, pagers, videocameras, and hand-held tools. In medical electronics, they can be used for portable defibrillators, drug delivery units, and neurological stimulators. In the military and defense, the ultracapacitors can be used in specialized mobile power applications such as communication devices, unmanned aerial vehicles, spacecraft probes, and missile systems. Environmentally friendly solid-state ILGPEs can benefit a wide range of other electrochemical devices (such as batteries, electrochromic devices, sensors, photoelectrochemical solar cells, and light emitting electrochemical cells) with high performance and extended lifetimes.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An electrochemical energy storage device, comprising:
   (a) first and second electrodes, the first and second electrodes being oppositely charged and primarily comprising substantially aligned carbon nanotubes, the aligned carbon nanotubes having opposing first and second ends; and
   (b) an electrolyte material, comprising oppositely charged ions, in contact with at least most of the first ends of the aligned carbon nanotubes of the first and second electrodes, wherein at least one of the first ends in contact with the electrolyte material is open to permit the charged ions to access an interior surface of the corresponding carbon nanotube, wherein the charged ions have a size less than the corresponding carbon nanotube interior diameter, and wherein the carbon nanotubes have been etched and amorphous carbon covering the carbon nanotube surface has been removed.

2. The electrochemical energy storage device of claim 1, wherein longitudinal axes of at least most of the aligned carbon nanotubes of the first and second electrodes are substantially parallel to one another along substantially the entire length of the carbon nanotube, and wherein at least most of the first ends in one or both of the first and second electrodes are open.

3. The electrochemical energy storage device of claim 1, wherein at least most of the opposing second ends of the aligned carbon nanotubes in one or both of the first and second electrodes are open, and wherein the charged ions comprise at least one of pyridinium, pyridazinium, pyrimidinium, pyrazinium, imidazolium, pyrazolium, thiazolium, oxazolium, triazolium, ammonium, pyrrolidinium, pyrrolinium, pyrrolium, and piperidinium.

4. The electrochemical energy storage device of claim 1, wherein at least most of the aligned carbon nanotubes comprising the first and second electrodes have lengths of at least about 75 microns, inter-carbon nanotube spacings ranging from about 5 to about 1,000 nm, and diameters ranging from about 0.25 to about 250 nm.

5. The electrochemical energy storage device of claim 1, wherein the electrolyte material comprises an ionic liquid having a melting point of no more than about 100 degrees Celsius, a decomposition temperature of at least about 200 degrees Celsius, a viscosity of no more than about 200 Cp, an ionic conductivity of at least about 0.1 mS/cm, and an electrochemical window of at least about 2 Volts.

6. The electrochemical energy storage device of claim 5, wherein the ionic liquid comprises:

(A) at least one cation selected from the group of cations consisting of the following compounds and mixtures thereof:

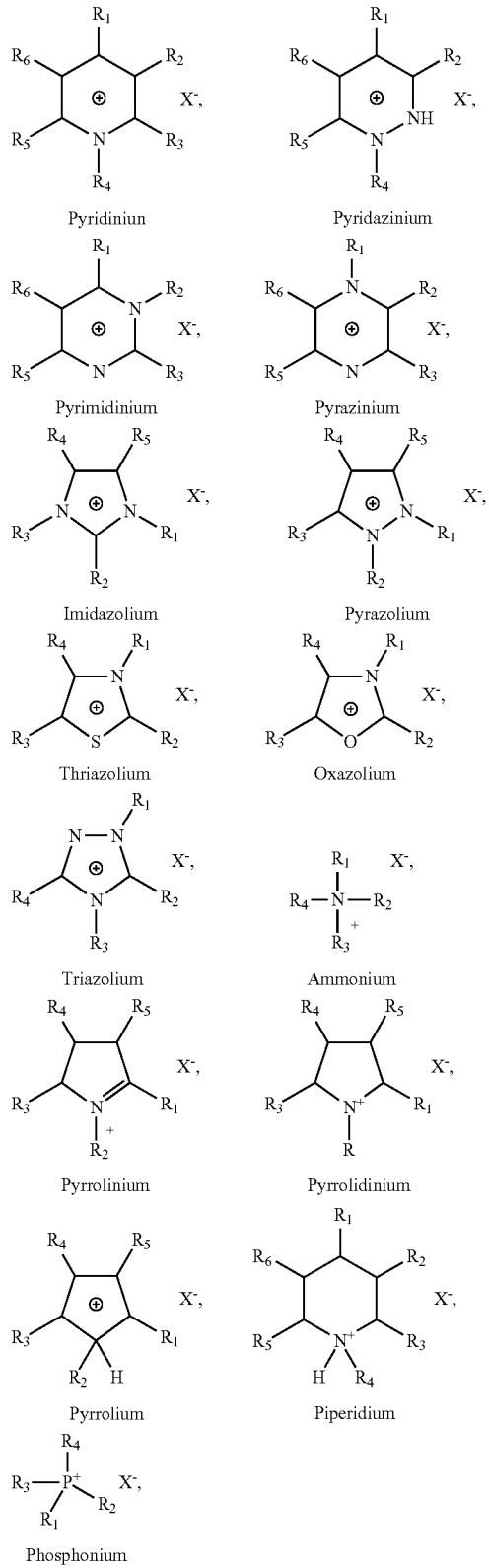

wherein $R_1$, $R_2$, $R_3$, $R_4$, $R_5$, and $R_6$ of the cationic components are identical or different and are selected from the group consisting of:
(i) a hydrogen;
(ii) a halogen;
(iii) a hydroxyl;
(iv) an amine;
(v) a thiol;
(vi) a $C_1$ to $C_{25}$ straight-chain or branched aliphatic hydrocarbon radical;
(vii) a $C_5$ to $C_{30}$ cycloaliphatic hydrocarbon radical;
(viii) a $C_6$ to $C_{30}$ aromatic hydrocarbon radical;
(ix) a $C_7$ to $C_{40}$ alkylaryl radical;
(x) a $C_2$ to $C_{25}$ linear or branched aliphatic hydrocarbon radical having interruption by one or more heteroatoms, such as, oxygen, nitrogen or sulfur;
(xi) a $C_2$ to $C_{25}$ linear or branched aliphatic hydrocarbon radical having interruption by one or more functionalities selected from the group of hydrocarbon radials consisting of:
(a')a carbonyl;
(b')an ester;
(c') an amide, where R' is selected from the group consisting of hydrogen, $C_1$-$C_{12}$ straight-chain, branched or cyclic alkane or alkene;
(d')a sulfonate;
(e') a sulfonamide, where R' is selected from the group consisting of hydrogen, $C_1$-$C_{12}$ straight-chain, branched or cyclic alkane or alkene;
(xii) a $C_2$ to $C_{25}$ linear or branced aliphatic hydrocarbon radical terminally functionalized by Cl, Br, F, I, NH, OH, $NH_2$, $NHCH_3$ or SH;
(xiii) a $C_5$ to $C_{30}$ cycloaliphatic hydrocarbon radical having at least one heteroatom selected from the group of heteroatoms consisting of O, N, S, and optionally substituted with at least one of the following Cl, Br, F, I, NH, OH, $NH_2$, $NHCH_3$ or SH;
(xiv) a $C_7$ to $C_{40}$ alkylaryl radical having at least one heteroatom selected from the group of heteroatoms consisting of O, N, S, and optionally substituted with at least one of the following:
(a") a $C_2$ to $C_{25}$ straight-chain or branched hydrocarbon radical substituted with at least one of the following Cl, Br, F, I, NH, OH, $NH_2$, $NHCH_3$ or SH;
(b") a $C_5$ to $C_{30}$ cycloaliphatic hydrocarbon radical substituted with at least one of the following Cl, Br, F, I, NH, OH, $NH_2$, $NHCH_3$ or SH
(c") a hydroxyl;
(d") an amine;
(e") a thiol;
(xv) a polyether of the type —O—(—$R_7$—O—)$_n$—$R_8$ or block or random type —O—(—$R_7$—O—)$_n$—(—$R_7$—O—)$_m$—$R_8$, wherein at least one of the following is true:
(a''') $R_7$ is a linear or branched hydrocarbon radical having from 2 to 4 carbon atoms;
(b''') $R_7$ is a linear or branched hydrocarbon radical having from 2 to 4 carbon atoms; and
(c''') wherein n is from 1 to 40; and
(d''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and (xvi) a polyether of the type —O—(—R$_7$—O—)$_n$—C(O)—R$_8$ or block or random type —O—(—R$_7$—O—)$_n$—(—R$_{7'}$—O—)$_m$—C(O)—R$_8$, wherein at least one of the following is true:
(a"") R$_7$ is a linear or branched hydrocarbon radical having from 2 to 4 carbon atoms;
(b"") R$_{7'}$ is a linear or branched hydrocarbon radical having from 2 to 4 carbon atoms; and
(c"") wherein n is from 1 to 40; and
(d"") R$_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and (B) at least one anion selected from the group of anions consisting of F$^-$; Cl$^-$; Br$^-$; I$^-$; NO$_3^-$; N(CN)$_2^-$; BF$_4^-$; ClO$_4^-$; PF$_6^-$; RSO$_3^-$; RCOO$^-$; where R is an alkyl group, substituted alkyl group, or phenyl group; (CF$_3$)$_2$PF$_4^-$; (CF$_3$)$_3$PF$_3^-$; (CF$_3$)$_4$PF$_2^-$; (CF$_3$)$_5$PF$^-$; (CF$_3$)$_6$P$^-$; (CF$_2$SO$_3^-$)$_2$; (CF$_2$CF$_2$SO$_3^-$)$_2$; (CF$_3$SO$_2^-$)$_2$N$^-$; CF$_3$CF$_2$(CF$_3$)$_2$CO$^-$; (CF$_3$SO$_2^-$)$_2$CH$^-$; (SF$_5$)$_3$C$^-$; (CF$_3$SO$_2$)$_3$C$^-$; [O(CF$_3$)$_2$C$_2$(CF$_3$)$_2$O]$_2$PO$^-$; (CF$_3$(CF$_2$)$_7$SO$_3^-$; and mixtures thereof.

7. The electrochemical energy storage device of claim 5, wherein the electrolyte material further comprises an inorganic filler, and wherein at least most of the inorganic filler comprises particles having a surface area of at least about 10 m$^2$/g, a maximum dimension of about 50 micrometers, and an average pore size of less than about 10 micrometers.

8. The electrochemical energy storage device of claim 5, further comprising a polymer host, wherein the polymer host is selected from the group of polymers consisting of homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof and wherein the ionic liquid and polymer host form a self-supporting film.

9. An electrochemical energy storage device, comprising:
(a) first and second electrodes comprising etched carbon nanotubes having amorphous carbon covering the carbon nanotube surface removed, opposing first and second ends, and an interior surface;
(b) an electrolyte material comprising an ionic liquid, and
(c) a solid-phase electrolyte material comprising a polymer host and the ionic liquid, wherein at least most of the first ends of one or both of the first and second electrodes are open to permit the electrolyte material to access the interior surfaces of the etched carbon nanotubes and in contact with the electrolyte material.

10. The electrochemical energy storage device of claim 9, wherein the ionic liquid has a melting point of no more than about 100 degrees Celsius, a decomposition temperature of at least about 200 degrees Celsius, a viscosity of no more than about 200 Cp, an ionic conductivity of at least about 0.1 mS/cm, and an electrochemical window of at least about 2 Volts.

11. The electrochemical energy storage device of claim 10, wherein the ionic liquid comprises:
(A) at least one cation selected from the group of cations consisting of the following compounds and mixtures thereof:

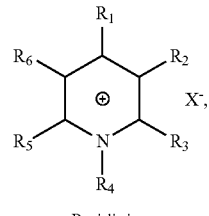
Pyridinium

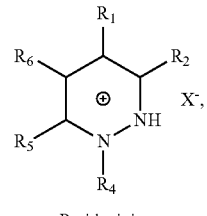
Pyridazinium

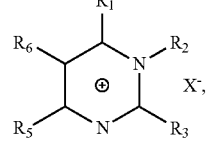
Pyrimidinium

Pyrazinium

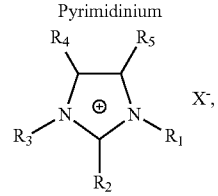
Imidazolium

Pyrazolium

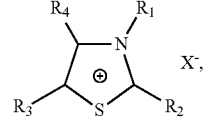
Thriazolium

Oxazolium

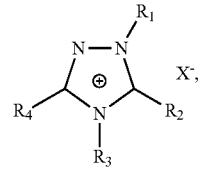
Triazolium

Ammonium

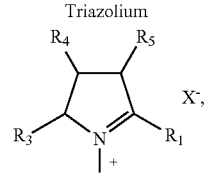
Pyrrolinium

Pyrrolidinium

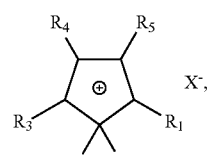
Pyrrolium

Piperidium

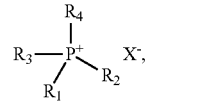
Phosphonium wherein $R_1$, $R_2$, $R_3$, $R_4$, $R_5$, and $R_6$ of the cationic components are identical or different and are selected from the group consisting of:
- (i) a hydrogen;
- (ii) a halogen;
- (iii) a hydroxyl;
- (iv) an amine;
- (v) a thiol;
- (vi) a $C_1$ to $C_{25}$ straight-chain or branched aliphatic hydrocarbon radical;
- (vii) a $C_5$ to $C_{30}$ cycloaliphatic hydrocarbon radical;
- (viii) a $C_6$ to $C_{30}$ aromatic hydrocarbon radical;
- (ix) a $C_7$ to $C_{40}$ alkylaryl radical;
- (x) a $C_2$ to $C_{25}$ linear or branched aliphatic hydrocarbon radical having interruption by one or more heteroatoms, such as, oxygen, nitrogen or sulfur;
- (xi) a $C_2$ to $C_{25}$ linear or branched aliphatic hydrocarbon radical having interruption by one or more functionalities selected from the group of aliphatic hydrocarbons consisting of:
  - (a') a carbonyl;
  - (b') an ester;
  - (c') an amide, where R' is selected from the group consisting of hydrogen, $C_1$-$C_{12}$ straight-chain, branched or cyclic alkane or alkene;
  - (d') a sulfonate;
  - (e') a sulfonamide, where R' is selected from the group consisting of hydrogen, $C_1$-$C_{12}$ straight-chain, branched or cyclic alkane or alkene;
- (xii) a $C_2$ to $C_{25}$ linear or branched aliphatic hydrocarbon radical terminally functionalized by Cl, Br, F, I, NH, OH, $NH_2$, $NHCH_3$ or SH;
- (xiii) a $C_5$ to $C_{30}$ cycloaliphatic hydrocarbon radical having at least one heteroatom selected from the group of hydrocarbon radials consisting of O, N, S, and optionally substituted with at least one of the following Cl, Br, F, I, NH, OH, $NH_2$, $NHCH_3$ or SH;
- (xiv) a $C_7$ to $C_{40}$ alkylaryl radical having at least one heteroatom selected from the group heteroatoms consisting of O, N, S, and optionally substituted with at least one of the following:
  - (a") a $C_2$ to $C_{25}$ straight-chain or branched hydrocarbon radical substituted with at least one of the following Cl, Br, F, I, NH, OH, $NH_2$, $NHCH_3$ or SH;
  - (b") a $C_5$ to $C_{30}$ cycloaliphatic hydrocarbon radical substituted with at least one of the following Cl, Br, F, I, NH, OH, $NH_2$, $NHCH_3$ or SH
  - (c") a hydroxyl;
  - (d") an amine;
  - (e") a thiol;
- (xv) a polyether of the type $-O-(-R_7-O-)_n-R_8$ or block or random type $-O-(-R_7-O-)_n-(-R_7-O-)_m-R_8$, wherein at least one of the following is true:
  - (a''') $R_7$ is a linear or branched hydrocarbon radical having from 2 to 4 carbon atoms;
  - (b''') $R_7$ is a linear or branched hydrocarbon radical having from 2 to 4 carbon atoms; and
  - (c''') wherein n is from 1 to 40; and
  - (d''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and
- (xvi) a polyether of the type $-O-(-R_7-O-)_n-C(O)-R_8$ or block or random type $-O-(-R_7-O-)_n-(-R_7-O-)_m-C(O)-R_8$, wherein at least one of the following is true:
  - (a'''') $R_7$ is a linear or branched hydrocarbon radical having from 2 to 4 carbon atoms;
  - (b'''') $R_7$ is a linear or branched hydrocarbon radical having from 2 to 4 carbon atoms; and
  - (c'''') wherein n is from 1 to 40; and
  - (d'''') $R_8$ is hydrogen, or a $C_5$ to $C_{30}$ straight-chain or branched hydrocarbon radical, or a $C_5$ to $C_{30}$ cycloaliphatic hydrocarbon radical, or a $C_6$ to $C_{30}$ aromatic hydrocarbon radical, or a $C_7$ to $C_{40}$ alkylaryl radical; and (B) at least one anion selected from the group of anions consisting of $F^-$; $Cl^-$; $Br^-$; $I^-$; $NO_3^-$; $N(CN)_2^-$; $BF_4^-$; $ClO_4^-$; $PF_6^-$; $RSO_3^-$; $RCOO^-$; where R is an alkyl group, substituted alkyl group, or phenyl group; $(CF_3)_2PF_4^-$; $(CF_3)_3PF_3^-$; $(CF_3)_4PF_2^-$; $(CF_3)_5PF^-$; $(CF_3)_6P^-$; $(CF_2SO_3^-)_2$; $(CF_2CF_2SO_3^-)_2$; $(CF_3SO_2^-)_2N^-$; $CF_3CF_2(CF_3)_2CO^-$; $(CF_3SO_2^-)_2CH^-$; $(SF_5)_3C^-$; $(CF_3SO_2)_3C^-$; $[O(CF_3)_2C_2(CF_3)_2O]_2PO^-$; $(CF_3(CF_2)_7SO_3^-$; and mixtures thereof.

12. The electrochemical energy storage device of claim 10, wherein the polymer host is selected from the group of polymers consisting of homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof and wherein the ionic liquid and polymer host form a self-supporting film.

13. The electrochemical energy storage device of claim 12, wherein a molar ratio of ionic liquid to polymer host ranges from about 0.1:1 to about 10:1.

14. The electrochemical energy storage device of claim 9, wherein the solid-phase electrolyte material comprises a substantially nonconductive, inorganic filler, and wherein at least most of the nonconductive, inoganic filler comprises particles having a surface area of at least about 10 $m^2/g$, a maximum dimension of about 50 micrometers, and an average pore size of less than about 10 micrometers.

15. The electrochemical energy storage device of claim 9, wherein the carbon nanotubes have an interior diameter, wherein the ionic liquid comprises cations and anions, wherein the anions and/or cations have a size sufficiently less than the interior diameter, and wherein the opened first ends permit the anions and/or cations to access the interior surfaces of the nanotubes.

16. The electrochemical energy storage device of claim 15, wherein at least most of the etched carbon nanotubes of the first and second electrodes are aligned carbon nanotubes, wherein the aligned carbon nanotubes on the first and second electrodes are substantially parallel to one another along substantially the entire length of the etched carbon nanotubes, and wherein the cations comprise at least one of pyridinium, pyridazinium, pyrimidinium, pyrazinium, imidazolium, pyrazolium, thiazolium, oxazolium, triazolium, ammonium, pyrrolidinium, pyrrolinium, pyrrolium, and piperidinium.

17. An electrochemical energy storage device, comprising:
(a) first and second electrodes, the first and second electrodes being oppositely charged electrodes and having primarily comprising substantially aligned carbon nanotubes, wherein the aligned carbon nanotubes have opposing first and second ends; and (b) an electrolyte material, comprising oppositely charged ions, in contact with at least most of the first ends of the carbon nanotubes of the first and second electrodes, wherein at least one of the first ends are open to permit the charged ions to access an interior surface of the corresponding nanotube, wherein the charged ions have a size less than interior diameters of the corresponding carbon nanotube, wherein the electrolyte material comprises an ionic liquid having a melting point of no more than about 100 degrees Celsius, a decomposition temperature of at least about 200 degrees Celsius, a viscosity of no more than about 200 Cp, an ionic conductivity of at least about 0.1 mS/cm, and an electrochemical window of at least about 2 Volts and wherein the electrolyte material further comprises an inorganic filler, wherein inorganic filler comprises particles having a surface area of at least about 10 $m^2$/g, a maximum dimension of about 50 micrometers, and an average pore size of less than about 10 micrometers.

18. An electrochemical energy storage device, comprising:
(a) first and second electrodes comprising etched carbon nanotubes having amorphous carbon layer covering the carbon nanotube surface removed;
(b) a solid-phase electrolyte material comprising an ionic liquid, wherein the ionic liquid has a melting point of no more than about 100 degrees Celsius, a decomposition temperature of at least about 200 degrees Celsius, a viscosity of no more than about 200 Cp, an ionic conductivity of at least about 0.1 mS/cm, and an electrochemical window of at least about 2 Volts; and
a polymer host selected from the group of polymers consisting of homopolymers and copolymers of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof, wherein the ionic liquid and polymer host forms a self-supporting film.

19. An electrochemical energy storage device, comprising:
(a) first and second electrodes comprising etched carbon nanotubes;
(b) a solid-phase electrolyte material comprising an ionic liquid, wherein the ionic liquid has a melting point of no more than about 100 degrees Celsius, a decomposition temperature of at least about 200 degrees Celsius, a viscosity of no more than about 200 Cp, an ionic conductivity of at least about 0.1 mS/cm, and an electrochemical window of at least about 2 Volts; and
a polymer host, wherein the solid-phase electrolyte material comprises a substantially nonconductive, inorganic filler, and wherein the ononconductive, inorganic filler comprises particles having a surface area of at least about 10 $m^2$/g, a maximum dimension of about 50 micrometers, and an average pore size of less than about 10 micrometer.

20. An electrochemical energy storage device, comprising:
(a) first and second electrodes, the first and second electrodes are oppositely charged and primarily comprise substantially aligned carbon nanotubes, the aligned carbon nanotubes have opposing first and second ends; and
(b) an electrolyte material, comprising ions, in contact with at least most of the first ends of the aligned carbon nanotubes of the first and second electrodes, wherein at least one of the first ends in contact with the electrolyte material is open to permit the ions to access an interior surface of the corresponding nanotube, wherein the ions comprise anions and cations, wherein the cations comprise at least one of pyridinium, pyridazinium, pyrimidinium, pyrazinium, imidazolium, pyrazolium, thiazolium, oxazolium, triazolium, ammonium, pyrrolidinium, pyrrolinium, pyrrolium, and piperidinium.

21. An electrochemical energy storage device, comprising:
(a) first and second electrodes comprising etched carbon nanotubes having opposing first and second ends and an interior diameter, wherein at least most of the first ends of one or both of the first and second electrodes are open; and
(b) a solid-phase electrolyte material comprising a polymer host and an ionic liquid, wherein at least most of the open first ends are in contact with the electrolyte material, wherein the electrolyte material comprises anions and cations having has a size less than the interior diameter.

* * * * *